United States Patent
Suzuki

(10) Patent No.: US 6,983,470 B2
(45) Date of Patent: **\*Jan. 3, 2006**

(54) DISK RECORDING AND/OR REPRODUCING APPARATUS

(75) Inventor: Yoshiaki Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/080,404

(22) Filed: Mar. 16, 2005

(65) Prior Publication Data

US 2005/0160437 A1    Jul. 21, 2005

Related U.S. Application Data

(63) Continuation of application No. 10/297,489, filed as application No. PCT/JP02/03538 on Apr. 9, 2002.

(30) Foreign Application Priority Data

Apr. 9, 2001    (JP)    .............................. 2001-110373

(51) Int. Cl.
    *G11B 33/02*    (2006.01)
(52) U.S. Cl. ..................................... 720/620
(58) Field of Classification Search ................ 720/619, 720/620, 621, 622, 623
    See application file for complete search history.

(56) References Cited

U.S. PATENT DOCUMENTS

| | | |
|---|---|---|
| 4,682,320 A | 7/1987 | D'Alayer De Costemore D'Arc |
| 5,682,369 A | 10/1997 | Nakamichi |
| 6,028,831 A | 2/2000 | Scholz et al. |
| 6,463,025 B1 | 10/2002 | Scholz |
| 6,512,730 B1 | 1/2003 | Lee et al. |

FOREIGN PATENT DOCUMENTS

| | | |
|---|---|---|
| JP | 8-63863 | 3/1996 |
| JP | 11-328799 | 11/1999 |

*Primary Examiner*—William Korzuch
*Assistant Examiner*—Mark Blouin
(74) *Attorney, Agent, or Firm*—Oblon, Spivak, McClelland, Maier & Neustadt, P.C.

(57) ABSTRACT

The present invention relates to a disk recording and/or reproducing apparatus in which a disk-like recording medium such as an optical disk is transported between a disk loading portion provided for recording and/or reproducing information and a disk unloading portion for inserting and ejecting the disk-like recording medium.

The disk recording and/or reproducing apparatus includes a pair of transport members for holding a disk-like recording medium in its diametrical direction, a drive means for driving a first transport member of the pair of transport members and giving rotation force to rotate and move the disk-like recording medium held between the pair of transport members and a space adjusting mechanism capable of adjusting a space by making the pair of transport members become close to or away from each other in response to the size of the disk-like recording medium.

The disk-like recording medium can reliably be held in the diametrical direction by adjusting a space between the pair of transport members with the space adjusting mechanism in response to the size of the disk-like recording medium and the disk-like recording medium can be rotated, moved and transported by rotation force applied thereto. Therefore, when the disk is transported, the signal recording surface can be free from being touched, the signal recording surface can be prevented from being pressed by foreign material and the signal recording surface can be prevented from being scratched by the foreign material. Thus, an information signal can reliably be read and written.

1 Claim, 46 Drawing Sheets

FIG. 21A
FIG. 21B
FIG. 21C
FIG. 21D
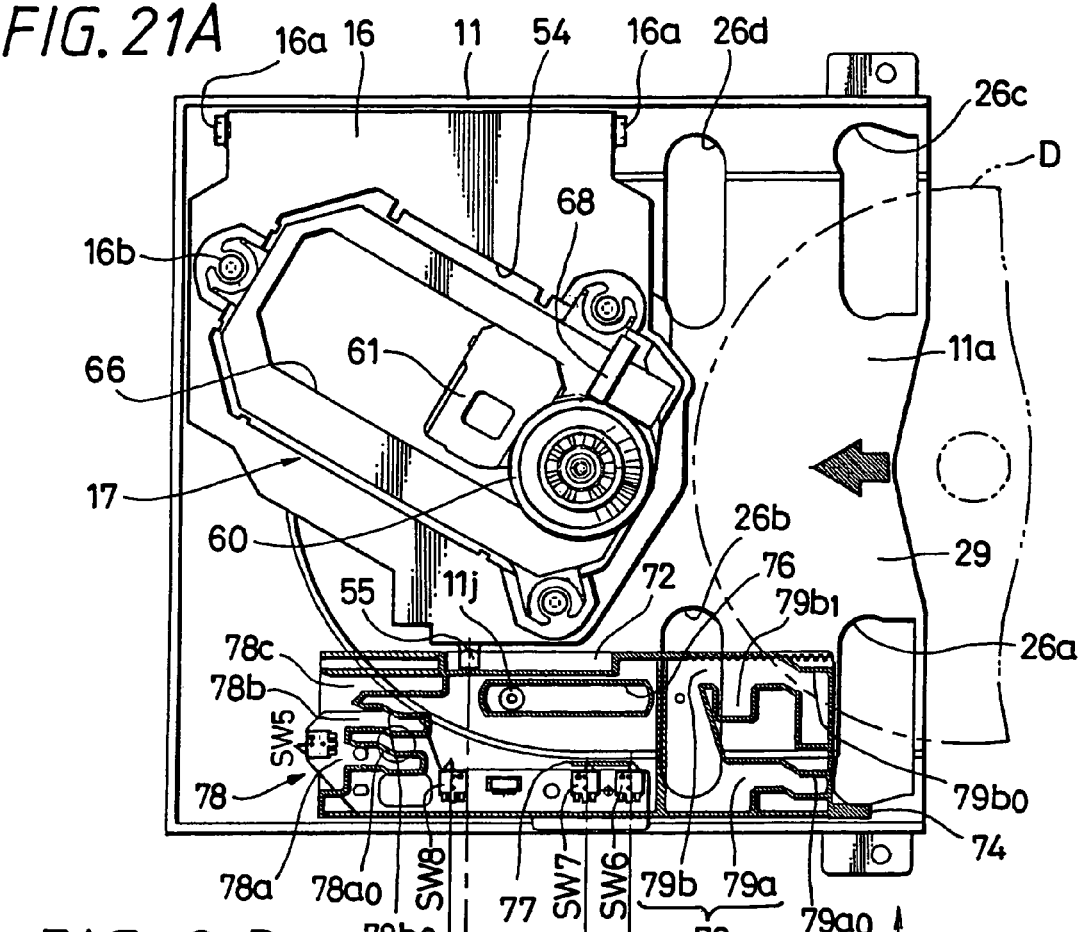
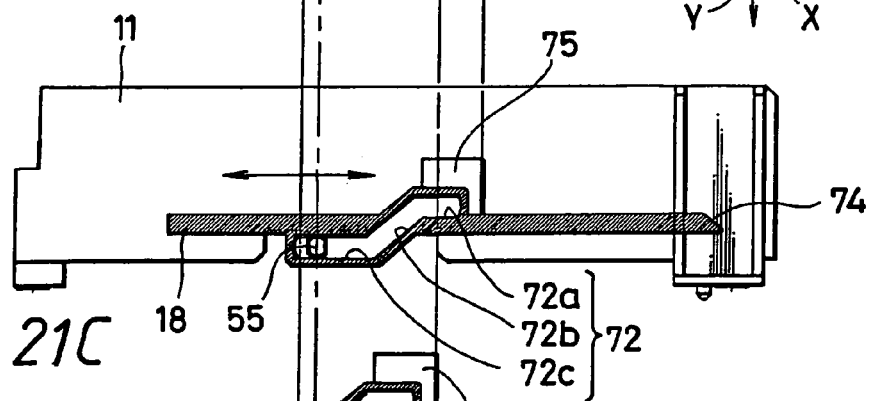
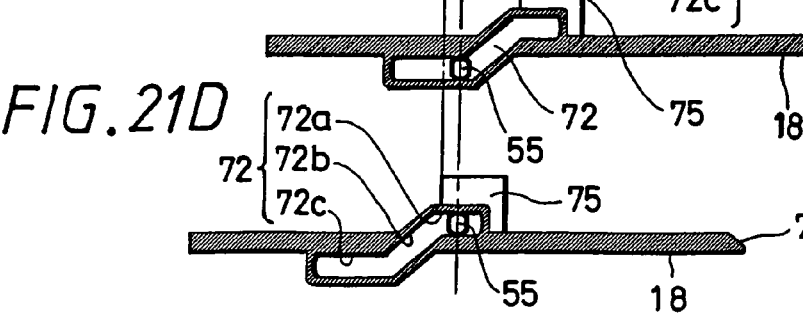

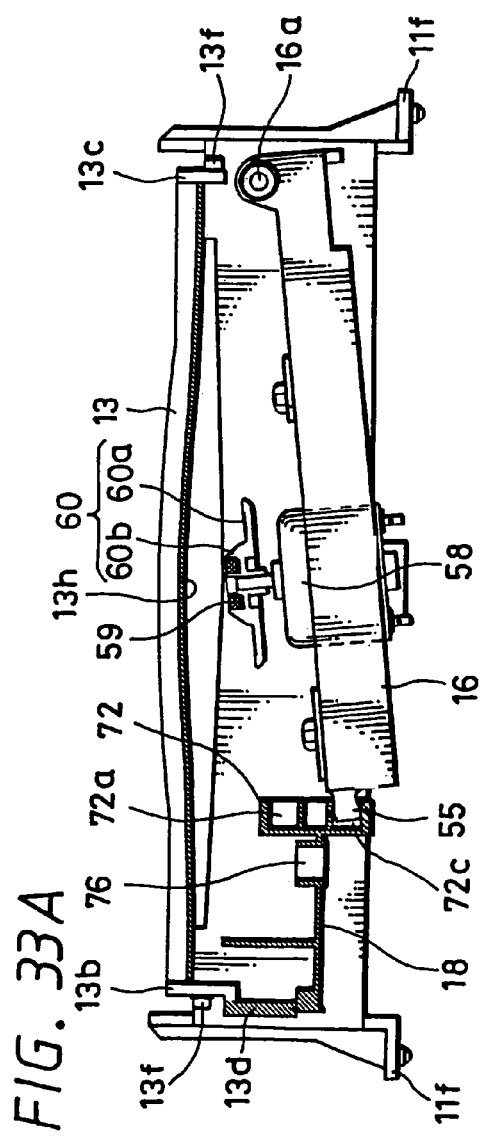
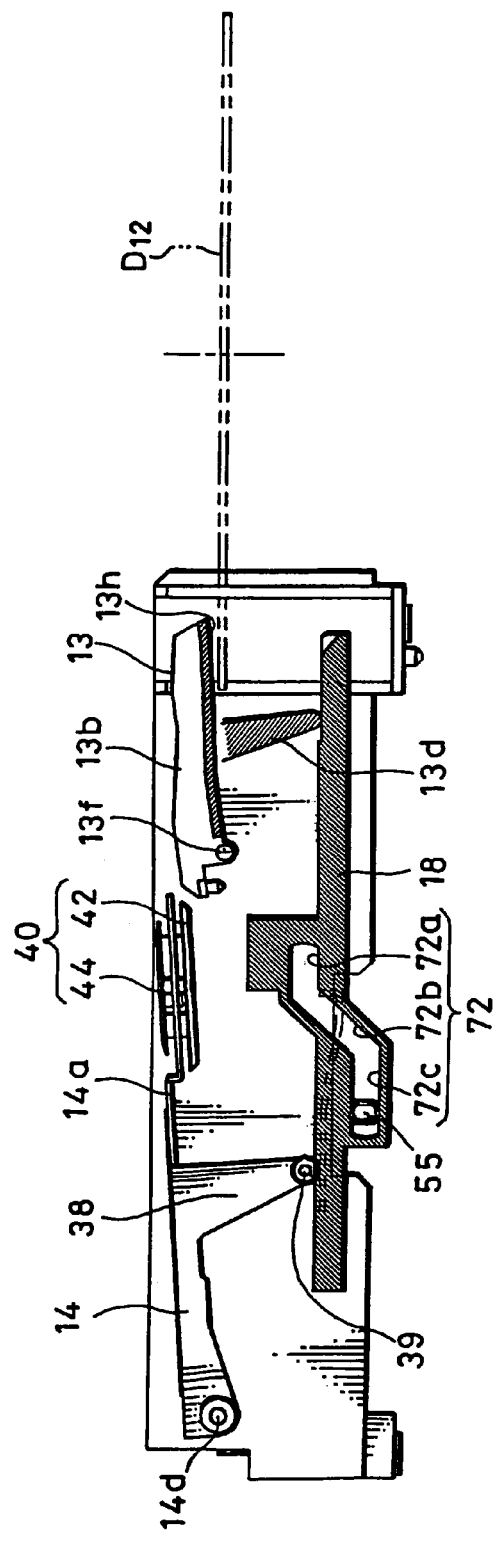
FIG. 33A
FIG. 33B

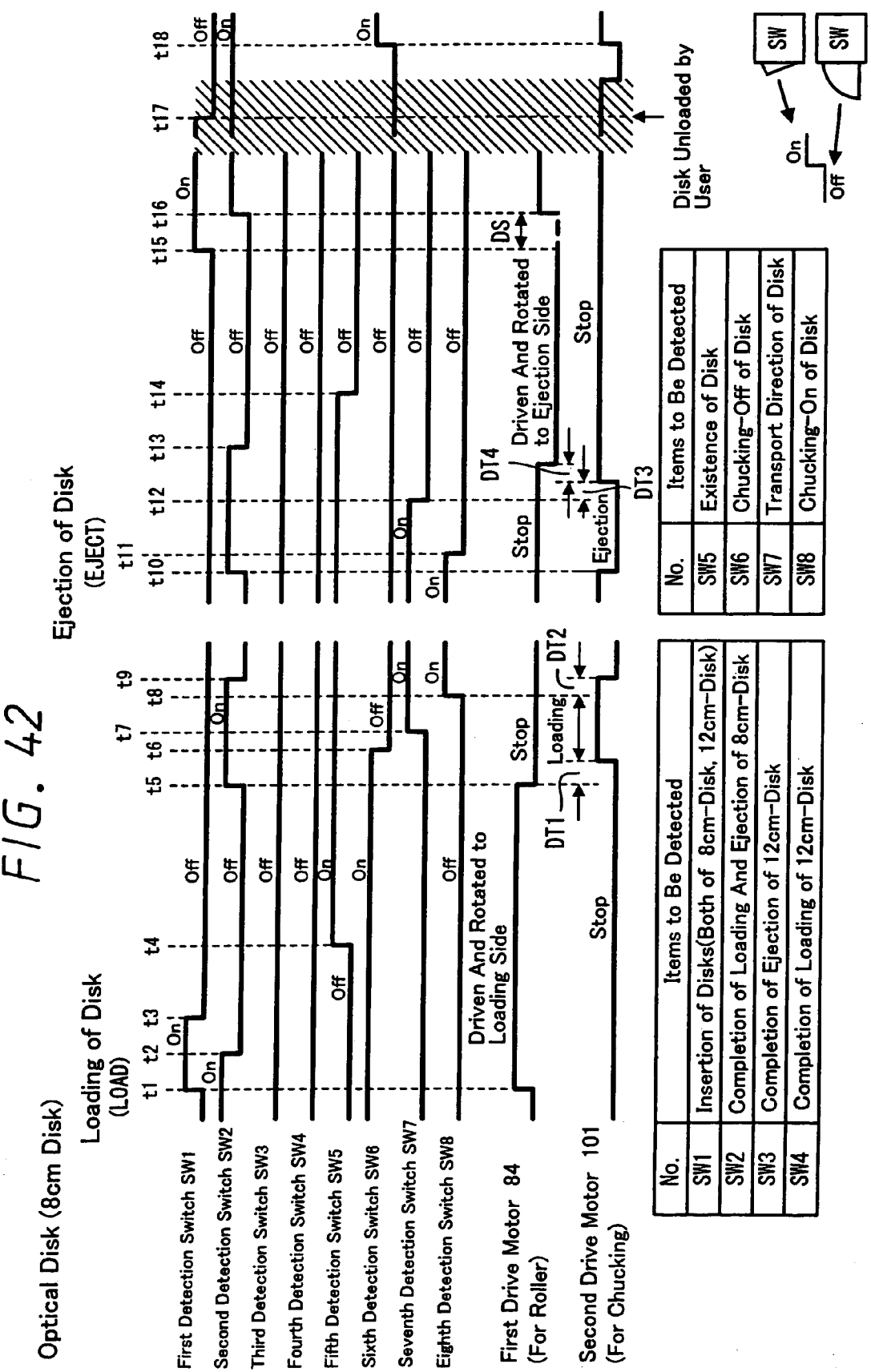

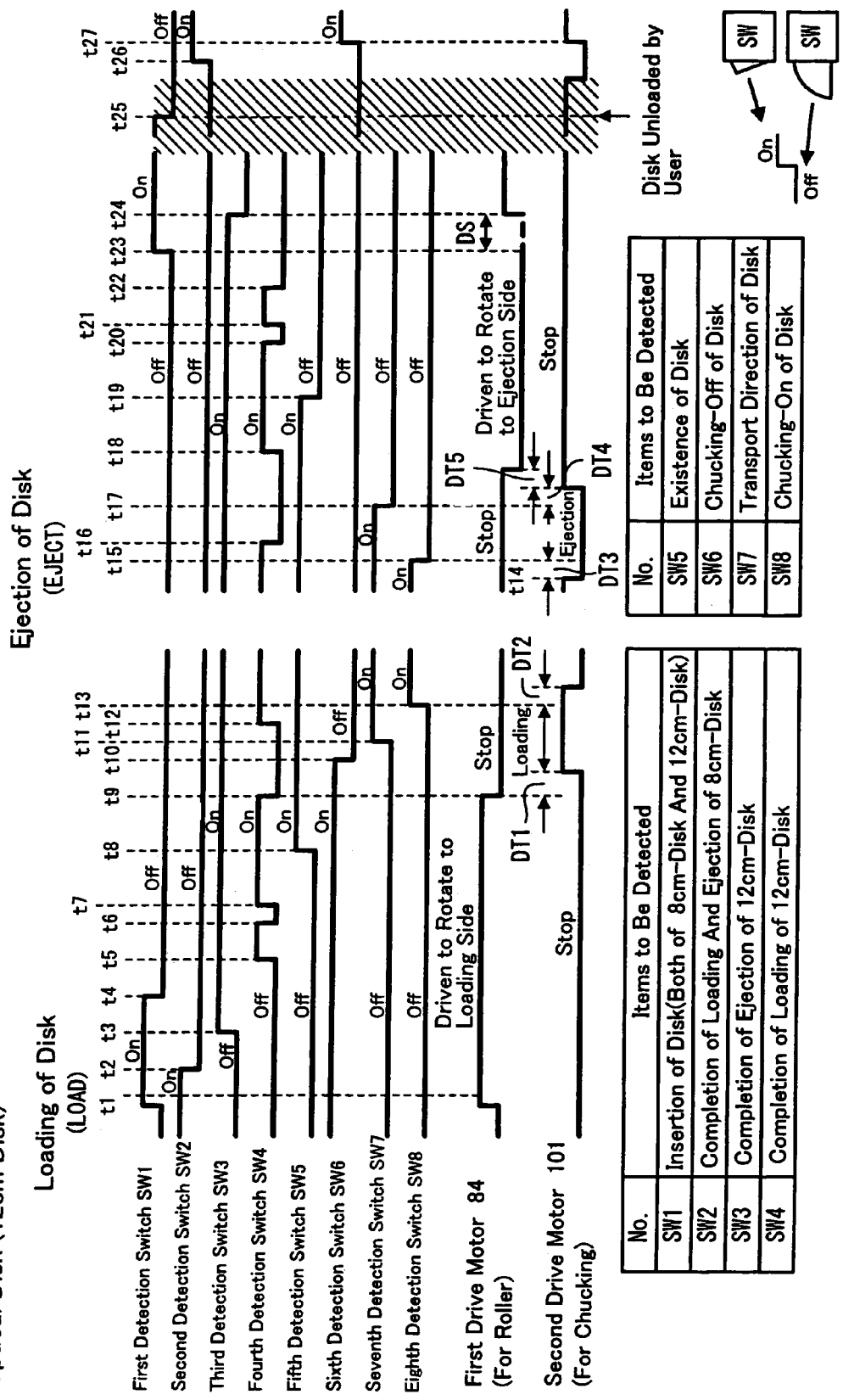

US 6,983,470 B2

DISK RECORDING AND/OR REPRODUCING APPARATUS

CROSS REFERENCE TO RELATED APPLICATIONS

The present application is a Continuation application of U.S. application Ser. No. 10/297,489, filed Jun. 4, 2003, which is a National Stage of PCT/JP02/03538, filed Apr. 9, 2002. In addition the present application claims the benefit of priority of Japanese Application No. 2001-110373, filed Apr. 9, 2001, the disclosure of which are all incorporated herein by reference.

TECHNICAL FIELD

The present invention relates to a disk recording and/or reproducing apparatus in which a disk-like recording medium such as an optical disk and a magneto-optical disk is transported between a disk loading portion which is provided to record and/or reproduce information and a disk entrance and exit slot through which the disk-like recording medium is inserted and ejected, and particularly to a disk recording and/or reproducing apparatus in which two or more than two disk-like recording mediums having different diameters can be reliably transported.

BACKGROUND ART

Disk recording and/or reproducing apparatus have hitherto been provided to record and/or reproduce information signals from disk-like recording mediums generally called an optical disk such as a CD (compact disc) or a CD-ROM (CD-read-only memory), a magneto-optical disk (OD: optical magnetic disk) or the like.

This disk recording and/or reproducing apparatus comprises: a disk rotation mechanism for rotating a turntable onto which a disk-like recording medium loaded, an optical pickup device for writing and reading an information signal on the disk-like recording medium rotated by the disk rotation mechanism, and a disk loading mechanism for transporting the disk-like recording medium between a disk entrance and exit slot through which the disk is inserted and ejected and a disk loading portion having a turntable and the like.

As the disk recording and/or reproducing apparatus including such disk loading mechanism, there is known such a disk recording and/or reproducing apparatus as described in Japanese laid-open patent application No. 10-340513 for example, and a schematic arrangement of such disk recording and/or reproducing apparatus is shown in FIGS. 51 and 52 of the present application.

In FIG. 51, reference numeral 1 denotes a disk recording and reproducing apparatus. The disk recording and reproducing apparatus 1 includes: a drive unit 2 provided within a housing for clamping to drive a disk D (e.g. a large-diameter disk $D_{12}$ having a diameter of 12 cm or a small-diameter disk $D_8$ having a diameter of 8 cm), a disk guide 3 extended at one side portion within the housing along the direction of the disk D being transported, a stopper 4 provided at the deep inside of the housing and extended in the direction crossing the disk guide 3 and a disk conveying means 5 for conveying the disk D to the deep inside of the housing and forcing the disk to be transported in the direction of the disk guide 3 when the disk is conveyed. This recording and reproducing apparatus is characterized in that the center of the disk D is clamped to the drive unit 2 when the disk D conveyed by the disk conveying means 5 is abutted on both of the disk guide 3 and the stopper 4 to be properly positioned.

The disk conveying means 5 includes a tapered roller 6 which is thicker on the side of the disk guide 3 and a guide top 7 for holding the disk D between the guide top 7 and the roller 6. The roller 6 is shaped like a tapered roller whose diameter progressively increases from the Y2 side to the Y1 side. The roller has a spiral protrusion 6a formed on its outer peripheral surface. Both ends of the roller 6 are rotatably supported by a roller support body 8, and the roller can be rotated in the a direction and in the opposite a direction shown in FIG. 51 by a drive motor not shown in the figure. The guide top 7 is provided above the roller 6 and the roller 6 is forced to the side of the guide top 7 under spring force of springs 9, 9 retained at the both ends of the roller support body 8.

In the disk recording and reproducing apparatus 1 having the above-mentioned construction, when the disk D is inserted into the space between the roller 6 and the guide top 7, the disk D is held between the roller 6 and the guide top 7. When the roller 6 is rotated in the a direction in this state, the disk D is conveyed in the X1 direction by rotation force of the roller 6.

In this case, when the large-diameter disk $D_{12}$ is inserted into the disk conveying means 5, since the diameter of the Y1 side of the roller 6 is larger than the diameter of the Y2 side, the edge portion on the Y1 side of the large-diameter disk $D_{12}$ is held by large force, and the edge portion on the Y2 side of the disk D is held by small force or not held at all. As a result, difference is generated between holding forces at both left and right ends of the large-diameter disk $D_{12}$ so that feeding force generated by the rotation of the roller 6 strongly acts on the large-diameter side as compared with the small-diameter side. Consequently, the large-diameter disk $D_{12}$ is transported in the X1 direction which is to the deep inside of the housing while being forced against the disk guide 3, that is, in the Y1 direction. Then, when the large-diameter disk is brought in contact with the stopper 4, the large-diameter disk $D_{12}$ is properly positioned by the disk guide 3 and the stopper 4.

When the small-diameter disk $D_8$ is inserted into the disk conveying means 5, the roller 6 is also rotated in the a direction, whereby the small-diameter disk $D_{12}$ is transported in the X1 direction which is to the deep inside of the housing while being forced in the Y1 direction. Similarly to the large-diameter disk $D_{12}$, the small-diameter disk $D_8$ is also conveyed to the position at which the disk is brought in contact with the stopper 4 while being forced against the disk guide 3. Then, when the small-diameter disk $D_8$ is brought in contact with the stopper 4, the disk is properly positioned by the disk guide 3 and the stopper 4. Reference numeral $0_8$ denotes the center at which the small-diameter disk $D_8$ is properly positioned, and reference numeral $0_{12}$ denotes the center at which the large-diameter disk $D_{12}$ is properly positioned.

However, in such conventional disk recording and reproducing apparatus, the roller 6 and the guide top 7 comprising the disk conveying means 5 hold the front and rear surfaces of the disk D and the disk D is conveyed in the X1 direction by the rotation force of the roller 6 while the disk being forced against the disk guide 3, that is, in the Y1 direction. Consequently, when the disk D is inserted into the space between the roller 6 and guide top 7 in the state, for example, in which the signal recording surface is smudged by minute foreign substances (dusts, etc.), foreign substances are pressed against and dragged on the signal recording surface by the roller 6 so that the signal recording surface may be covered with the foreign substances or scratched. In consequence, when the signal recording surface is covered with the foreign substances or scratched, not only the signal recording surface looks considerably damaged but also a signal recorded beforehand cannot be read out from the optical disk and a new information signal cannot be written on the optical disk.

In view of the above described problems in the prior art, according to the present invention when the disk-like recording medium is inserted into and ejected from the disk recording and/or reproducing apparatus, a disk transport mechanism side can be prevented from coming in contact with a signal recording surface of a disk-like recording medium so that the signal recording surface can be protected from being scratched and the disk transport mechanism side can transport disk-like recording mediums of different sizes by holding only their outer peripheral edges.

DISCLOSURE OF INVENTION

According to the present invention, there is provided a disk recording and/or reproducing apparatus which is comprised of: a pair of transport members capable of holding a disk-like recording medium in its diametrical direction, a drive means for driving a first transport member of the pair of transport members to give rotation force to the disk-like recording medium held between the pair of transport members, thereby rotating the disk-like recording medium, and a space adjusting mechanism capable of adjusting a space between the pair of transport members by making the members become close to each other or away from each other in response to the size of the disk-like recording medium.

BRIEF DESCRIPTION OF DRAWINGS

FIGS. 13A, 13B, and 13C show the drive-side roller assembly body of the disk recording and reproducing apparatus shown in FIG. 5, wherein FIG. 13A is a plan view, FIG. 13B is a front view, and FIG. 13C is a side view.

FIGS. 15A, 15B and 15C show the fixed-side roller assembly body of the disk recording and reproducing apparatus shown in FIG. 5, wherein FIG. 15A is a plan view, FIG. 15B is a front view, and FIG. 15C is a side view.

FIGS. 21A to 21D are explanatory diagrams showing a relationship between fifth, sixth, seventh and eighth detection switches and a cam plate after loading an optical disk onto the disk recording and reproducing apparatus shown in FIG. 5.

FIGS. 23A and 23B are diagrams to which reference will be made in explaining operations shown in FIG. 22 of the disk recording and reproducing apparatus shown in FIG. 5, wherein FIG. 23A is an explanatory diagram showing a cam plate, a turntable and the like from the front surface side and FIG. 23B is an explanatory diagram showing an opening and closing shutter, a chucking arm, a cam plate and the like from the side surface side.

FIGS. 25A and 25B are diagrams to which reference will be made in explaining operations shown in FIG. 24 of the disk recording and reproducing apparatus shown in FIG. 5, wherein FIG. 25A is an explanatory diagram showing a cam plate, a turntable and the like from the front surface side and FIG. 25B is an explanatory diagram showing an opening and closing shutter, a chucking arm, a cam plate and the like from the side surface side.

FIGS. 27A and 27B are diagrams to which reference will be made in explaining operations shown in FIG. 26 of the disk recording and reproducing apparatus shown in FIG. 5, wherein FIG. 27A is an explanatory diagram showing a cam plate, a turntable and the like from the front surface side and FIG. 27B is an explanatory diagram showing an opening and closing shutter, a chucking arm, a cam plate and the like from the side surface side.

FIGS. 29A and 29B are diagrams to which reference will be made in explaining operation shown in FIG. 28 of the disk recording and reproducing apparatus shown in FIG. 5, wherein FIG. 29A is an explanatory diagram showing a cam plate, a turntable and the like from the front surface side and FIG. 29B is an explanatory diagram showing an opening and closing shutter, a chucking arm, a cam plate and the like from the side surface side.

FIGS. 31A and 31B are diagrams to which reference will be made in explaining operations shown in FIG. 30 of the disk recording and reproducing apparatus shown in FIG. 5, wherein FIG. 31A is an explanatory diagram showing a cam plate, a turntable and the like from the front surface side and FIG. 31B is an explanatory diagram showing an opening and closing shutter, a chucking arm, a cam plate and the like from the side surface side.

FIGS. 33A and 33B are diagrams to which reference will be made in explaining operation shown in FIG. 32 of the disk recording and reproducing apparatus shown in FIG. 5, wherein FIG. 33A is an explanatory diagram showing a cam plate, a turntable and the like from the front surface side and FIG. 33B is an explanatory diagram showing an opening and closing shutter, a chucking arm, a cam plate and the like from the side surface side.

FIGS. 35A and 35B are diagrams to which reference will be made in explaining operations shown in FIG. 34 of the disk recording and reproducing apparatus shown in FIG. 5, wherein FIG. 35A is an explanatory diagram showing a cam plate, a turntable and the like from the front surface side and FIG. 35B is an explanatory diagram showing an opening and closing shutter, a chucking arm, a cam plate and the like from the side surface side.

FIGS. 37A and 37B are diagrams to which reference will be made in explaining operations shown in FIG. 36 of the disk recording and reproducing apparatus shown in FIG. 5, wherein FIG. 37A is an explanatory diagram showing a cam plate, a turntable and the like from the front surface side and FIG. 37B is an explanatory diagram showing an opening and closing shutter, a chucking arm, a cam plate and the like from the side surface side.

FIGS. 39A and 39B are diagrams to which reference will be made in explaining operations shown in FIG. 38 of the disk recording and reproducing apparatus shown in FIG. 5, wherein FIG. 39A is an explanatory diagram showing a cam plate, a turntable and the like from the front surface side and FIG. 39B is an explanatory diagram showing an opening and closing shutter, a chucking arm, a cam plate and the like from the side surface side.

FIGS. 41A and 41B are diagrams to which reference will be made in explaining operations shown in FIG. 40 of the disk recording and reproducing apparatus shown in FIG. 5, wherein FIG. 41A is an explanatory diagram showing a cam plate, a turntable and the like from the front surface side and FIG. 41B is an explanatory diagram showing an opening and closing shutter, a chucking arm, a cam plate and the like from the side surface side.

FIG. 42 is a timing chart explaining operations of eight detection switches and two drive motors when an optical disk having a diameter of 8 cm is used in the disk recording and reproducing apparatus shown in FIG. 5.

FIG. 43 is a timing chart explaining operations of eight detection switches and two drive motors when an optical disk having a diameter of 12 cm is used in the disk recording and reproducing apparatus.

FIGS. 47A and 47B are diagrams showing a second embodiment of a first transport member applied to the fixed-side roller assembly body shown in FIG. 5, wherein FIG. 47A is a perspective view and FIG. 47B is a longitudinal cross-sectional view of the central portion thereof.

FIGS. 48A and 48B are diagrams showing a third embodiment of a first transport member applied to the drive-side roller assembly body shown in FIG. 5, wherein FIG. 48A is a perspective view and FIG. 48B is a longitudinal cross-sectional view of the central portion thereof.

BEST MODE FOR CARRYING OUT THE INVENTION

Figure 1:
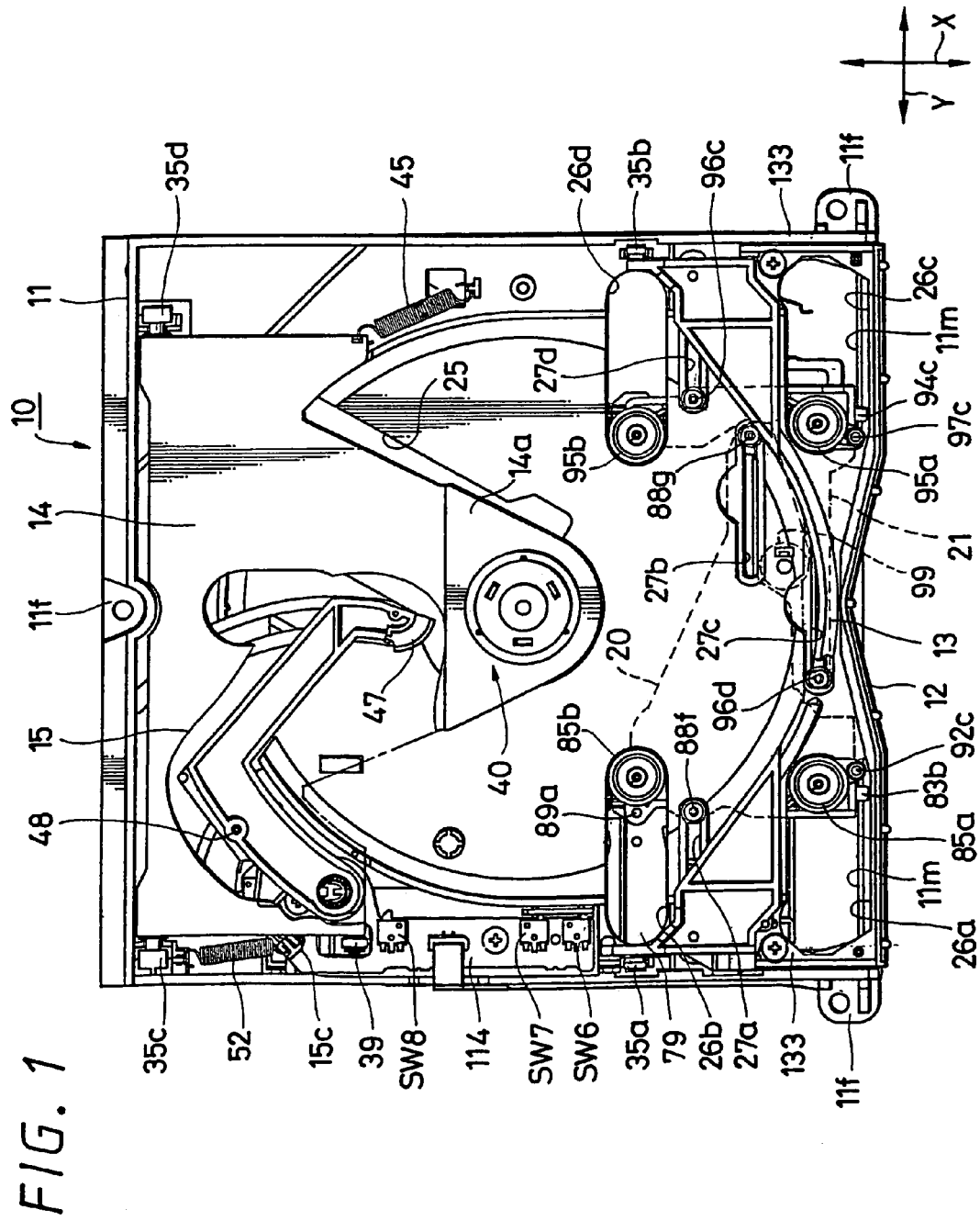
FIG. 1 is a partly cross-sectional plan view showing a disk recording and reproducing apparatus concerning a disk recording and/or reproducing apparatus according to an embodiment of the present invention.

Referring to the drawings, embodiments of a disk recording and/or reproducing apparatus according to the present invention will be described below. FIGS. 1 to 50 show the embodiments of a disk recording and/or reproducing apparatus according to the present invention, and the embodiments are applied to a disk recording and/or reproducing apparatus capable of not only reproducing information but also recording information.

In a disk recording and reproducing apparatus 10 according to this embodiment, any of a disk-like recording medium having a diameter of 12 cm and that of 8 cm can be used, and as the disk-like recording mediums optical disks such as a CD-R (Write Once), a DVD-R or a video CD-R in which information can be written once, CD-RW (Rewritable), a DVD-RW or a video CD-RW in which information can be written many times, and also a CD or a CD-ROM that can only be read can be used.

As shown in FIGS. 1 to 5, the disk recording and reproducing apparatus 10 according to the present invention comprises: a main chassis 11 serving as a base member which is open to the upper and lower surfaces, a gate member 12 rotatably or slidably, or fixedly attached to this main chassis 11, an opening and closing shutter 13, a chucking arm 14, a support lever 15, an assembly body holder 16, a pickup table assembly body 17, a cam plate 18, a drive-side roller assembly body 20, a fixed-side roller assembly body 21, a chuck drive assembly body 22 and the like.

Figure 6:
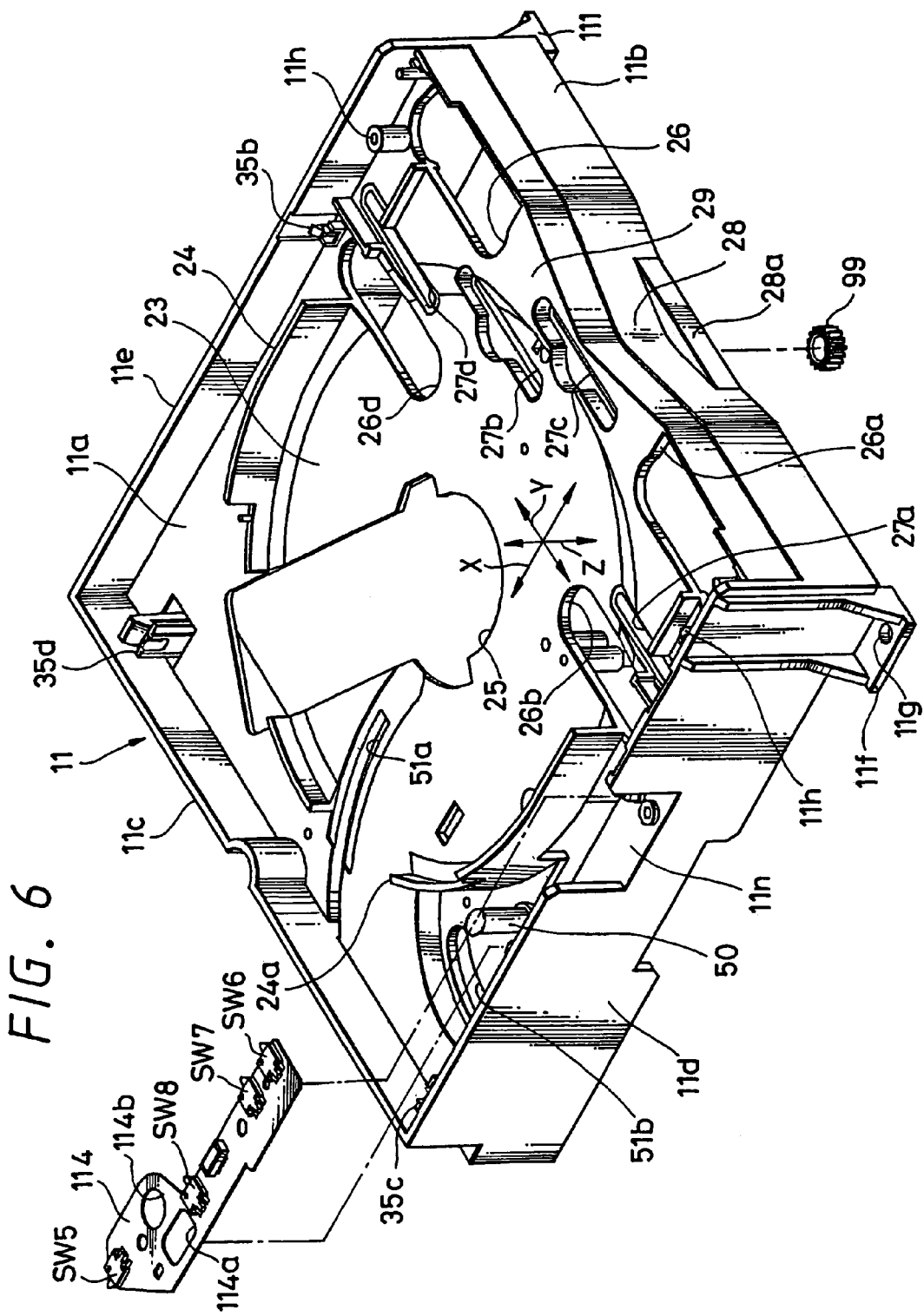
FIG. 6 is an enlarged perspective view showing a main chassis of the disk recording and reproducing apparatus shown in FIG. 5.

As shown in FIG. 6 in an enlarged scale, the main chassis 11 has a flat surface portion 11a of an approximately square shape, and a front surface portion 11b, a rear surface portion 11c and left and right side surface portions 11d, 11e integrally formed on the four sides of the flat surface portion 11a continuously and is constructed as a rectangular container having a false bottom. Although only the front surface portion 11b of the main chassis 11 projects downward to cover only the lower surface side of the flat surface portion 11a, both the rear surface portion 11c and the left and right side surface portions 11d, 11e project not only downward but also upward to cover the lower surface side and the upper surface side of the flat surface portion 11a. The front and rear direction X that connects the front surface portion 11b and the rear surface portion 11c shows in the direction which an optical disk D is inserted in and ejected from the disk recording and reproducing apparatus.

There are provided base pieces 11f projecting downward on the front parts of the left and right side surfaces 11d, 11e and on approximately the center part of the rear surface portion 11c of the main chassis 11. The base pieces 11f have insertion holes 11g bored therein and with attachment screws inserted into those insertion holes 11g, the main chassis 11 is fixed to the predetermined position within a housing which will be described later on.

In the flat surface portion 11a of the main chassis 11, a disk installation portion 23 for housing a 12 cm-optical disk $D_{12}$ which shows a specific example of a large-diameter disk is provided at its approximately central portion. Accordingly, it is natural that this disk installation portion can house therein an 8 cm-optical disk $D_8$ which shows a specific example of a small-diameter optical disk. A semicircular partition wall 24 is provided as surrounding the disk installation portion 23 along its side portion to its rear portion.

Further, the disk installation portion 23 has an opening 25 formed at its central portion, through which the turntable of the pickup table assembly body 17 is inserted or ejected from under the opening 25. The opening 25 continues diagonally from the central portion of the disk installation portion 23 and extends through the partition wall 24 to the side of the rear surface portion 11c so that an optical pickup of an optical pickup device, which will be described later on, can move in the radial direction within a predetermined distance as opposing to a signal recording surface of an optical disk installed and rotated on the turntable.

In a front part of the flat surface portion 11a of the main chassis 11, there are provided four roller through-holes 26a, 26b, 26c and 26d extending in the right and left direction Y perpendicular to the front and rear direction X and four guide oblong holes 27a, 27b, 27c and 27d similarly extending in the right and left direction Y. The four through-holes 26a to 26d are positioned parallel to each other, and the first and third through-holes 26a and 26c are set at two front corners of the flat surface portion 11a. The remaining two second and four through-holes 26b and 26d are located apart with a predetermined space from the through-holes 26a, 26c in the front and rear direction X such that the remaining two through-holes may be positioned align in the front and rear direction X.

The four oblong holes 27a to 27d are also positioned parallel to each other, and the first oblong hole 27a is set between the first through-hole 26a and the second through-hole 26b; and the third oblong hole 27c is set between the first through-hole 26a and the third through-hole 26c. Then, the fourth oblong hole 27d is set between the third through-hole 26c and the fourth through-hole 26d; and the second oblong hole 27b is set between the third oblong hole 27c and the fourth oblong hole 27d.

In the front surface portion 11b of this main chassis 11, a V-like holding recess portion 28 is provided in the right and left direction Y at its approximately central portion to enable a user to hold the optical disk D without difficulty. A reinforcement rib portion 28a is formed under the holding recess portion 28 to reinforce strength of the front surface portion 11b. At an upper central portion of the front surface portion 11b, a V-like disk guide portion 29 is formed of a gentle inclined surface extending in the right and left direction Y. This disk guide portion 29 may be an arc-like curved surface formed of a gentle curved line. The gate member 12 is fixed to the upper part of the front surface portion 11b by fixing means such as set screws.

Figure 7:
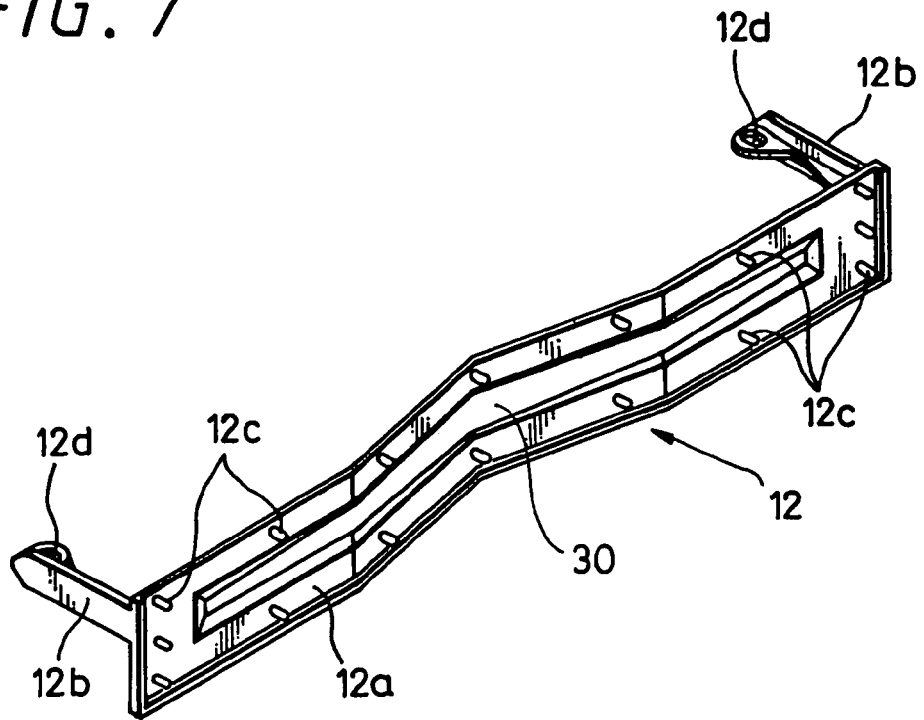
FIG. 7 is an enlarged exploded perspective view showing a gate member of the disk recording and reproducing apparatus shown in FIG. 5.

As shown in FIG. 7, the gate member 12 is composed of a shielding plate 12a formed of an oblong rectangular plate member capable of covering an opening which includes the upper portion of the front surface portion 11b of the main chassis 11 and a pair of fixed arms 12b, 12b integrally formed with respective ends of this shielding plate 12a in the longitudinal direction. The intermediate part of the shielding plate 12a is bent in a V-like fashion in the longitudinal direction and projected rearward in association with the holding recess portion 28 of the front surface portion 11b of the main chassis 11.

The shielding plate 12a of the gate member 12 has a disk entrance and exit slot 30 formed of an oblong opening. The disk entrance and exit slot 30 is long and wide enough to insert or eject the large-diameter disk $D_{12}$ having the diameter of 12 cm without restraint, and the central portion of the slot 30 has a width wider than those of respective end portions thereof.

Specifically, the upper edge portion of the disk entrance and exit slot 30 of the gate member 12 is formed as an inverse V-like inclined plane in which its central portion has a large upward recess. The lower edge portion of the disk entrance and exit slot 30 is formed as a V-like inclined plane in which its central portion has a large downward recess. However, the shape of the disk entrance and exit slot 30 is not limited to the combination of the V-like inclined plane and the inverse V-like inclined plane, and it may be formed as a U-like arc plane to form as a whole a barrel-like shape by opposing a U-like arc plane to an inverse U-like arc plane.

Figure 3:
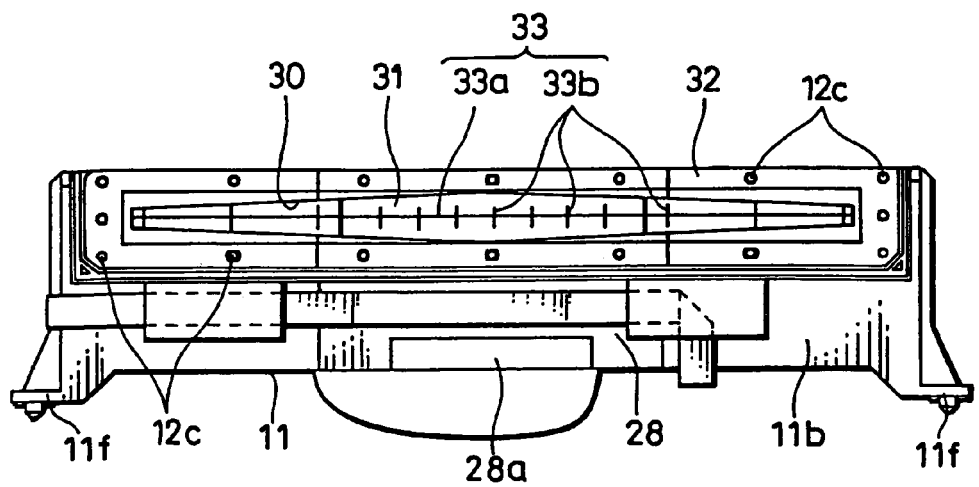
FIG. 3 is a front view showing a disk recording and reproducing apparatus concerning a disk recording and/or reproducing apparatus according to an embodiment of the present invention.

As shown in FIG. 3, on the front surface of the shielding plate 12a of this gate member 12, there is disposed a wiper member 31 with slits, which covers the disk entrance and exit slot 30 completely. A wiper presser 32 formed of a square frame member is disposed at the outside of the wiper member 31. A number of caulking protrusions 12c provided at the front surface of the shielding plate 12a are extended through the wiper member 31 and the wiper presser 32. When the tip ends of the caulking protrusions 12c are caulked, four sides of the wiper member 31 are pressed and fixed by the shielding plate 12a through the wiper presser 32.

The wiper member 31 is applied to prevent dusts and the like from entering into the apparatus from the outside as if dusts were attracted to the optical disk D when the optical disk D is inserted into or ejected from the disk entrance and exit slot 30, and the wiper member can be formed of materials such as highly-flexible nonwoven fabric. This wiper member 31 has a cut slit 33 comprised of a horizontal slit 33a extending at approximately a central portion of a width direction along the longitudinal direction and a plurality of vertical slits 33b extending vertically at a proper interval in the longitudinal direction so as to each cross the horizontal slit 33a. By means of such cut slit 33, dusts and the like are prevented or restrained from entering into the apparatus from the outside as the edge of the cut slot is made to closely contact with the front and rear surfaces of the optical disk D which is inserted into and ejected from the disk entrance and exit slot 30.

Figure 4:
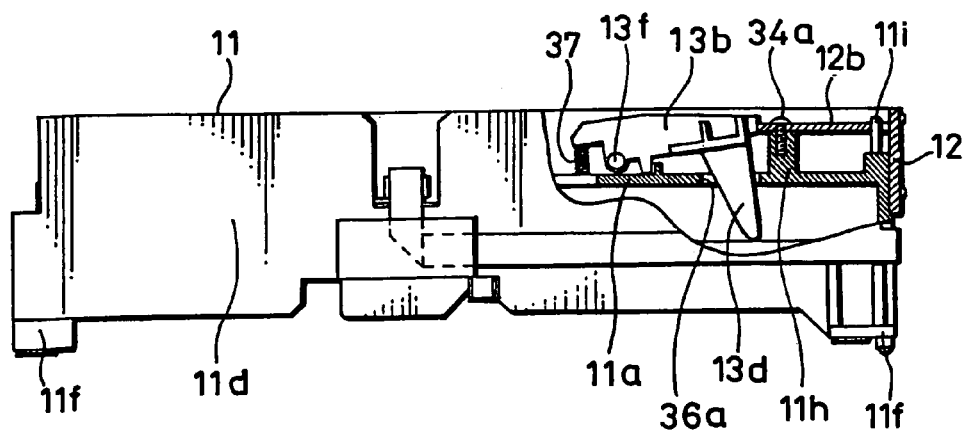
FIG. 4 is a partly cross-sectional side view showing a disk recording and reproducing apparatus concerning a disk recording and/or reproducing apparatus according to an embodiment of the present invention.
Figure 5:
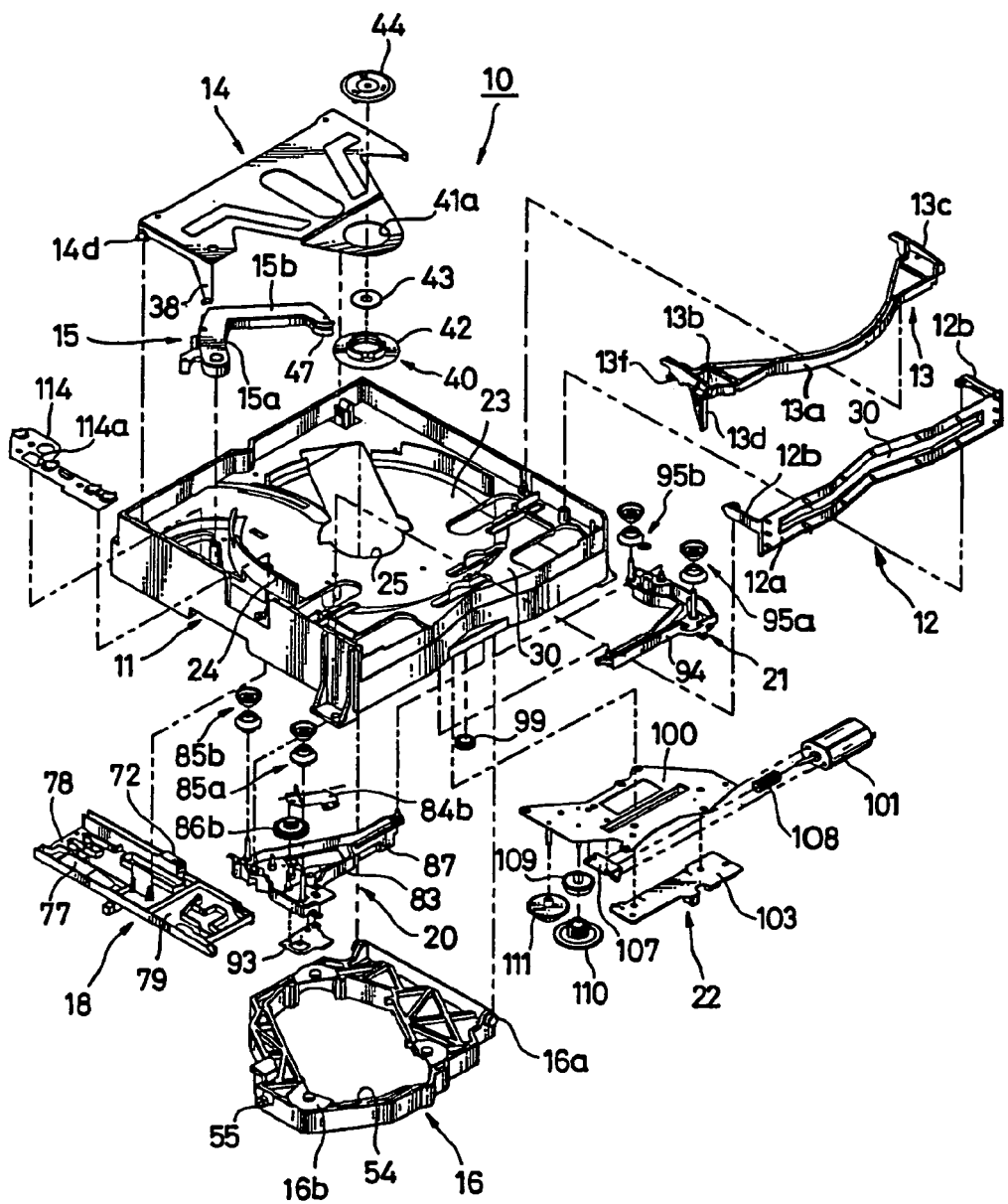
FIG. 5 is an exploded perspective view showing a recording and reproducing apparatus concerning a disk recording and/or reproducing apparatus according to an embodiment of the present invention.

As shown in FIG. 7, each of the fixed arms 12b, 12b of the gate member 12 has an insertion hole 12d and a positioning hole not shown in the figure. Corresponding to the insertion holes 12d and the positioning holes, as shown in FIG. 4, on the flat surface portion 11a of the main chassis 11 support convex portions 11h with tapped holes opened toward the upper end portion and positioning pins 11i are formed, respectively. The positioning pin 11i is fitted in the positioning hole and a set screw 34a is inserted into the insertion hole 12d which has been properly positioned to the support convex portion 11h and fixed, whereby the gate member 12 is fixed to the upper portion of the flat surface portion 11a of the main chassis 11.

Figure 8:
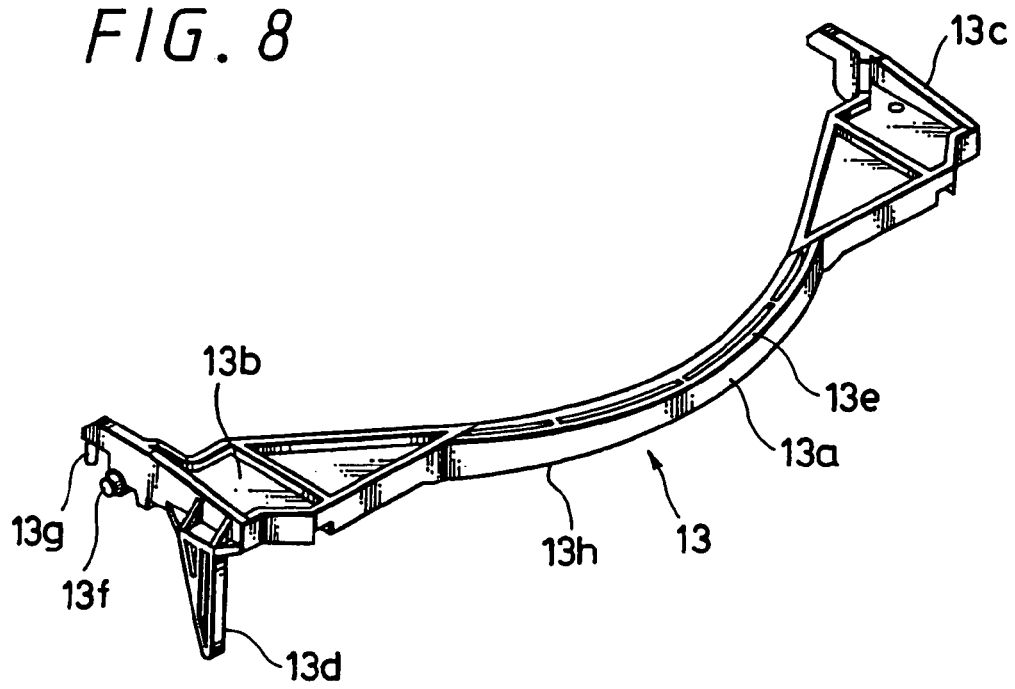
FIG. 8 is an enlarged perspective view showing an opening and closing shutter of the disk recording and reproducing apparatus shown in FIG. 5.

An opening and closing shutter 13 is provided at the rear of the gate member 12 such that the shutter can be freely elevated and lowered in the upper and lower direction Z (pivoted in the upper and lower direction). As shown in FIG. 8 in an enlarged-scale, the opening and closing shutter 13 is composed of: a shutter portion 13a which can open and close the disk entrance and exit slot 30 of the gate member 12 from the inside, left and right arm portions 13b, 13c integrally formed with the shutter portion 13a and extending from the respective ends of the shutter portion 13a in the longitudinal direction, and a drive lever 13d projecting downward from a tip end of the arm portion 13b. The shutter portion 13a is comprised of an arc-like rod body having a curved surface corresponding to the outer peripheral edge of the optical disk D and has a recess portion 13e formed in the longitudinal direction at the upper portion of its intermediate part in order to prevent a member disposed on upper portion from being in contact with the shutter portion 13a when the shutter is elevated (pivoted in the upper direction).

At the base end portions of the arm portions 13b, 13c of the opening and closing shutter 13A, there are provided a pair of pivoting shaft portions 13f projecting to the outside. The right and left pivoting shaft portions 13f are set on the same axis, and prolongations of the shutter portion 13a in the longitudinal direction are set to become approximately corresponding to the center of the respective pivoting shaft portions 13f. In order to pivotally support this opening and closing shutter 13, the second through-hole 26b and the fourth through-hole 26d of the flat surface portion 11a of the main chassis 11 have, as shown in FIG. 1, a pair of bearing portions 35a, 35b provided outside thereof to rotatably support the pair of pivoting shaft portions 13f.

Further, the shutter portion 13a of the opening and closing shutter 13 has a shutter guide portion 13h of a V-like or U-like shape with its center part recessed compared with the parts of pivoting shaft portion 13f on its lower surface (surface of the opposite side to the direction in which the shutter is moved when it is opened; and which is slidably contacts with the outer peripheral edge of the upper surface of the optical disk D).

As shown in FIG. 4, the left-hand bearing portion 35a of the flat surface portion 11a of the main chassis 11 has a through-hole 36a bored at its front part to pass through the drive lever 13d of the opening and closing shutter 13. An upwardly-projecting spring receiving protrusion is provided at a side adjacent to the left-hand bearing portion 35a and opposite to the through-hole 36a of this flat surface portion 11a, and one end of a compression coil spring 37 is engaged to this spring receiving protrusion. The other end of the compression coil spring 37 is engaged with a spring receiving protrusion 13g projecting downward at the end portion of the opposite side to the drive lever 13d of the arm portion 13b of the opening and closing shutter 13. Under spring force of this compression coil spring 37, the shutter portion 13a of the opening and closing shutter 13 is constantly forced in the direction of closing the disk entrance and exit slot 30.

As shown in FIG. 6, in the rear portion of the flat surface portion 11a of the main chassis 11, there are provided a pair of bearing portions 35c, 35d to pivotally support the chucking arm 14. The bearing portions 35c, 35d and the above-mentioned bearing portions 35a, 35b are each composed of a combination of a receiving member having a recess portion for upwardly supporting each bearing portion and a press member disposed outside the receiving member and which also has a claw portion projecting toward the recess portion side.

Figure 9:
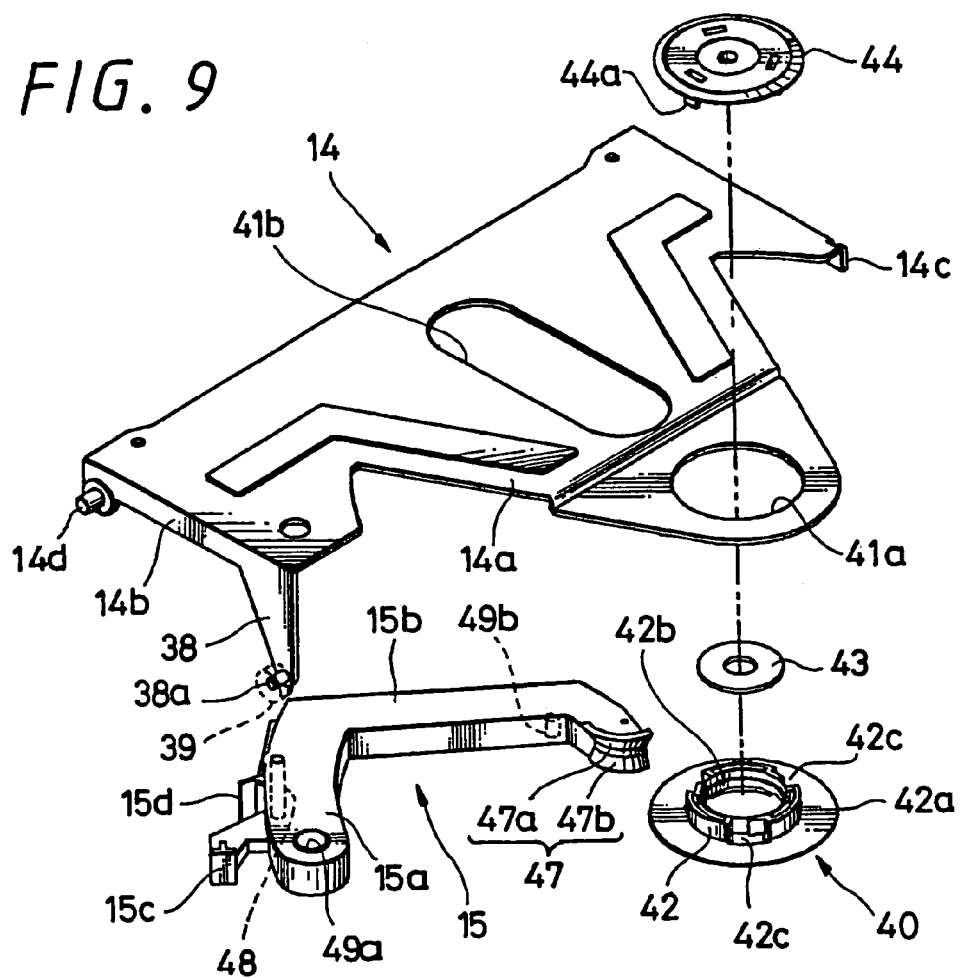
FIG. 9 is an enlarged exploded perspective view showing a chucking arm and support lever of the disk recording and reproducing apparatus shown in FIG. 5.

As shown in FIG. 9 in an enlarged-scale, the chucking arm 14 is formed of a triangular plate member having an arm portion 14a provided in its center and further has a pair of side surface portions 14b, 14c serving as reinforcement side surface portions as well, which are formed by bending a part of the side portions by 90 degrees in the same direction. At the rear portions of the pair of side surface portions 14b, 14c, a pair of shaft portions 14d each projecting in the lateral direction are provided in such a manner that these shaft portions have the same axis line. The pair of shaft portions 14d, 14d are rotatably supported by the pair of bearing portions 35c, 35d, whereby the chucking arm 14 is supported with respect to the main chassis 11 such that the chucking arm can be elevated and lowered in the upper and lower direction Z. This chucking arm 14 covers the upper rear portion of the disk installation portion 23 including the opening 25.

Figure 18:
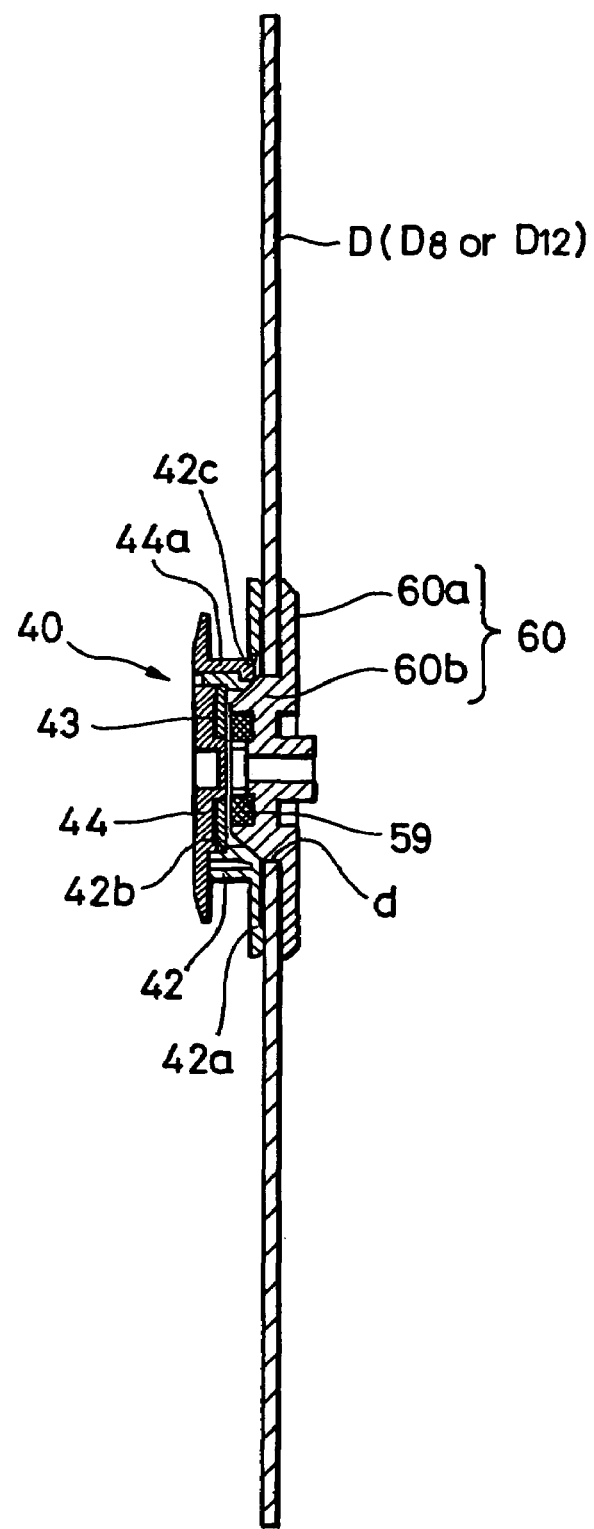
FIG. 18 is an enlarged explanatory view showing a cross section of a chuck member of the disk recording and reproducing apparatus shown in FIG. 5.

Further, at one side surface portion 14b of the chucking arm 14, there is provided a drive lever 38 which projects in the lower direction. The drive lever 38 has a shaft pin 38a projecting in the lateral direction at its tip end, and a roller 39 is rotatably supported by the shaft pin 38a. A through-hole 41a is bored through the tip end portion of the arm portion 14a of the chucking arm 14 so as to support a chucking member 40. The chucking member 40 supported by this through-hole 41a is comprised of: a chucking plate 42, a yoke 43 and a yoke press 44 as shown in FIG. 18.

The chucking plate 42 is shaped like an annular member that has an outward flange portion 42a formed at one surface of an annular core member. At the central portion of the chucking plate 42, there is provided a yoke housing portion 42b formed of an annular recess portion, and a disk-like yoke 43 made of a magnetic material e.g. an iron plate is detachably placed in the yoke housing portion 42b. Further, three recess holes 42c are formed at an equal interval in the circumferential direction on the outer peripheral surface of the core member of the chucking plate 42. Each recess hole 42c extends up to the flange portion and three base pieces 44a provided on the yoke press 44 are inserted into these recess holes 42c such that the three base pieces can be engage with and disengaged from the recess holes.

The three base pieces 44a of the yoke press 44 are located at an equal interval corresponding to the three recess portions 42c in the circumferential direction. Each base member 44a has at its tip end a pawl portion provided to hold the engagement state with the core material, and when the yoke press 44 is slightly moved and displaced in the circumferential direction with respect to the chuck plate 42, the base piece 44a and the recess hole 42c are engaged with or disengaged from each other according to the rotation direction.

In the state in which the chuck plate 42 and the yoke press 44 are engaged with each other, a space of a predetermined size is set between the flange portion 42a and the yoke press 44. Accordingly, the chucking member 40 can move by an amount corresponding to such space in the vertical direction perpendicular to the plane direction of the chucking arm 14. Further, a space of a predetermined size is also set between the core material of the chuck plate 42 and the through-hole 41a of the arm portion 14a. Accordingly, the chucking member 40 can also move in the plane direction of the chucking arm 14 by an amount corresponding to such space.

As shown in FIG. 1, the chucking arm 14 is forced by spring force of a chucking coil spring 45 in the direction in which the chucking arm is approaching the disk installation portion 23. Specifically, one end of the coil spring 45 is fixed to the other side surface portion 14c of the chucking arm 14 and the other end of the coil spring is fixed to the receiving portion provided on the flat surface portion 11a of the main chassis 11. An opening window 41b extending in the front and rear direction is formed at the rear of the through-hole 41a of the chucking arm 14. This opening window 41b is provided to visually confirm the state of the support lever 15 disposed under the chucking arm 14.

As shown in FIG. 9, the support lever 15 is comprised of: an arc-like circumferential-direction arm portion 15a, a radial-direction arm portion 15b continuing from one end of the circumferential-direction arm portion 15a in the radial-direction, a disk holding portion 47 provided at the tip end of the radial-direction arm portion 15b, a spring receiving portion 15c and a sensor operation piece 15d provided on the circumferential-direction arm portion 15a and a cam pin 48 fixed to the circumferential-direction arm portion 15a.

A bearing hole 49a is formed at one end of the circumferential-direction arm portion 15a of the support lever 15 along the longitudinal direction, and the support lever 15 is pivotally supported by a support shaft 50 fitted into this bearing hole 49a in the plane direction of the flat surface portion 11a of the main chassis 11. As shown in FIG. 6, the support shaft 50 is erected on the flat surface portion 11a, that is, at a side opposite to the opening 25 and outside the partition wall 24. A recess portion 24a through which the radial-direction arm portion 15b is inserted and ejected is provided in the partition wall 24 adjacent to the support shaft 50. In the flat surface portion 11a having this recess portion 24a, an arc-like guide groove 51a is provided having the support shaft 50 as a pivotal axis.

The guide groove 51a is provided to restrict movement of the support lever 15 and into which a protrusion 49b provided at a place adjacent to the disk holding portion 47 of the radial-direction arm portion 15b is inserted. The disk holding portion 47 of the support lever 15 is formed of a V-like groove portion having a V-like cross-section with an upper surface member 47a and a lower surface member 47b which are opened in the upper and lower directions, and an outer peripheral edge of the optical disk D is slidably in contact with the bottom of this V-like groove portion. The upper surface member 47a and the lower surface member 47b are both formed as arc-like members in order to maintain the state in which the optical disk D is in contact with the bottom of the V-like groove portion. As shown in FIG. 1, this disk holding portion 47 is constantly forced into the center part of the disk installation portion 23 under by spring force of a lever coil spring 52.

As shown in FIG. 1, one end of the coil spring 52 is supported by a receiving portion provided on the bearing portion 35c of the flat surface portion 11a and the other end is fixed to the spring receiving portion 15c of the support lever 15. The spring receiving portion 15c is provided in the vicinity of the bearing hole 49a of the circumferential-direction arm portion 15a so as to project in the outer direction. At the side opposite to the bearing hole 49a of the spring receiving portion 15c, an operation piece 15d projecting downward is provided. Further, the cam pin 48 is provided at the outside of the operation piece 15d such that the cam pin 48 may largely project in the lower direction. The cam pin 48 extends through the flat surface portion 11a to the rear surface side thereof, and an arc-like pin hole 51b is provided in the flat surface portion 11a in order to assure that this cam pin 48 can pivotally move.

Figure 2:
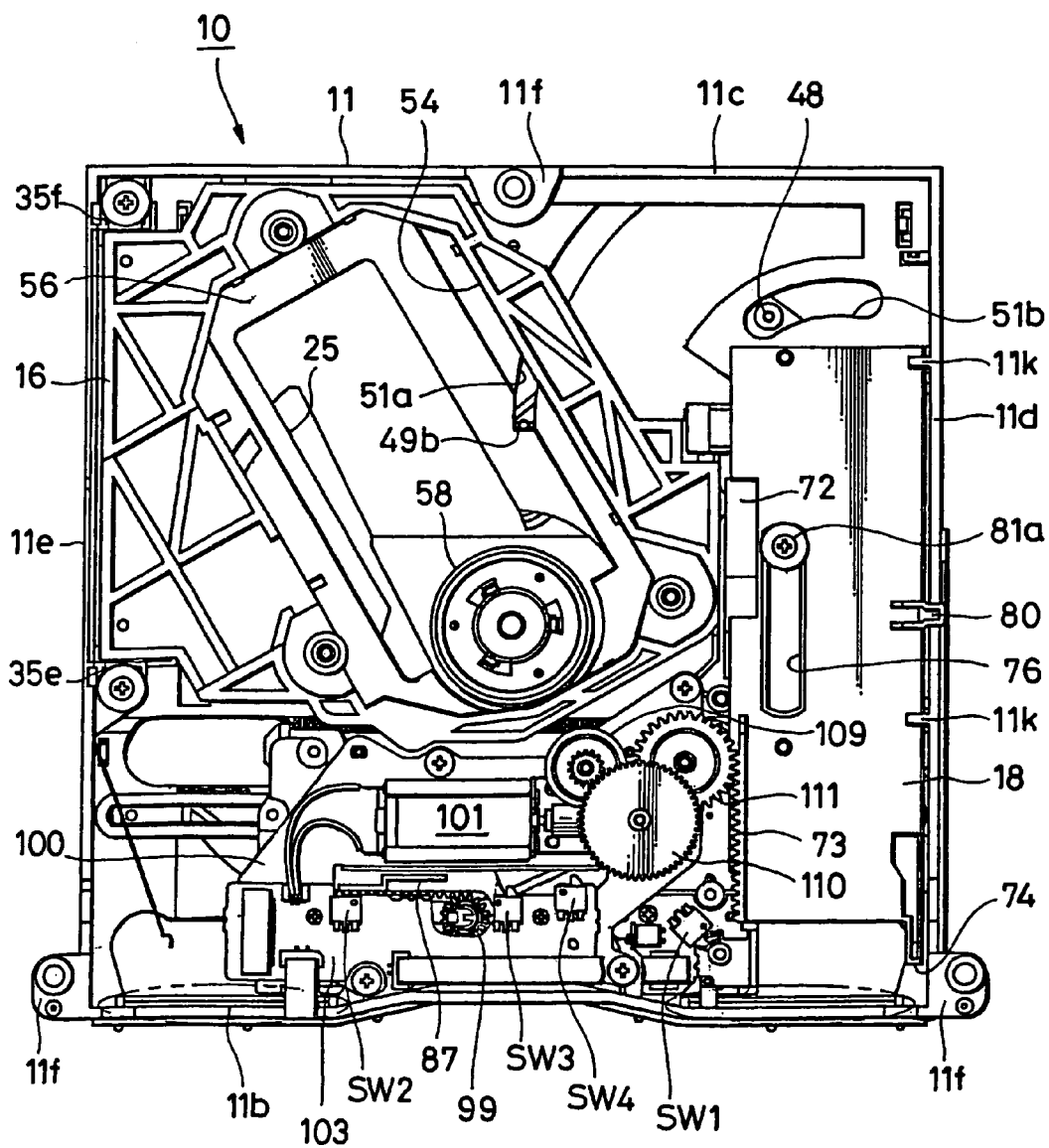
FIG. 2 is a bottom view showing a disk recording and reproducing apparatus concerning a disk recording and/or reproducing apparatus according to an embodiment of the present invention.

As shown in FIG. 2, the main chassis 11 has a pair of bearing portions 35e, 35f provided at a predetermined interval at the inside of its right side surface portion 11e in the front and rear direction X. The assembly body holder 16 is support by the bearing portions 35e, 35f at the rear portion of the back of the flat surface portion 11a such that the assembly holder body can be elevated and lowered in the upper and lower direction Z.

Figure 10:
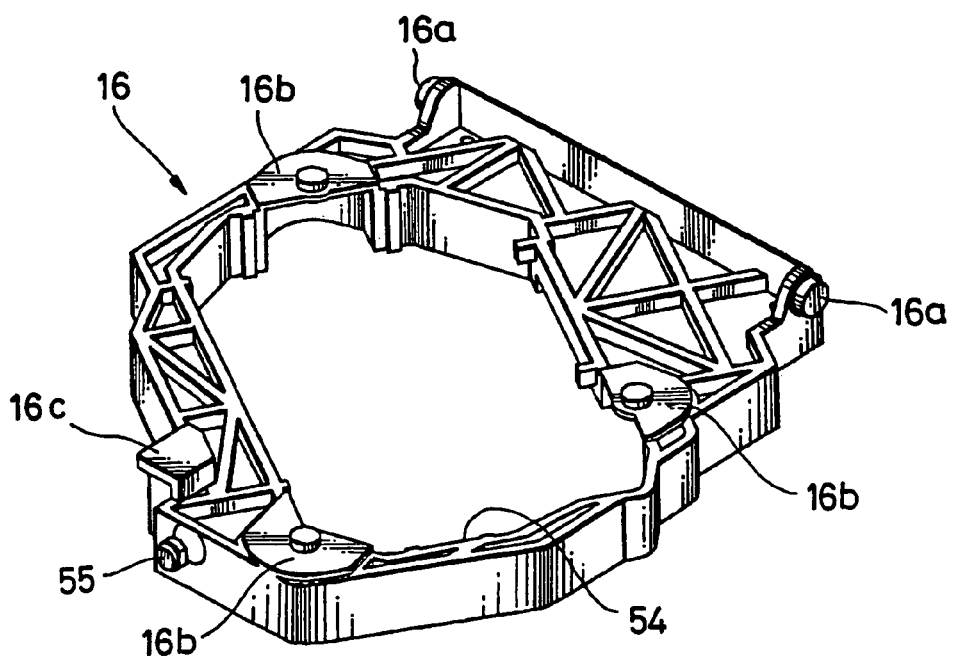
FIG. 10 is an enlarged perspective view showing an assembly body holder of the disk recording and reproducing apparatus shown in FIG. 5.

As shown in FIG. 10 in an enlarged-scale, the assembly body holder 16 is composed of a frame member having an opening 54 for the pickup table assembly body 17, and at its one side a pair of bearing portions 16a, 16a projecting to the outside, respectively are provided. The pair of bearing portions 16a, 16a are supported by the pair of bearing portions 35e, 35f, whereby the assembly body holder 16 can pivot in the upper and lower direction Z without restraint.

At the opposite side to the side in which the pair of shaft portions 16a, 16a are provided, the assembly body holder 16 has a cam protrusion 55 protruding in the direction perpendicular to the axis line connected by the pair of bearing portions 16a, 16a. The opening 54 of this assembly body holder 16 extends at a certain angle in the direction crossing the protruding direction of the cam protrusion 55. At the three positions of the outer edge of this opening 54, there are provided mount portions 16b to support the pickup table assembly body 17. Further, a stopper portion 16c is provided at a position adjacent to the cam protrusion 55 of the assembly body holder 16 to prevent the assembly body holder 16 from pivoting in the downward direction more than a predetermined amount.

Figure 11:
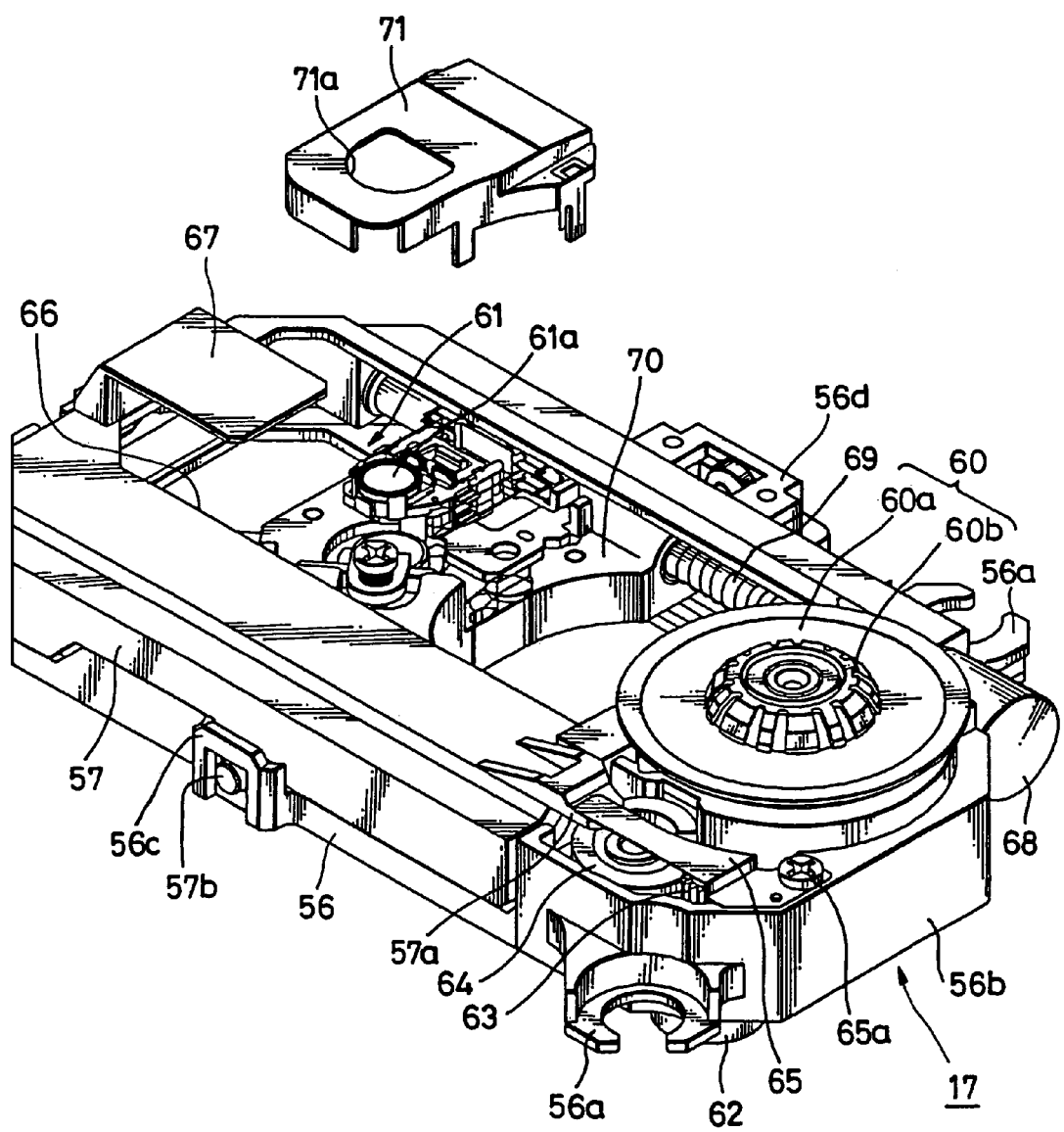
FIG. 11 is a perspective view showing an embodiment of a pickup table assembly body applied to the disk recording and reproducing apparatus shown in FIG. 5.

The pickup table assembly body 17 mounted on this assembly body holder 16 has a construction shown in FIG. 11. Specifically, the pickup table assembly body 17 comprises: a spindle chassis 56 to which a spindle motor 58 (see FIG. 2) with a turntable 60 for installing the optical disk D to record and reproduce an information signal is fixed, and a pickup chassis 57 for slidably supporting an optical pickup device 61 which shows a specific example of an optical pickup device for writing and reading an information signal on the optical disk D loaded on the turntable 60, and the like.

The spindle chassis 56 is formed of a frame-like member having a front surface portion, right and left surface portions and a rear surface portion. At the three positions of this spindle chassis 56, there are provided pawl-like support portions 56a having flat C-like shapes and being supported by the assembly body holder 16 through insulators not shown in figures. The spindle motor 58 is attached to the inside of a motor attachment mount 56b provided at the front surface portion of this spindle chassis 56 (see FIG. 2). A rotary shaft of this spindle motor 58 extends through the motor attachment mount 56b and projects above the spindle chassis 56, and the turntable 60 is fixed integrally to the projected portion of this rotary shaft.

As shown in FIG. 18, the turntable 60 includes a mount portion 60a on which a peripheral edge portion of a center hole d of the optical disk D is mounted and an engagement portion 60b which is engaged with the center hole d. The mount portion 60a of the turntable 60 has a disk-like shape having a diameter slightly larger than the center hole d of the optical disk D, and at the central portion thereof the engagement portion 60b is provided so as to project in the upper direction. This engagement portion 60b incorporates an annular magnet 59, thereby attracting the above-mentioned chucking member 40 to the turntable 60 with attraction force of this magnet 59. As a consequence, the optical disk D that has been loaded on the turntable 60 is held between the chucking member 40 and the turntable 60 to be integrated therewith in the rotating direction.

To the inside of the motor attachment mount 56b of the spindle chassis 56, there is attached a tilt motor 62 parallel to the spindle motor 58. A rotary shaft of the tilt motor 62 extends upwardly through the motor attachment mount 56b, and a tilt gear 63 is engaged and fixed to the upper end portion thereof. A gear portion of a tilt cam 64 is meshed with the tilt gear 63, and a cam protruded portion 57a provided on the pickup chassis 57 is opposed to a spiral cam surface formed on the upper surface of the tilt cam 64. The cam protruded portion 57a is pressed and brought in contact with the cam surface by a plate spring 65 fastened to the spindle chassis 56 by a fixing screw 65a.

At approximately central parts of both side surface portions of the spindle chassis 56 in the longitudinal direction, there are provided a pair of bearing portions 56c, 56d which are projecting in the lateral direction. A pair of shaft portions 57b, 57b provided on the pickup chassis 57 are fitted into the pair of bearing portions 56c, 56d, whereby the pickup chassis 57 can be supported to the spindle chassis 56 so that the pickup chassis can swing without restraint.

The pickup chassis 57 is formed of a frame-like member that can be laid over the upper portion of the spindle chassis 56. Inside the pickup chassis 57, there is supported the optical pickup device 61 such that the optical pickup device can move close to or away from the turntable 60. Then, on its upper surface of the pickup chassis 57, there is formed an opening 66 through which an optical head 61a of the optical pickup device 61 passes. At substantially central parts of the side surface portions of the pickup chassis 57 in the longitudinal direction, there are provided the pair of shaft portions 57b, 57b which are projecting to the outside in the state in which their axial lines may correspond to each other, respectively.

Further, the pickup chassis 57 has a douser 67 attached to the upper surface of its rear portion. This douser 67 covers the upper portion of the optical head 61a of the optical pickup device 61 to protect the objective lens of the device which has been moved to the outermost side of the optical disk. A feed motor 68 is attached to the front end portion of one side surface of this pickup chassis 57 by a fixing means such as attachment screws. A rotary shaft of the feed motor 68 is formed as a feed shaft 69 in which a spiral groove is formed on the outer peripheral surface, and a rear end portion of the feed shaft 69 is rotatably supported to the rear portion of this pickup chassis 57.

A guide shaft not shown in the figure is attached to the opposite side to the feed shaft 69 of the pickup chassis 57 in such a manner that the guide shaft may become parallel to the feed shaft 69. While being supported by this guide shaft, the optical pickup device 61 can move close to the turntable 60 or move away from the turntable 60 by rotation force of the feed shaft 69 in response to the rotation direction of the feed shaft. Thus, the optical pickup device 61 is provided with a slide member 70 through which the feed shaft 69 and the guide shaft are extended. This slide member 70 has a slide rack attached thereto, though not shown in the figure, and rack gears of this slide rack are meshed with screw grooves of the feed shaft 69.

The optical pickup device 61 includes a biaxial actuator that can independently move the objective lens of the optical head 61a in the focusing direction (upper and lower direction) and in the tracking direction (horizontal direction). This biaxial actuator is generally driven by electromagnetic force and can employ a plate spring system as a different supporting system of a movable portion. It is needless to say that other support systems such as a wire support system, a hinge system and a shaft slide system can also be applied. In the figure, reference numeral 71 denotes a biaxial cover which covers the biaxial actuator, and this biaxial cover 71 has an opening window 71*a* to expose the objective lens.

The pickup table assembly body 17 having the above-mentioned construction is mounted on the assembly body holder 16 and can be integrally pivoted in the upper and lower direction when the assembly body holder 16 is elevated in the upper direction or lowered in the lower direction. This operation of elevating and lowering the assembly body holder 16 is performed by an elevation cam mechanism comprising the cam protrusion 55 of the assembly body holder 16 and an elevation cam portion 72 provided on the cam plate 18.

Figure 16:
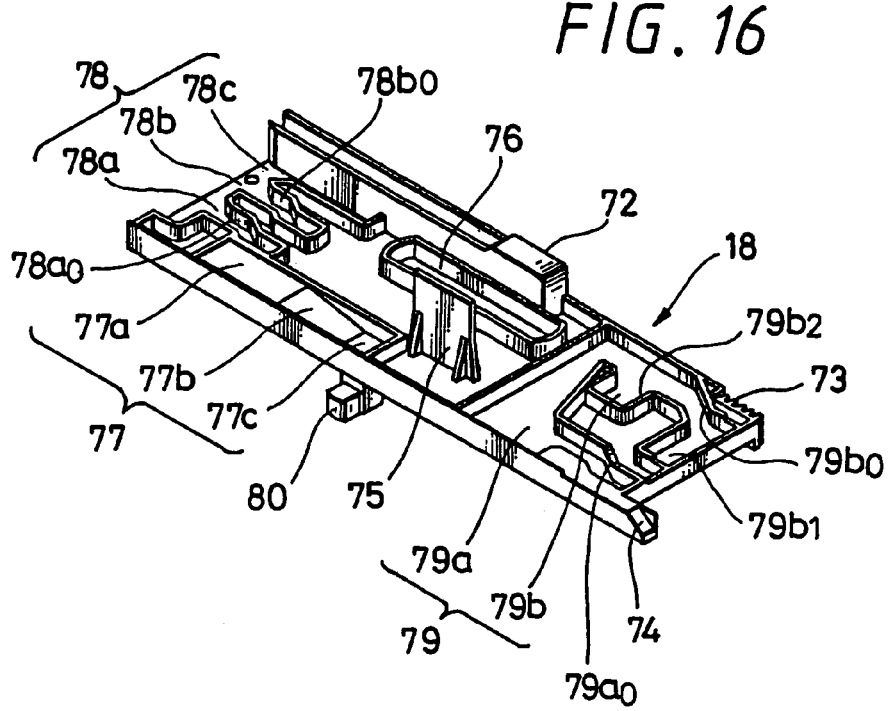
FIG. 16 is an enlarged perspective view showing a cam plate of the disk recording and reproducing apparatus shown in FIG. 5.
Figure 17:
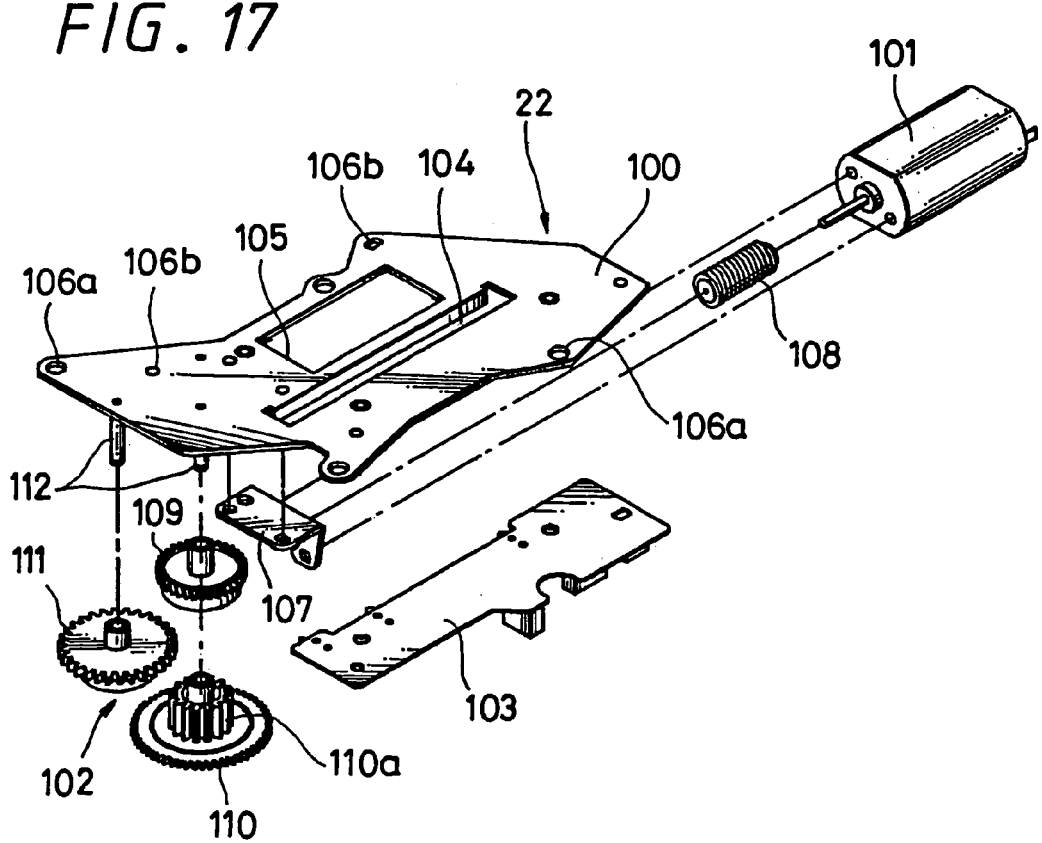
FIG. 17 is an enlarged exploded perspective view showing a chuck drive assembly of the disk recording and reproducing apparatus shown in FIG. 5.

As shown in FIG. 16, the cam plate 18 is formed of an approximately rectangular plate material and has the elevation cam portion 72 provided at an intermediate portion of one longer side edge of the width direction. At one end of the cam plate 18 in the longitudinal direction and which is the same longer side edge of the elevation cam portion 72, there is provided a rack portion 73 having gears extending along a predetermined range in the longitudinal direction. A cam protrusion portion 74 that opens and closes the above-mentioned opening and closing shutter 13 is formed at one end of the side in the longitudinal direction opposite to the side of the elevation cam portion 72 of the cam plate 18. At the intermediate portions in the longitudinal direction of the cam plate 18, there are provided a switch operation member 75 and a guide hole 76 which are extended by predetermined lengths.

At one end of the cam plate 18 in the longitudinal direction, there are provided a chucking cam portion 77 for elevating and lowering the above-mentioned chucking arm 14 and a lever cam portion 78 for controlling pivoting of the support lever 15. Further, at the other end of the cam plate 18 in its longitudinal direction, a roller cam portion 79 is provided to control operations of a pair of roller assembly bodies 20, 21 that will be described later on. The cam plate 18 has an operation protrusion 80 provided at the intermediate portion of the longer side edge opposite to the side of the elevation cam portion 72 to enable users to manually slide the cam plate 18.

The elevation cam portion 72 of the cam plate 18 has the construction shown in FIGS. 21A to 21D. Specifically, the elevation cam portion 72 is composed of an upper horizontal portion 72*a* projecting on the upper surface of the cam plate 18, an inclined portion 72*b* continued from one end of this upper horizontal portion 72*a* in the oblique lower direction and a lower horizontal portion 72*c* continued from the lower end of this inclined portion 72*b* in the horizontal direction on the lower surface of the cam plate 18. This cam plate 18 is supported on the lower surface of the flat surface portion 11*a* of the main chassis 11 such that the plate can linearly slide in the front and rear direction.

The guide hole 76 is formed on the cam plate 18 in order to maintain slide operations of this cam plate 18. A guide shaft portion 11*j* slidably engaged with this guide hole 76 is erected on the flat surface portion 11*a* of the main chassis 11. As shown in FIG. 2, the main chassis 11 also has a pair of support portions 11*k* provided at its side surface portion 11*d*. By means of holding one side of the longer sides of the cam plate 18 with the pair of support portions 11*k*, and fastening a washer screw 81*a* to a tapped hole provided on the tip end surface of the guide shaft portion 11*j* while the guide shaft portion 11*j* is fitted into the guide hole 76, the cam plate 18 is attached to the main chassis 11.

Figure 23A:
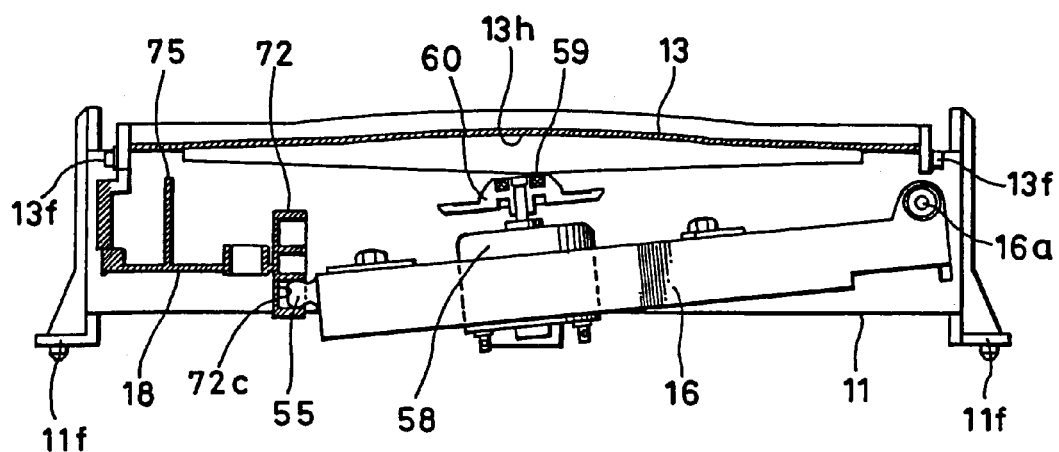

This cam plate 18 slides in the front and rear direction X, whereby the assembly body holder 16 is elevated and lowered. Specifically, as shown in FIGS. 21A and 21B, when the cam plate 18 is located at the most front portion of the main chassis 11, the cam protrusion 55 is positioned in the lower horizontal portion 72*c* located at the lowermost position of the elevation cam portion 72. Accordingly, as shown in FIGS. 23A and 23B, the assembly body holder is placed in the state in which its head is inclined in the forward direction, and therefore, in this case, the turntable 60 is placed in the standby state at the lower position.

Figure 27A:
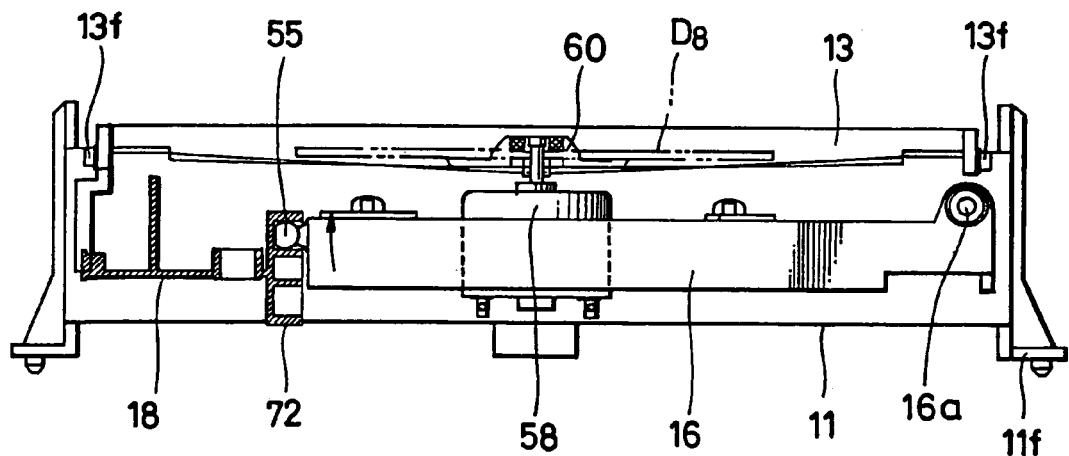
Figure 27B:
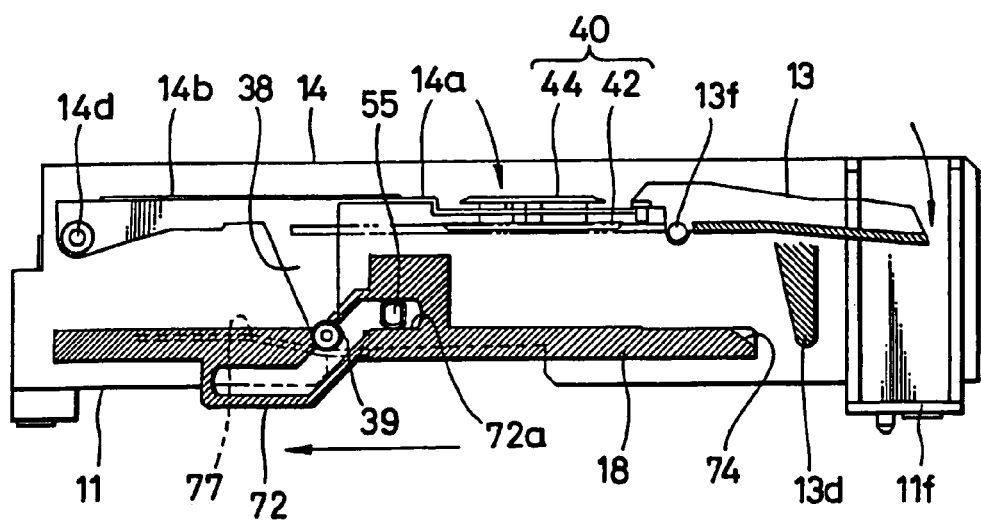

When the assembly body holder 16 is moved from this state through the intermediate position shown in FIG. 21C to the rearmost portion shown in FIG. 21D, the cam protrusion 55 moves to the upper horizontal portion 72*a* through the inclined portion 72*b* of the elevation cam portion 72. As a consequence, as shown in FIGS. 27A and 27B, the assembly body holder 16 is placed in an approximately horizontal state and the turntable 60 moves to the high position. At that time, the turntable 60 mounts thereon the optical disk D accommodated within the disk installation portion 23 and lifts up this optical disk D up to a predetermined height.

The chucking cam portion 77 of the cam plate 18 has the construction shown in FIG. 16 and other figures. Specifically, the chucking cam portion 77 is composed of an upper horizontal portion 77*a* extending in the longitudinal direction of the cam plate 18, an inclined portion 77*b* continued from the front side of this upper horizontal portion 77*a* and forwardly descending, and a lower horizontal portion 77*c* continued from the lower end of the inclined portion 77*b* and extending to the front side. The roller 39 rotatably supported by the drive lever 38 of the chucking arm 14 is, as shown in FIG. 23B and so forth, rotated and brought in contact with this chucking cam portion 77.

Figure 23B:
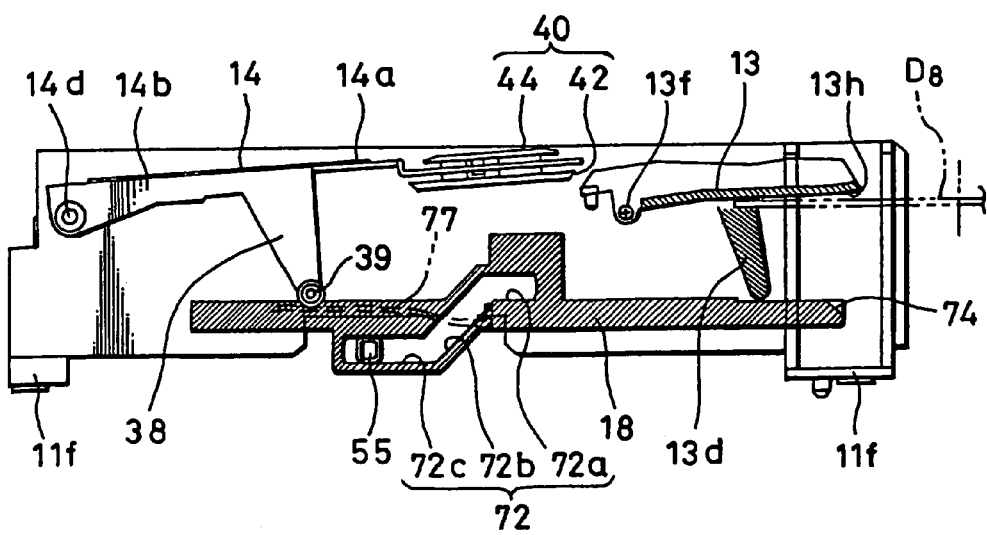

In this case, when the roller 39 is located at the upper horizontal portion 77*a* of the chucking cam portion 77, as shown in FIG. 23B and so on, the free end side of the chucking arm 14 is elevated so that the chucking member 40 is lifted to the higher position. As a consequence, the space above the disk installation portion 23 on which the disk is loaded is increased.

On the other hand, when the roller 39 moves to the lower horizontal portion 77*c* from the upper horizontal portion 77*a* through the inclined portion 77*b*, as shown in FIG. 27B and the like, the free end side of the chucking arm 14 is lowered so that the chucking member 40 is descended to the lower position. As a consequence, the chucking member 40 is placed in an approximately horizontal state and thereby is opposed to the turntable 60 lifted from the lower direction. At that time, when the optical disk D is accommodated within the disk installation portion 23, the optical disk D is held between the turntable 60 and the chucking member 40, thereby the optical disk D being chucked on the turntable.

The lever cam portion 78 of the cam plate 18 has the construction shown in FIGS. 16, 21A and so forth. Specifically, the lever cam portion 78 comprises: a first cam portion 78*a* for holding the disk holding portion 47 of the support lever 15 at the outer peripheral edge of the disk installation portion 23, a second cam portion 78*b* for holding the disk holding portion 47 at the intermediate part of the disk installation portion 23 in the radial direction, and a third cam portion 78*c* for holding the disk holding portion 47 at the inner peripheral edge of the disk installation portion 23. The first to third cam portions 78*a* to 78*c* are provided in the width direction of the cam plate 18 at a proper interval so that they may each extend in the longitudinal direction.

Further, the first to third cam portions 78a to 78c are linked to each other on the opposite side of the roller cam portion 79 of the cam plate 18, and the cam pin 48 of the support lever 15, which is engaged with this lever cam portion 78, can be selectively inserted to and ejected from those cam portions. The first and second cam portions 78a and 78b have escape portions $78a_0$ and $78b_0$ provided at their bottom portions to enable the disk holding portion 47 to escape from the optical disk D both at the outer peripheral edge and at the intermediate part in the radial direction of the disk installation portion 23 so that the optical disk D and the disk holding portion 47 can be prevented from slidably contacting with each other.

The roller cam portion 79 of the cam plate 18 has the construction shown in FIGS. 16, 21A and so forth. Specifically, the roller cam portion 79 comprises a large-diameter cam portion 79a and small-diameter cam portion 79b that can control the positions of the pair of roller assembly bodies 20, 21 in response to the diameter of the optical disk D. The large-diameter cam portion 79a and the small-diameter cam portion 79b are provided in the width direction of the cam plate 18 at a proper interval so that they may each extend in the longitudinal direction. Further, the large-diameter cam portion 79a and the small-diameter cam portion 79b are linked to each other at the side of the lever cam portion 78 of the cam plate 18, and a cam pin, which will be described later on, of the drive-side roller assembly body 20 which is engaged with the roller cam portion 79 can be selectively inserted to and ejected from the cam portions.

The large-diameter cam portion 79a of the roller cam portion 79 has an escape portion $79a_0$ provided at its bottom portion to enable a drive roller 85b and a fixed roller 95b, which will be described later on, to escape from the optical disk D accommodated within the disk installation portion 23 so that the optical disk D, and the drive roller 85b and the fixed roller 95b can be prevented from slidably contacting with each other. The small-diameter cam portion 79b has escape portions $79b_0$ and $79b_1$ provided at its intermediate portion and bottom portion to enable the rollers 85b, 95b to escape from the optical disk D so that the optical disk D and the rollers 85b, 95b can be prevented from slidably contacting with each other.

The escape portion $79b_1$ provided at the intermediate portion of the small-diameter cam portion 79b is applied to control the positions of the pair of roller assembly bodies 20, 21 when the small-diameter disk (e.g. disk having the diameter of 8 cm) $D_8$ is inserted into the disk recording and/or reproducing apparatus. When the large-diameter disk (e.g. disk having the diameter of 12 cm) $D_{12}$ is inserted into the recording and/or reproducing apparatus, the escape portion $79b_0$ provided at the bottom portion is applied to control the positions of the pair of roller assembly bodies 20, 21.

The pair of roller assembly bodies 20, 21 controlled in position by the roller cam portion 79 of the cam plate 18 having the above-mentioned construction have the following construction.

Figure 12:
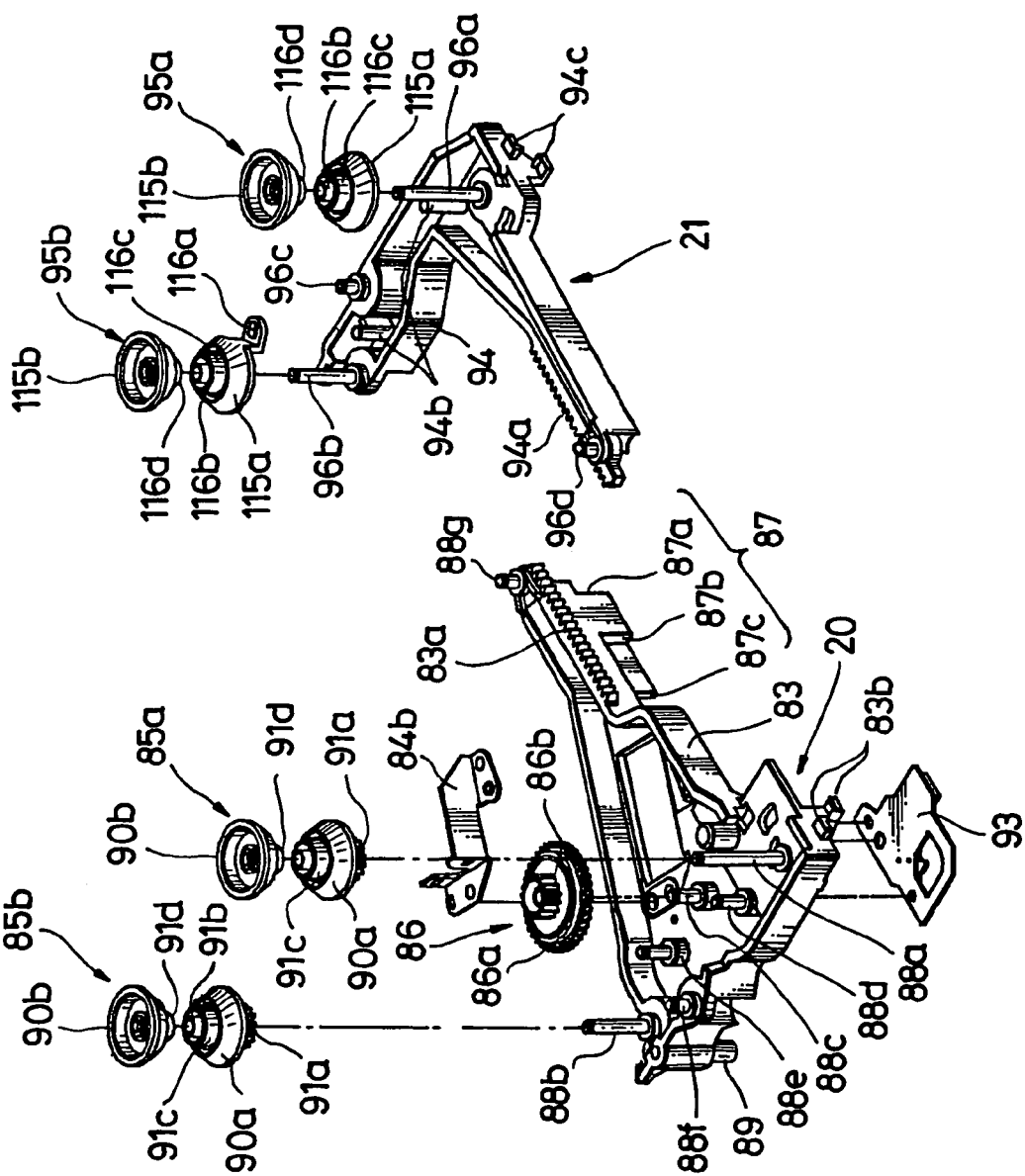
FIG. 12 is an enlarged perspective view showing a drive-side roller assembly body and a fixed-side roller assembly body of the disk recording and reproducing apparatus shown in FIG. 5.
Figure 13A:
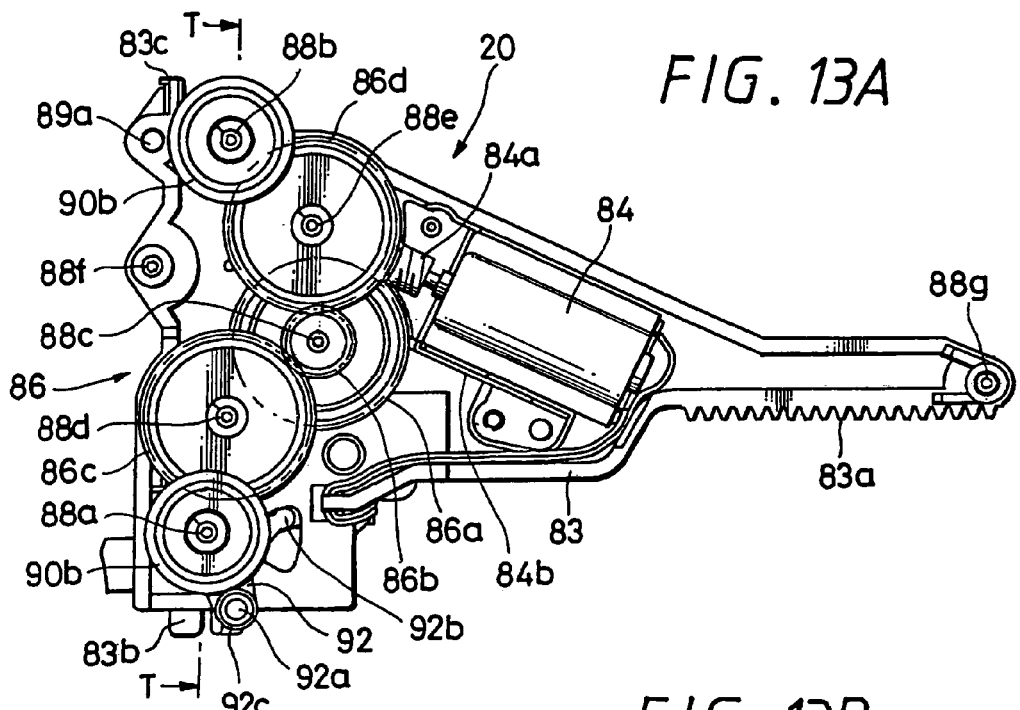

As shown in FIGS. 12, 13A and the other figures, one drive-side roller assembly body 20 comprises: a drive-side guide lever 83 serving as the first support member, a drive motor 84 which shows a specific example of the drive means mounted on this drive-side guide lever 83, a pair of drive rollers 85a, 85b which show a specific example of a first transport member rotatably attached to the drive-side guide lever 83, a first gear mechanism 86 for transmitting power of the drive motor 84 to the pair of drive rollers 85a, 85b to rotate the drive rollers in the same direction and the like.

The drive-side guide lever 83 of the drive-side roller assembly body 20 includes a roller support portion extending in the front and rear direction and an arm portion extending from one side of this roller support portion in the lateral direction, and the arm portion has a rack portion 83a whose gears are arranged in the right and left direction provided on its front surface. The rack portion 83a has an operation member 87 integrally provided at its bottom portion to turn on and turn off a second detection switch SW2, a third detection switch SW3 and a fourth detection switch SW4, which will be described later on, for detecting positions.

The operation member 87 has a crank-like flat surface and one end of the tip end side of the arm portion serves as a first operation portion 87a used to turn on and turn off the second detection switch SW2. Further, the intermediate bent portion of the operation member 87 serves as a second operation portion 87b used to turn on and turn off the third detection switch SW3. Then, the other end of the opposite side of the operation portion 87a of the operation member 87 serves as a third operation portion 87c used to turn on and turn off the fourth detection switch SW4.

The drive-side guide lever 83 has two roller support shafts 88a, 88b, three gear support shafts 88c, 88d, 88e, two guide pins 88f, 88g and one shaft pin 89a that are integrally implanted therein. Only the shaft pin 89a projects to the lower surface side of the drive-side guide lever 83 and a roller 89 is rotatably supported on its projected portion. This roller 89 is engaged with the roller cam portion 79 of the above-mentioned cam plate 18.

The first drive roller 85a is rotatably supported by the first roller support shaft 88a and the second drive roller 85b is rotatably supported by the second roller support shaft 88b. A worm wheel 86a is rotatably supported by the first gear support shaft 88c, and a small-diameter gear 86b is integrally formed with this worm wheel 86a. The small-diameter gear 86b is meshed with a first intermediate gear 86c and a second intermediate gear 86d in common. Then, the first intermediate gear 86c is rotatably supported by the second gear support shaft 88d and the second intermediate gear 86d is rotatably supported by the third gear support shaft 88e.

A worm 84a is meshed with the worm wheel 86a and this worm 84a is fixed to the rotary shaft of the drive motor 84. The drive motor 84 is fixed to the drive-side guide lever 83 through a motor base 84b by a fixing means such as a fixing screw. Rotation force of this drive motor 84 is transmitted from the worm 84a to the worm wheel 86a and the small-diameter gear 86b and also transmitted to the respective gear portions 85c, 85c of the pair of drive rollers 85a, 85b from this small-diameter gear 86b through the respective intermediate gears 86c, 86d. Accordingly, the pair of drive rollers 85a, 85b are forced to rotate by rotation of the drive motor 84.

The small-diameter gear 86b, the first and second intermediate gears 86c, 86d and the gear portion 85c are all formed of helical gears. Thus, noises generated when the first gear mechanism 86 is driven can be decreased.

Figure 13B:
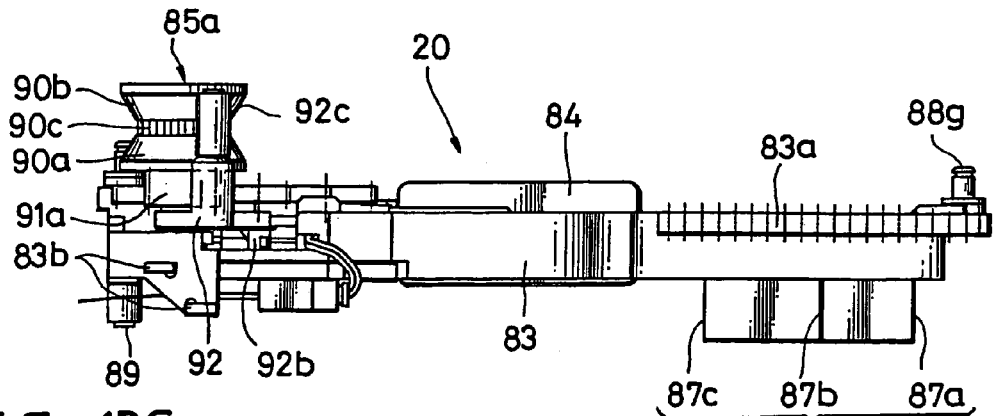
Figure 13C:
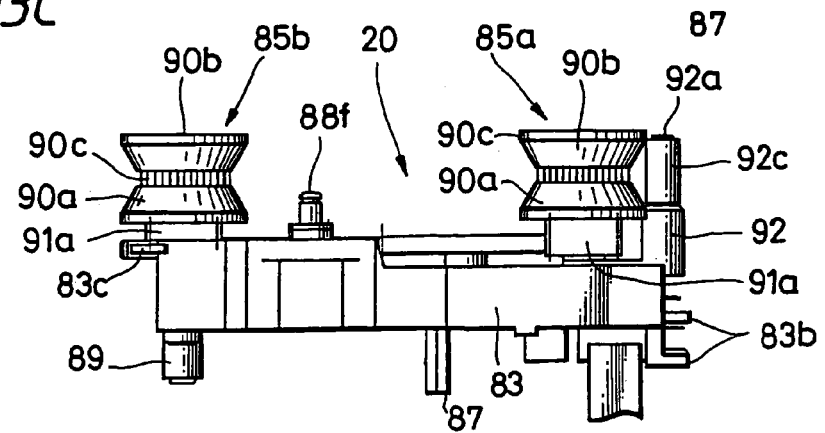
Figure 14:
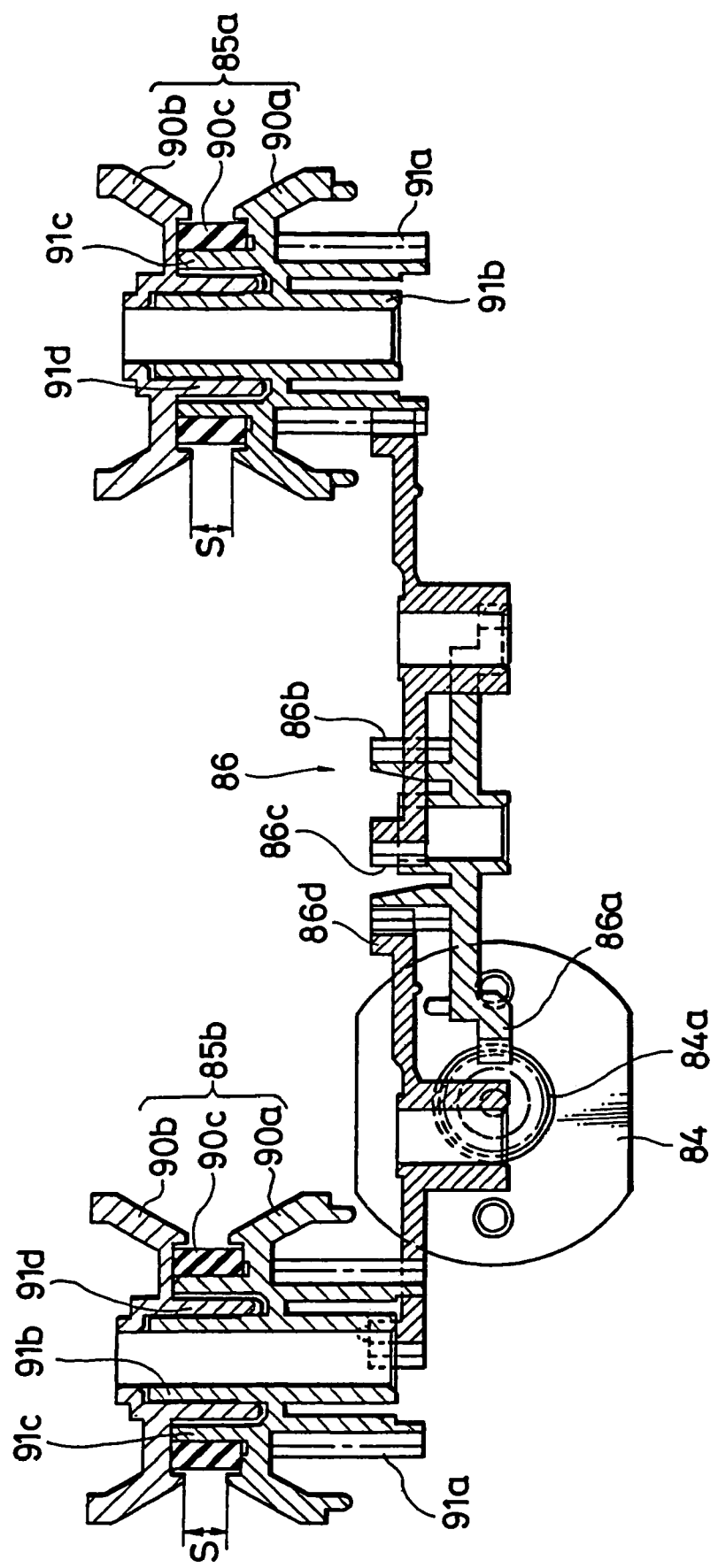
FIG. 14 is an enlarged explanatory cross-sectional view taken along the line T—T in the drive-side roller assembly body shown in FIG. 13A.

As shown in FIGS. 13B and 13C, the pair of drive rollers 85a, 85b project upwardly as compared with other assemblies such as the drive motor 84 and the intermediate gears 86c, 86d. As shown in FIG. 14 in a cross-sectional fashion, each of the drive rollers 85a, 85b comprises a drive member 90a, a rotating member 90b and a cushion member 90c. The drive member 90a is formed of an annular member whose upper surface is shaped as a conical tapered surface and has a gear portion 91a integrally formed at its lower surface. The rotating member 90b opposing the drive member 90a is formed of an annular member whose lower surface is shaped like an inverse conical tapered surface. A space that is slightly larger than the thickness of the optical disk D is provided between the drive member 90a and the rotating member 90b, and the annular cushion member 90c is provided at the bottom of its groove portion.

Each drive member 90a has a cylindrical inner shaft portion 91b provided at its center to receive the roller support shafts 88a, 88b and also has a cylindrical outer shaft portion 91c provided at its center to become coaxial with this inner shaft portion 91b. Then, a cylindrical shaft portion 91d provided on the rotating member 90b is inserted between the inner shaft portion 91b and the outer shaft portion 91c with an appropriate space so that they can relatively become rotatable. With a snap ring being engaged with the upper end portions of the roller support shafts 88a, 88b that extend through the drive member 90a and the rotating member 90b, the rotating member 90b can be prevented from being disengaged. The cylindrical cushion member 90c of the rubber-like resilient material made of suitable material such as rubber, soft plastics or the like is fitted to the outer shaft portion 91c of the drive member 90a.

The cushion member 90c should preferably be made of a material which is softer than the optical disk D and has larger friction resistance than the disk. This cushion member 90c is exposed from the space S between the drive member 90a and the rotating member 90b, and the outer peripheral edge of the optical disk D enters into this space S and comes in contact with the surface of the cushion member 90c. The outer peripheral edge of the optical disk D is pressed and brought in contact with the drive-side cushion member 90c to cause friction force between the outer peripheral edge and the cushion member 90c, thereby giving rotation force to the optical disk D. By the cooperation between rotation force of the drive-side cushion member 90c and friction force of a later described fixed-side cushion member 90c, the optical disk D is rotated.

As shown in FIGS. 13A to 13C, a detection member 92 is rotatably attached to the first roller support shaft 88a to detect whether the optical disk D is inserted or not. The detection member 92 includes a support shaft 92a upwardly projected outside the drive roller 85a in the diametrical direction and an operation pin 92b downwardly projecting outside the drive roller 85a in the diametrical direction as well. A guide roller 92c is rotatably supported by the support shaft 92a at approximately the same height as those of the drive-side and fixed-side cushion members 90c, 90c. The guide roller 92c and the operation pin 92b are disposed at the positions rotated by approximately 90 degrees to each other about the roller support shaft 88a.

Figure 19:
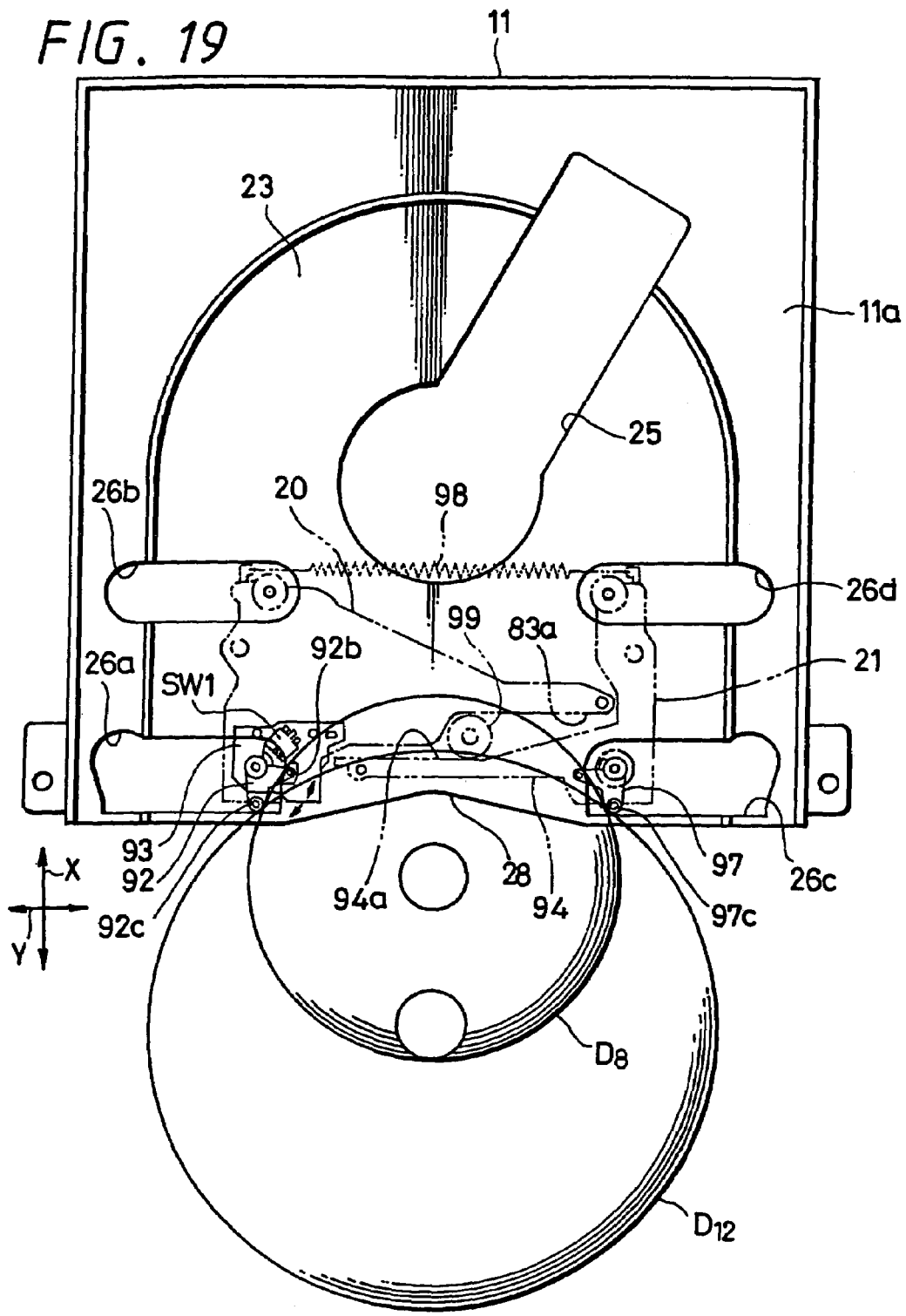
FIG. 19 is an explanatory diagram showing a relationship between a first detection switch and two kinds of optical disks after loading two kinds of optical disks having different diameters onto the disk recording and reproducing apparatus shown in FIG. 5.

The detection member 92 is forced with spring force of a torsion coil spring not shown in the figures, whereby the guide roller 92c is made to locate in front of the drive roller 85a. As shown in FIG. 19, corresponding to the operation pin 92b of this detection member 92, a first detection switch SW1, which detects whether the optical disk D is inserted or not from the disk entrance and exit slot 30, is attached to the drive-side guide lever 83.

The first detection switch SW1 and also the following second to eighth detection switches SW2 to SW8 are all change-over switches which is turned on and off. When the operation member is pressed, a signal indicating ON will be output, and when the depression of the operation member is released, a signal indicating OFF will be output.

The first detection switch SW1 is fixed to the lower surface of the drive-side guide lever 83 by screws through a printed-circuit board 93. The first detection switch SW1 is depressed to become ON state by the operation pin 92b that is forced by the spring force of the torsion coil spring. Specifically, when the optical disk D is inserted, the detection member 92 is rotated in the clockwise direction by the outer peripheral edge of the optical disk D (regardless of the large-diameter disk $D_{12}$ having the diameter of 12 cm or the small-diameter disk $D_8$ having the diameter of 8 cm as well) in FIG. 19, whereby the operation pin 92b presses the operation member to turn on the first detection switch SW1. Then, when the optical disk D is passed, the operation pin 92b is returned to the original state under spring force of the torsion coil spring, whereby the first detection switch SW1 is returned to OFF state.

Figure 15A:
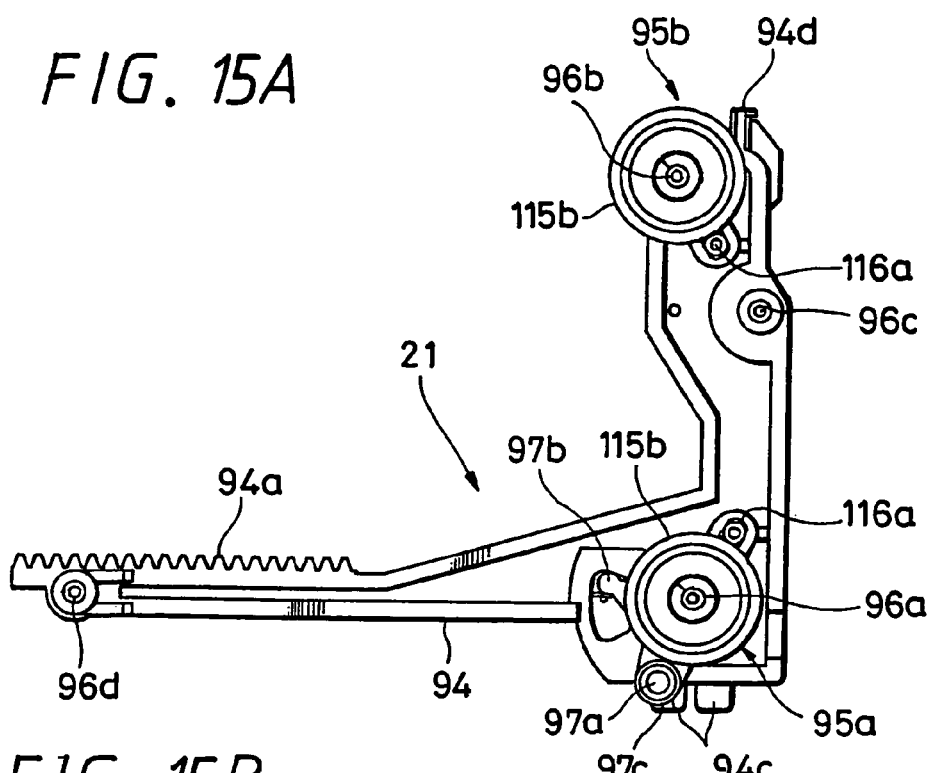

As shown in FIGS. 12, 15A and so forth, the fixed-side roller assembly body 21 includes a fixed-side guide lever 94 serving as a second support member, a pair of fixed rollers 95a, 95b which show a specific example of a second transport member attached to this fixed-side guide lever 94 and the like. The fixed-side guide lever 94 includes a roller support portion extending in the front and rear direction and an arm portion extending from one side of this roller support portion in the lateral direction. The arm portion has a rack portion 94a with its gears being provided at its rear surface in the right and left direction.

Further, two roller support shafts 96a, 96b and two guide pins 96c, 96d are implanted and integrally provided in the fixed-side guide lever 94. A first fixed roller 95a is fitted to the first roller support shaft 96a and a second fixed roller 95b is fitted to the second roller support shaft 96b. The pair of fixed rollers 95a, 95b are similar to the pair of drive rollers 85a, 85b, except that a fixed member is fixed to the fixed-side guide lever 94.

Specifically, each of the fixed rollers 95a, 95b is composed of a fixed member 115a, a rotating member 115b and a cushion member not shown in the figures. The fixed member 115a is formed of an annular member whose upper surface is shaped like a conical tapered surface and includes a base piece 116a to fix it to the fixed-side guide lever 94. These base pieces 116a are engaged with engagement pins 94b provided on the fixed-side guide lever 94. Each of the fixed rollers 95a, 95b is fixed to the fixed-side guide lever 94 by caulking the tip end portions of the respective engagement pins 94b.

The rotating member 115b opposing the fixed member 115a is formed of an annular member whose lower surface is shaped like an inverse conical tapered surface. A space S slightly larger than the thickness of the optical disk D is provided between the fixed member 115a and the rotating member 115b, and an annular cushion member 115c (see FIGS. 15A to 15C and it has a similar construction to that of the cushion member 90c of the drive rollers 85a, 85b) is provided at the bottom of a groove portion.

At the central part of each fixed member 115a, there are provided a cylindrical inner shaft portion 116b formed to receive roller support shafts 96a, 96b and a cylindrical outer shaft portion 116c formed to become coaxial with the inner shaft portion 116b. Then, a cylindrical shaft portion 116d provided on the rotating member 115b is inserted between the inner shaft portion 116b and the outer shaft portion 116c with a proper space to become rotatable relatively. With a snap ring being engaged with the upper end portions of the roller support shafts 96a, 96b which extend through the rotating members 115a and 115b, the rotating member 115b can be prevented from being disengaged.

A cylindrical cushion member 115c made of a rubber-like resilient material such as rubber, soft plastics or the like is fitted to the outer shaft portion 116c of the fixed member 115a. This cushion member 115c is exposed from a space between the fixed member 115a and the rotating member 115b. The outer peripheral edge of the optical disk D enters into this space and friction force generated between the outer peripheral edge and the fixed-side cushion member 115c gives rotation force to the optical disk D.

The drive-side roller assembly body 20 having the above-mentioned construction is slidably supported at the lower part of the front side of the flat surface portion 11a of the main chassis 11 in the right and left direction Y. At that time, as shown in FIG. 1, the first drive roller 85a and the guide roller 92c of the drive-side roller assembly body 20 project upwardly from the first roller through-hole 26a of the flat surface portion 11a, and the second drive roller 85b projects upwardly from the second roller through-hole 26b.

Then, a first guide pin 88f projects upwardly from the first guide oblong hole 27a and a second guide pin 88g projects upwardly from the second guide oblong hole 27b. The respective guide pins 88f, 88g can be prevented from being disengaged from the respective guide oblong holes 27a, 27b with snap rings being engaged with the upper end portions of the respective guide pins.

Further, as shown in FIGS. 13A to 13C, on the front of the drive-side guide lever 83, there are provided a pair of holding pieces 83b, 83b at a predetermined distance in the upper and lower direction such that the pieces may be slightly shifted in the right and left direction. The pair of holding pieces 83b, 83b are slidably engaged with the guide rail 11m provided on the inner surface of the front surface portion 11b of the main chassis 11. The drive-side guide lever 83 is provided with a spring receiving piece 83c. The fixed-side roller assembly body 21 is disposed so as to oppose the drive-side roller assembly body 20 in the right and left direction Y.

Figure 15B:
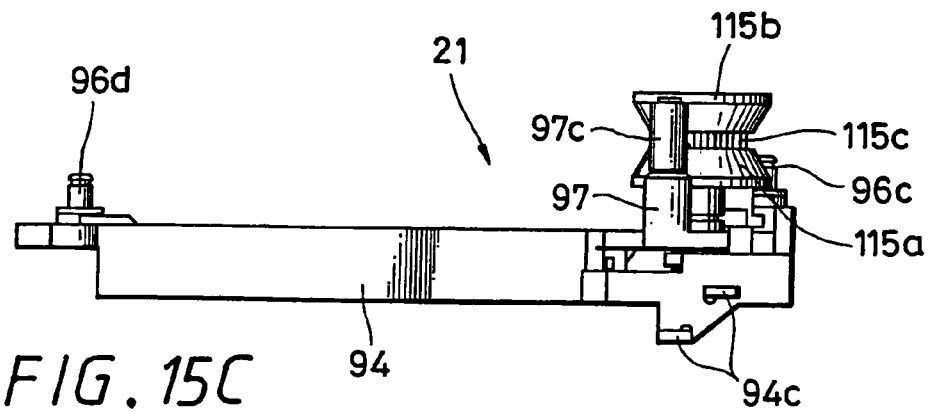
Figure 15C:
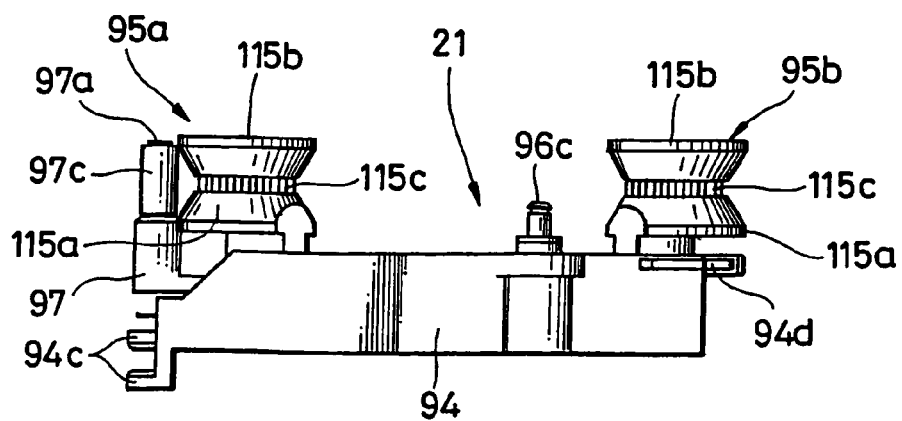

As shown in FIGS. 15A to 15C, a balance member 97 for keeping a balance with the detection member 92 of the drive-side roller assembly body 20 is rotatably attached to the first roller support shaft 96a. This balance member 97 includes a support shaft 97a upwardly projecting outside in the diametrical direction of the fixed roller 95a and also a pin 97b projecting downward outside in the diametrical direction of the fixed roller 95a. Then, a guide roller 97c is rotatably supported by the support shaft 97a at substantially the same height as that of the fixed-side cushion member. The guide roller 97c and the pin 97b are disposed at the positions rotated by approximately 90 degrees about the roller support shaft 96a. This balance member 97 is forced under spring force of a torsion coil spring not shown in the figures, whereby the guide roller 97c is disposed in front of the drive roller 95a.

The fixed-side roller assembly body 21 having the above-mentioned construction is slidably supported at the lower part of the front side of the flat surface portion 11a of the main chassis 11 in the right and left direction Y. At that time, as shown in FIG. 1, the first fixed roller 95a and the guide roller 97c of the fixed-side roller assembly body 21 project upwardly from the third roller through-hole 26c of the flat surface portion 11a, and the second roller 95b projects upwardly from the fourth roller through-hole 26d.

The first guide pin 96c projects upwardly from the third guide oblong hole 27c and the second guide pin 96d projects upwardly from the fourth guide oblong hole 27d. Then, snap rings being engaged with the upper end portions of the respective guide pins 96c, 96d can prevent these guide pins from being disengaged from the respective guide oblong holes 27c, 27d.

Further, as shown in FIGS. 15A to 15C, a pair of holding pieces 94c, 94c are provided at the front of the fixed-side guide lever 94 at a predetermined distance in the upper and lower direction and with a small displacement in the right and left direction Y The pair of holding members 94c, 94c are slidably engaged with the guide rail 11m formed on the inner surface of the front surface portion 11b of the main chassis 11. The fixed-side guide lever 94 is provided with a spring receiving piece 94d, and one end of a tension coil spring 98 which shows a specific example of a resilient member is fixed to this spring receiving piece 94d. The tension coil spring 98 is extended in the right and left direction X and thereby fixed to the spring receiving member 83c provided on the drive-side guide lever 83. Under spring force of the tension coil spring 98, the drive-side roller assembly body 20 and the fixed-side roller assembly body 21 are forced in the direction in which they become close to each other.

Between the drive-side roller assembly body 20 and the fixed-side roller assembly body 21, there is disposed a drive gear 99 which is simultaneously meshed with the rack portion 83a of the drive-side guide lever 83 and the rack portion 94a of the fixed-side guide lever 94. The drive gear 99 is rotatably supported on the lower surface of the flat surface portion 11a of the main chassis 11 and is meshed with the rack portion 94a and the rack portion 83a so as to be held from the front and rear direction.

Accordingly, in FIG. 19, when the drive gear 99 rotates in the counter-clockwise direction, the drive-side roller assembly body 20 and the fixed-side roller assembly body 21 move in the direction in which they move away from each other against spring force of the tension coil spring 98. Conversely, when the drive gear 99 rotates in the clockwise direction, the drive-side roller assembly 20 and the fixed-side roller assembly 21 move in the direction in which they become close to each other.

As shown in FIG. 2, the chuck drive assembly body 22 is disposed under the two roller assembly bodies 20, 21 so as to cover both of the roller assembly bodies. The chuck drive assembly body 22 has an construction shown in FIG. 17 and so on. Specifically, the chuck drive assembly body 22 comprises: a base plate 100 fixed by a suitable fixing means such as set screws to the rear surface of the flat surface portion 11a of the main chassis 11 with a space to house the drive-side and fixed-side roller assembly bodies 20, 21, a second drive motor 101 mounted on this base plate 100, a second gear mechanism 102, a second printed-circuit board 103 and the like.

At an approximately centre part of the base plate 100, there are provided an oblong hole 104 formed to receive the operation portion 87 of the above-mentioned drive-side guide lever 83 and an opening hole 105 formed to accommodate therein part of the drive motor 101. Further, the base plate 100 has four attachment holes 106a and two positioning holes 106b bored thereon by which the base plate 100 is properly positioned at the predetermined location and attached by set screws of a predetermined number. Thus, the operation member 87 is inserted into the oblong hole 104 extended in the right and left direction Y and the lower end portion of the operation member is projected to the lower surface of the base plate 100.

The second drive motor 101 is fixed to a bracket 107 by screws, and the motor 101 is attached to the base plate 100 by fastening this bracket 107 with set screws. A worm 108 is fixed to a rotary shaft of the drive motor 101, and a worm wheel 109 is meshed with the worn 108. A small-diameter gear not shown in the figure is integrally provided with the worm wheel 109, and a third intermediate gear 110 is meshed with the small-diameter gear. The third intermediate gear 110 has a small-diameter gear 110a integrally provided therewith and a small-diameter gear, not shown in the figure, of an output gear 111 is meshed with the small-diameter 110a.

The output gear 111 of the chuck drive assembly body 22 is meshed with the rack portion 73 of the above-mentioned cam plate 18. With the rotation of the drive motor 101 of this chuck drive assembly body 22, the cam plate 18 is guided by the guide shaft 11j and the like of the main chassis 11, thereby being moved forwardly or backwardly in the front and rear direction X of the main chassis 11. The worm wheel 109, the intermediate gear 110 and the output gear 111 are pivotally supported by three gear support shafts 112 fixed to the base plate 100, respectively.

The second printed-circuit board 103 is fixed by screws to the front part of lower surface similarly to the drive motor 101 of the base plate 100. As shown in FIG. 2 and the other figures, on the printed-circuit board 103 there are mounted three detection means including the second detection switch SW2, the third detection switch SW3 and the fourth detection switch SW4 and various kinds of electronic components necessary for supplying power to these detection switches SW2 to SW4, the drive motor 101 and the like and controlling operations thereof.

Figure 20:
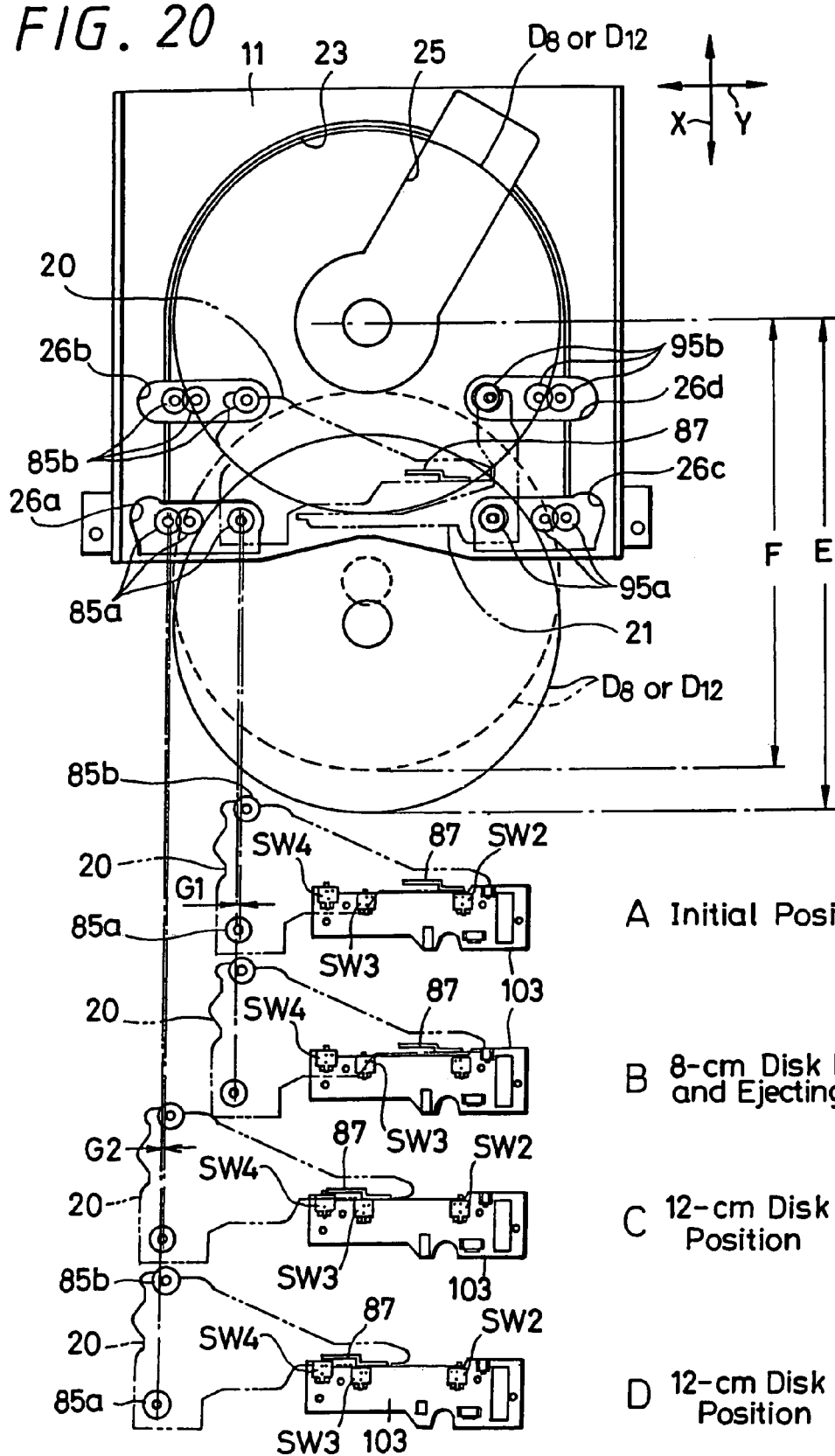
FIG. 20 is an explanatory diagram showing a relationship between second, third and fourth detection switches and the drive-side roller assembly body after loading two kinds of optical disks having different diameters onto the disk recording and reproducing apparatus shown in FIG. 5.

As shown in FIG. 20, the three detection switches SW2 to SW4 are applied to detect the place of the drive-side roller assembly body 20 which moves in the right and left direction Y in response to the position of the optical disk D passing through the disk entrance and exit slot 30. Based on the detected results of the three detection switches SW2 to SW4 whether the optical disk D exists in the disk installation portion or in the disk ejection portion can be detected in response to the size of the optical disk D ($D_{12}$ or $D_8$).

In FIG. 20, reference letter E represents the loading start position of the optical disk D. When the optical disk D is inserted up to this position by the user, the loading mechanism starts loading operation which will be described later on so that the optical disk D is automatically pulled in and loaded onto the disk loading portion. Reference letter F represents the ejection completion position of the optical disk D. When the user operates the ejection button, the loading mechanism executes the ejection operation to eject the optical disk D so that the optical disk D is automatically sent out to this position.

In the same figure, the position shown by reference letter A represents the initial position of the drive-side roller assembly body 20. Before the optical disk D is inserted into the apparatus from the disk entrance and exit slot 30, the drive-side roller assembly body 20 is located at this position. At that very moment, the first operation portion 87a of the operation body 87 provided on the drive-side guide lever 83 is brought in contact with the second detection switch SW2 so that the second detection switch SW2 is placed in the ON state.

The position shown by reference letter B represents the loading position and ejection position of the small-diameter disk $D_8$ when the small-diameter disk $D_8$ having the diameter of 8 cm of the optical disk D is in use. In the case where the small-diameter disk $D_8$ is used, the drive-side roller assembly body 20 is located at the illustrated position both in the disk loading mode in which the small-diameter disk $D_8$ is inserted into the apparatus from the disk entrance and exit slot 30 and in the disk ejection mode in which the small-diameter disk $D_8$ is ejected from the apparatus from the disk entrance and exit slot.

This loading and ejection position is set to the position slightly outside compared with the initial position A in FIG. 20. When the disk is loaded, the small-diameter disk $D_8$ rotates. Therefore, this difference of the position is set in order that the pair of drive rollers 85a, 85b and the fixed rollers 95a, 95b are kept away from the small-diameter disk $D_8$, thereby preventing the rollers from contacting with each other. At that very moment, the first operation portion 87a of the operation body 87 is released from the second detection switch SW2 and three detection switches, that is, second to fourth SW2 to SW4 are all turned off.

The position shown by reference letter C represents the position at which the large-diameter disk $D_{12}$ is ejected when the large-diameter disk $D_{12}$ having the diameter of 12 cm of the optical disk D is in use. In the case where this large-diameter disk $D_{12}$ is used, when the large-diameter disk $D_{12}$ is ejected from the disk entrance and exit slot 30, the drive-side roller assembly body 20 is located at the illustrated position. At that very moment, the second operation portion 87b of the operation member 87 is brought in contact with the third detection switch SW3 so that only the third detection switch SW3 is placed in the ON state and other detection switches SW2, SW4 are maintained in the OFF state.

Further, the position shown by reference letter D represents the position at which the large-diameter disk $D_{12}$ is loaded onto the apparatus when the large-diameter disk $D_{12}$ is in use. At that time, when the large-diameter disk $D_{12}$ is inserted from the disk entrance and exit slot 30 and reached to the disk loading portion, the drive-side roller assembly body 20 is located at the illustrated position. At that very moment, the second operation portion 87b of the operation member 87 continuously presses the third detection switch SW3 and the third operation portion 87c is brought in contact with the fourth detection switch SW4. Accordingly, the third detection switch SW3 and the fourth detection switch SW4 are both placed in the ON state and then the first detection switch SW2 is maintained in the OFF state.

Further, as shown in FIG. 21, in order to detect the pivoting position of the above-mentioned support lever 15 there is provided a fifth detection switch SW5, and in order to detect the position where the above-mentioned cam plate 18 is located in the front and rear direction X there are provided a sixth detection switch SW6, a seventh detection switch SW7 and an eighth detection switch SW8. As shown in FIG. 6 and so forth, the fifth to eighth detection switches SW5 to SW8 are attached to a third printed-circuit board 114.

The third printed-circuit board 114 is provided to supply power to the fifth to eighth detection switches SW5 to SW8 and other electronic components, and to send and receive signals or the like; and has electronic components such as connectors mounted thereon. This printed-circuit board 114 is positioned and by screws fixed to a shelf portion 11n formed at the left side portion in the flat surface portion 11a of the main chassis 11.

On the printed-circuit board 114, there are provided a through-hole 114a bored to let the drive lever 38 of the chucking arm 14 thrust downwardly and a fitting hole 114b bored to fit the support shaft 50 of the main chassis 11 thereto. The fifth detection switch SW5 is attached to the end portion of the printed-circuit board 114 on the side of the pin hole 51b formed on the flat surface portion 11a, and the sixth to eighth detection switches SW6 to SW8 are attached to the inner edge portion of the shelf portion 11n.

The fifth detection switch SW5 is attached in the state in which its operation member is faced to the side of the pin hole 51b and turned on and off by the operation piece 15d of the support lever 15. The sixth to eighth detection switches SW6 to SW8 are attached in such a manner that their operation members project to the inner edge of the shelf portion 11n. An upper end edge of the switch operation portion 75 whose upper end portion projects above the printed-circuit board 114 is opposed to these operation members and the three detection switches SW6 to SW8 are turned on and off by this switch operation portion 75.

The sixth and seventh detection switches SW6, SW7 are applied to detect whether the optical disk D is to be inserted into the apparatus or ejected from the apparatus. Thus, by visually confirming the on- and off-states of the two detection switches SW6, SW7, it is possible to detect the direction in which the optical disk D may move.

As shown in FIGS. 21A, 21B, when the cam plate 18 is located at the most front end, the two detection switches SW6, SW7 are turned on by the switch operation portion 75. In this state, when the optical disk D is inserted and the switch operation portion 75 is moved rearward, first, the sixth detection switch SW6 is turned off and then the seventh detection switch SW7 is turned off. By detecting the states of the two detection switches, it is possible to detect that the optical disk D is being inserted into the apparatus.

When on the other hand the optical disk D is completely inserted into the apparatus and located in the disk loading portion, the two detection switches SW6, SW7 are both turned off. In this state, when the user selects the ejecting operation so that the optical disk D is moved toward the disk entrance and exit slot 30, the switch operation portion 75 moves in the forward direction. Consequently, as shown in FIG. 21C, first, the seventh detection switch SW7 is turned on and then the sixth detection switch SW6 is turned on. By detecting the states of these two detection switches, it is possible to detect that the optical disk D is being ejected from the apparatus.

The eighth detection switch SW8 is applied to detect that the optical disk D is completely inserted into the apparatus and located at the disk loading portion. As shown in FIG. 21D, when the cam plate 18 is moved in the rearmost portion, the eighth detection switch SW8 is turned on by the switch operation portion 75. In this state, when the user operates the ejection button, the loading mechanism executes the ejecting operation to eject the optical disk D from the disk entrance and exit slot 30.

While as the material for the above-mentioned main chassis 11, gate member 12 and assembly body holder 16, for example, ABS (acrylonitrile butadiene styrene resin) and AS (acrylonitrile styrene resin) are preferable, it is needless to say that they can be made of other engineering plastics and metals such as aluminum alloy. While the opening and closing shutter 13, support lever 15, cam plate 18, drive-side guide lever 83, fixed-side guide lever 94, drive rollers 85a, 85b and fixed rollers 95a, 95b should most preferably be made of POM (polyacetal), for example, it is needless to say that they can be made of other engineering plastics and metals such as aluminum alloy.

Moreover, while the chucking arm 14 and the base plate 100 should most preferably be made of metals such as stainless steel, for example, it is needless to say that they can be made of ABS, AS and other engineering plastics.

The above-described drive-side guide lever 83, rack portion 83a, fixed-side guide lever 94, rack portion 94a, tension coil spring 98 and drive gear 99 constitute a space adjusting mechanism that can adjust a space by making a pair of transport members become close to or away from each other in response to the size of the optical disk D (diameter of the disk-like recording medium). The roller cam portion 79 and roller 89 constitute a disk selecting cam mechanism that controls an adjustment amount of the space adjusting mechanism. Further, the cam plate 18, drive lever 13, second drive motor 101, second gear mechanism 102 and output gear 111 constitute a shutter opening and closing mechanism.

Figure 44:
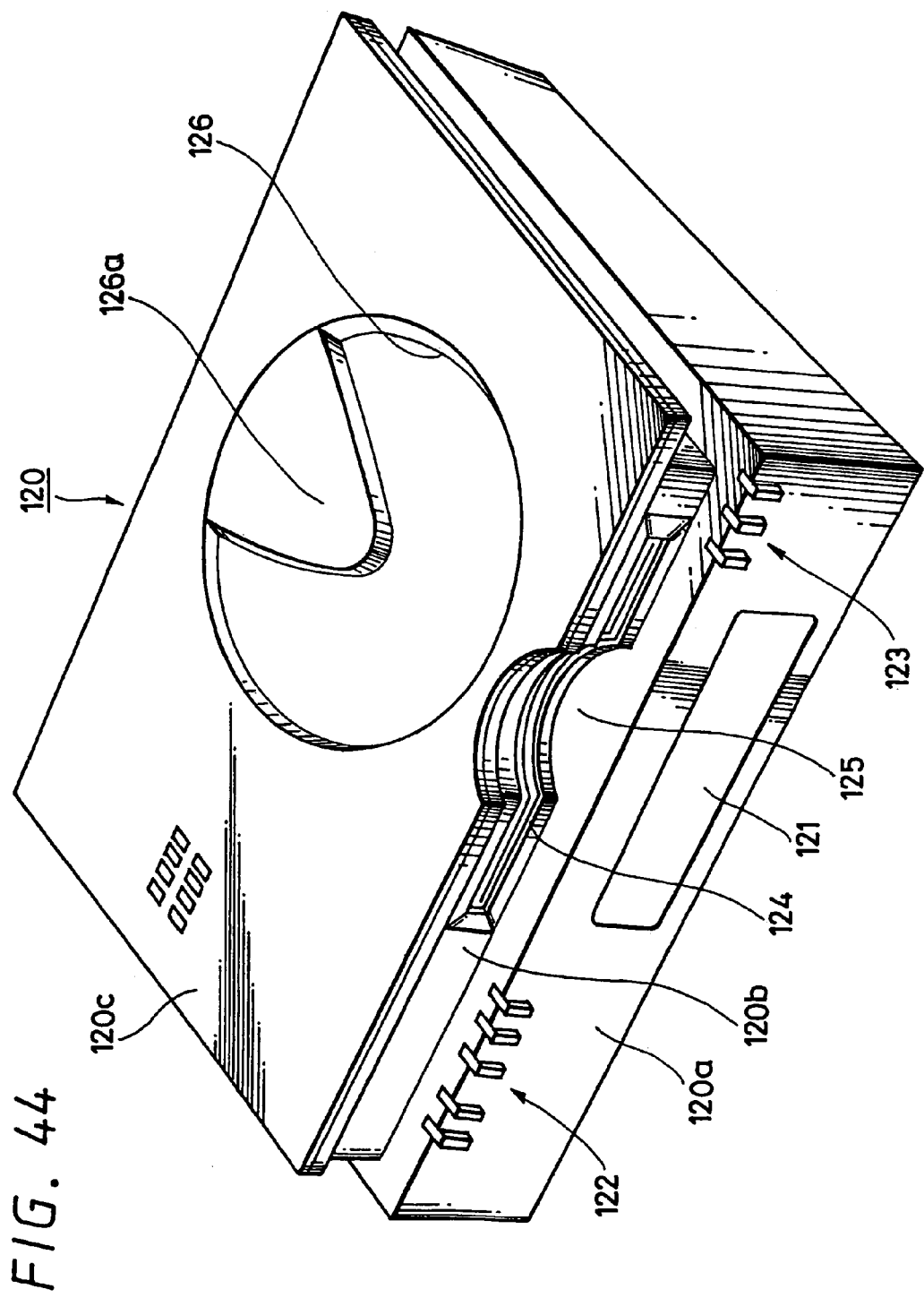
FIG. 44 is a perspective view showing an outer appearance of a housing in which the disk recording and reproducing apparatus shown in FIG. 5 is accommodated.

The disk recording and reproducing apparatus 10 having the above-mentioned construction is accommodated and used within, for example, a housing 120 shown in FIG. 44. The housing 120 is comprised of a cube-like container that is large enough to accommodate the main chassis 11, control circuits, other devices, and mechanisms for controlling devices and mechanisms mounted on the main chassis and so forth. Specifically, the housing 120 includes a cube-like main body portion 120a, an upper portion 120b integrally provided with the upper portion of this main body portion 120a and a ceiling portion 120c that covers the upper surface of the upper portion 120b.

On the front surface of the main body portion 120a, there are disposed a display portion 121 composed of a suitable device such as a liquid-crystal display to display control states, operation states and other information; operation switches 122, 123 serving as input means for inputting control signals, operation signals and so on; and the like. The upper portion 120b is shaped like a retracted narrow portion by reducing lengths of the front surface and the right and left side surfaces. As a result, a raised roof-like portion is set around the upper portion 120b. An opening 124 is provided at the front of this upper portion 120b, in which the disk entrance and exit slot 30 of the disk recording and reproducing apparatus 10 is inwardly housed opposing the opening.

A disk holding portion 125 having a concave arc-like shape is provided at an approximately central part of the opening 124 of the housing 120 in the longitudinal direction. The recess portion of the gate member 12 is inwardly housed opposing the disk holding portion 125. The ceiling portion 120c has an opening window 126 formed at its position corresponding to the disk installation portion 23 of the disk recording and reproducing apparatus 10 to enable users to visually confirm the inside of the housing. The opening window 126 has an expanded portion 126a to cover the upper portion of the arm portion 14a of the chucking arm 14. The expanded portion 126a has a shape approximately similar to that of the arm portion 14a and hence users can visually confirm through the opening window 126 approximately the entirety of the optical disk D except this expanded portion 126a.

Operations of the disk recording and reproducing apparatus 10 having the above-described construction will be described with reference to FIGS. 19 to 21 and FIGS. 22 to 43. FIGS. 19 to 21 are diagrams to which reference will be made in explaining relationships between the optical disk D and the eight detection switches SW1 to SW8. FIGS. 22 to 31 are diagrams showing the states in which the small-diameter disk $D_8$ having the diameter of 8 cm is inserted into and ejected from the apparatus (loading and unloading operations). FIG. 42 is an operation timing chart for explaining operations of the eight detection switches SW1 to SW8 and the two drive motors 84, 101 when the small-diameter disk $D_8$ is inserted into and ejected from the apparatus.

Further, FIGS. 32 to 41 are diagrams showing the states in which the large-diameter disk $D_{12}$ having the diameter of 12 cm is inserted into and ejected from the apparatus. FIG. 43 is a operation timing chart for explaining operations of the eight detection switches SW1 to SW8 and the two drive motors 84, 101 when the large-diameter disk $D_{12}$ is inserted into and ejected from the apparatus.

Figure 22:
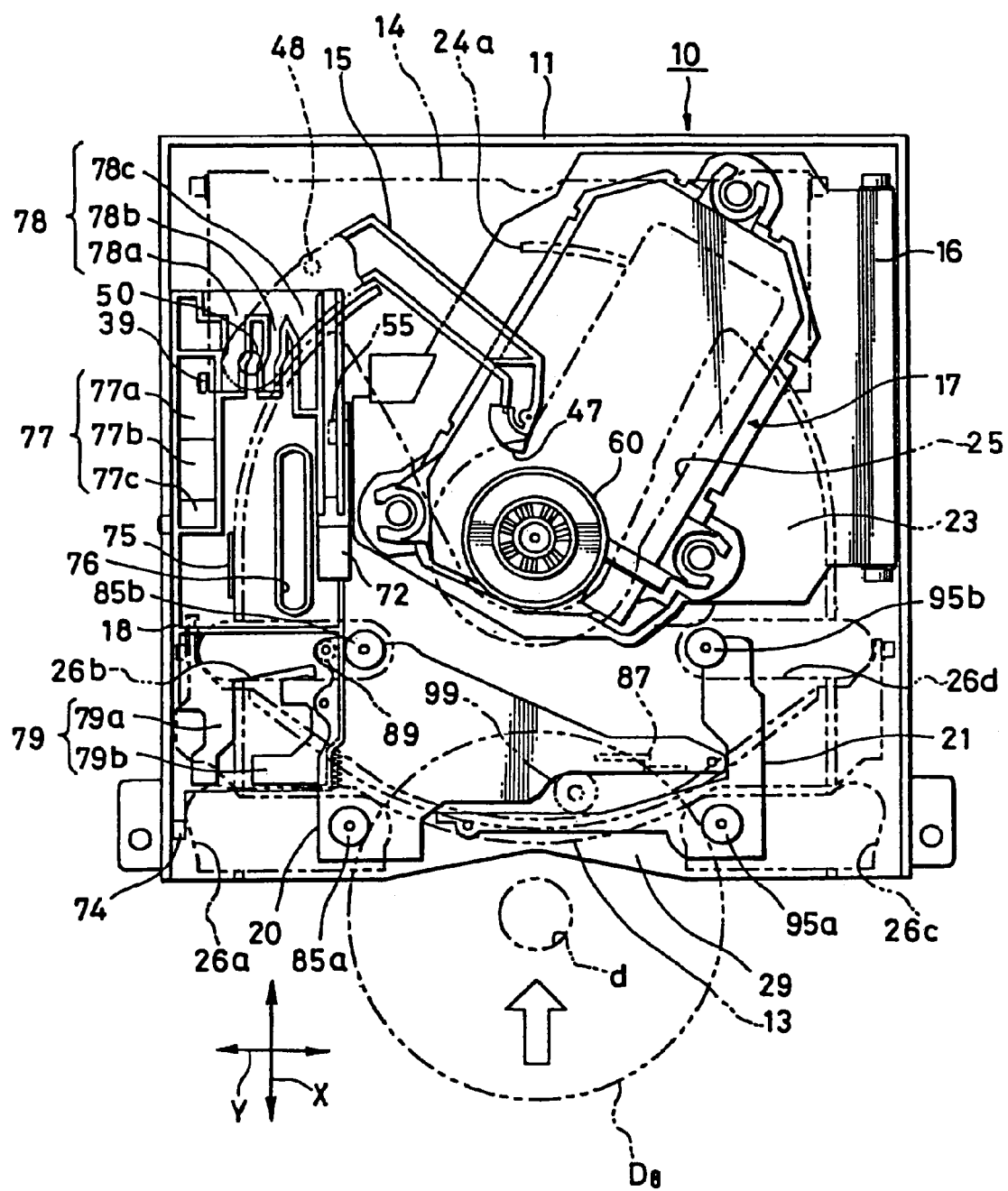
FIG. 22 is an explanatory diagram showing the state in which an optical disk is inserted into a disk entrance and exit slot when the disk having a diameter of 8 cm is loaded onto the disk recording and reproducing apparatus shown in FIG. 5.

First, the case when the small-diameter disk $D_8$ is applied will be described. As shown in FIGS. 22 and 23B, when the user inserts the tip end of the small diameter disk $D_8$ into the disk entrance and exit slot 30 of the gate member 12 (in the front and rear direction X), the above tip end portion enters into the lower side of the shutter portion 13*a* of the opening and closing shutter 13. At that time, since the cam plate 18 is positioned at the most front portion, that is, the initial setting position, the drive lever 13*d* of the opening and closing shutter 13 is laid over the upper surface of the cam plate 18. As a consequence, the opening and closing shutter 13 is placed in the state in which the shutter portion 13*a* is slightly lifted upwardly against spring force of the compression coil spring 37 with the pair of pivoting shaft portions 13*f*, 13*f* being as a pivot center.

In this case, the height of the shutter portion 13*a* is set to approximately the same as that of the disk entrance and exit slot 30, and on the lower surface of the shutter portion 13*a* that is slidably in contact with the outer peripheral edge of the upper surface of the small-diameter disk $D_8$, the V-like (or U-like) first guide portion 13*h* recessed in a downward direction is formed. Then, in the main chassis 11, the V-like (or U-like) second guide portion 29 recessed in an upward direction is formed.

Accordingly, at the rear of the disk entrance and exit slot 30, there is formed a barrel-like opening portion which increases its width at its central portion and decreases its width toward the respective ends. Consequently, since the first guide portion 13*h* of the shutter portion 13*a* serves as the guide surface to lead the small-diameter disk $D_8$, the tip end portion of the small-diameter disk $D_8$ is easily inserted into the lower side of the shutter portion 13*a*.

With respect to the chucking arm 14, the roller 39 supported by the lower end of the drive lever 38 is laid over the upper horizontal plane 77*a* of the chucking cam portion 77 of the cam plate 18. Therefore, the chucking arm 14 is raised in the upper direction against spring force of the chucking coil spring 45. Accordingly, since the arm portion 14*a* is located at the upper position, the chucking member 40 held at its tip end is also raised upwardly by a predetermined height.

Further, the cam protrusion 55 of the assembly body holder 16 is located at the lower horizontal portion 72*c* of the elevation cam portion 72 provide in the cam plate 18. Thus, as shown in FIG. 23A, the assembly body holder 16 is leaning forward. Accordingly, the turntable 60 of the pickup table assembly body 17 mounted on the assembly body holder 16 is lowered downward from the opening 25 of the main chassis 11. As a consequence, the disk installation portion 23 set at approximately the central portion of the flat surface portion 11*a* of the main chassis 11 is opened widely and is ready to house the small-diameter disk $D_8$.

In this state, when the small-diameter disk $D_8$ is inserted, the tip end of the disk led by the curved guide surface of the shutter portion 13*a* is brought in contact with the drive-side guide roller 92*c* which is disposed at the front side of the drive roller 85*a* positioned forward, of the pair of drive rollers 85*a*, 85*b* of the drive-side roller assembly body 20, and the fixed-side guide roller 97*c* which is disposed at the front side of the fixed roller 95*a* positioned forward, of the pair of fixed rollers 95*a*, 95*b* of the fixed-side roller assembly body 21, to press and expand these guide rollers 92*c*, 97*c* to the outside, respectively. Specifically, in FIG. 19, the drive-side guide roller 92*c* is pivoted in the clockwise direction and the fixed-side guide roller 97*c* is pivoted in the counter-clockwise direction.

As a result, the detection member 92 that supports the drive-side guide roller 92*c* is pivoted in the clockwise direction so that its operation pin 92*b* pivots in the same direction to press the first detection switch SW1. Consequently, the first detection switch SW1 is switched from the off-state to the on-state and its detection signal is output. This point of time is shown as t1 in FIG. 42 and based on this detection signal, a drive current is supplied to the first drive motor 84 of the drive-side roller assembly body 20.

Thus, the first drive motor 84 is rotated in the predetermined direction that has been decided previously (direction in which the small-diameter disk $D_8$ is transported to the disk loading portion). As a result, rotation force of the first drive motor 84 is transmitted from the worm 84*a* fixed to its rotary shaft through the first gear mechanism 86 (worm wheel 86*a*, small-diameter gear 86*b*, intermediate gears 86*c*, 86*d*) to the respective gear portions 85*c* of the pair of drive rollers 85*a*, 85*b*. Accordingly, in FIG. 22, the pair of drive rollers 85*a*, 85*b* rotatably supported by the drive-side guide lever 83 are driven to rotate in the counter-clockwise direction. At that time, since the drive-side cushion members 90*c* made of the rubber-like resilient material are fitted to the outer shaft portions 85*e* of the drive rollers 85*a*, 85*b*, the drive-side cushion members 90*c* are driven to rotate together with the drive rollers 85*a*, 85*b*.

Further, when the small-diameter disk $D_8$ is inserted, the tip end of the disk is guided by the front drive roller 85*a* and is brought in contact with the drive-side cushion member 90*c* provided at the bottom of the groove; and is also guided by the fixed roller 95*a* located at the front, of the pair of fixed rollers 95*a*, 95*b* fixed to the fixed-side guide lever 94 of the fixed-side roller assembly body 21 and is brought in contact with the fixed-side cushion member 115*c* provided at the narrow bottom. Thus, the small-diameter disk $D_8$ is supported by the three points of the drive roller 85*a*, the fixed roller 95*a* and the user. Then, rotation force of the front drive roller 85*a* is transmitted to one end of the outer peripheral edge of the small-diameter disk $D_8$ by friction force generated between the cushion members 90*c*, 115*c* and the small-diameter disk $D_8$. On the other hand, the other end of the outer peripheral edge of the small-diameter disk $D_8$ is kept at that position by friction force generated between it and the fixed roller 95*a*.

As a result, rotation force causing the small-diameter disk $D_8$ to rotate toward the disk installation portion 23 set inside the main chassis 11 is generated, whereby the small-diameter disk $D_8$ is rotated and moved in the disk insertion direction in which the disk is moved toward the disk installation portion 23. When the small-diameter disk $D_8$ is rotated and moved in the disk insertion direction, the front drive roller 85*a* and the front fixed roller 95*a* are moved, against spring force of the tension coil spring 98, in the direction in which they are moved away from each other in the right and left direction Y.

When the front drive roller 85*a* is moved, the second detection switch SW2 having been pressed and turned on by the operation member 87 of the drive-side guide lever 83 is switched to the off-state and its detection signal is output. This point of time is shown as t2 in FIG. 42. Then, when the largest diameter portion (diameter portion) of the small-diameter disk $D_8$ reaches between the front drive roller 85*a* and the front fixed roller 95*a*, the outer peripheral edge of the disk is detached from the drive-side guide roller 92*c* and the force pressing the operation pin 92*b* is released. As a consequence, by the spring force of the torsion coil spring the detection member 92 is returned to the initial position and the first detection switch SW1 is again switched from the on-state to the off-state. This point of time is shown as t3 in FIG. 42.

In this case, since the first guide portion 13h is provided on the lower surface of the shutter portion 13a of the opening and closing shutter 13, the opening and closing shutter 13 can be lifted easily when the small-diameter disk $D_8$ is moved. At that time, the outer peripheral edge of the upper surface of the small-diameter disk $D_8$ is brought in contact with the first guide portion 13h slidably and the outer peripheral edge of the lower surface of the small-diameter disk $D_8$ is brought in contact with the second guide portion 29 slidably, with the result that the signal recording surface which is set inside the small-diameter disk can be prevented from contacting with the flat surface portion 11a or the like. Therefore, upon disk loading, there is no risk that the signal recording surface will be scratched, damaged or smudged by foreign matter. Such effectiveness can also be achieved when the small-diameter disk $D_8$ is ejected from the apparatus, and when the large-diameter disk $D_{12}$, which will be described later on, is applied.

The small-diameter disk $D_8$ is supported by the drive roller 85a, the fixed roller 95a and the wiper member 31 attached to the disk entrance and exit slot 30 and is rotated and moved in the disk insertion direction by rotation force of the drive roller 85a while being maintained in substantially the horizontal state. Then, when the largest diameter portion (diameter portion) of the small-diameter disk $D_8$ passes between the front drive roller 85a and the front fixed roller 95a, the drive-side roller assembly body 20 and the fixed-side roller assembly body 21 are pulled in the direction of coming close to each other by spring force of the tension coil spring 98.

Subsequently, the tip end portion of the small-diameter disk $D_8$ is guided by the rear side drive roller 85b and is brought in contact with the drive-side cushion member 90c provided at the bottom of the groove; and is also guided by the rear side fixed roller 95b and is brought in contact with the fixed-side cushion member provided at the bottom of the groove. Thus, the small-diameter disk $D_8$ is supported by in total four points of two front and rear drive rollers 85a, 85b and two front and rear fixed rollers 95a, 95b. Then, when the rear end portion of the small-diameter disk $D_8$ is detached from the front drive roller 85a and fixed roller 95a, the small-diameter disk is rotated and moved by rotation force of the drive roller 85b and transported to the disk installation portion 23 while being supported by the rear drive roller 85b and fixed roller 95b.

Figure 24:
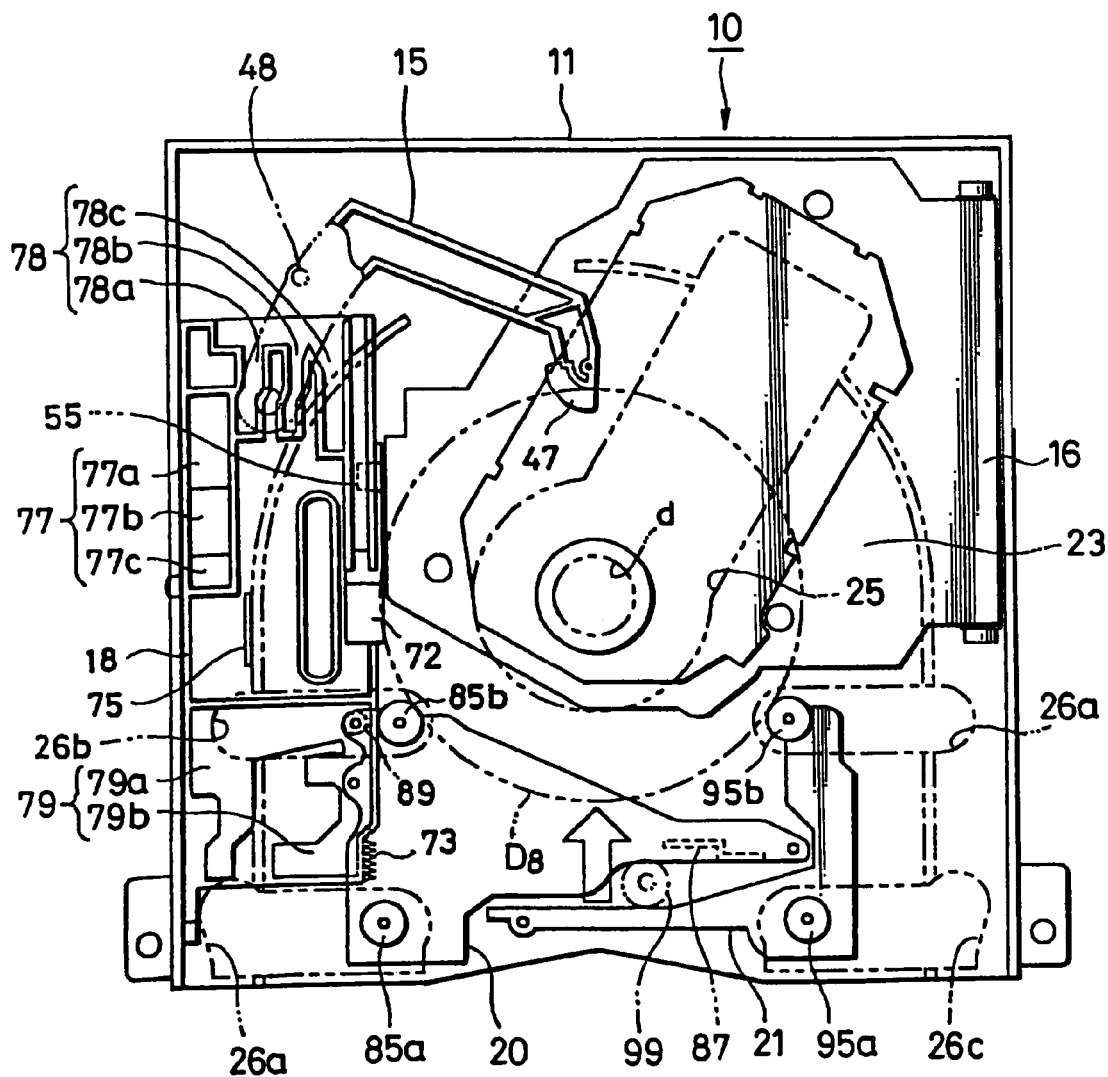
FIG. 24 is an explanatory diagram showing the state in which the optical disk has been loaded onto the disk loading portion when an optical disk having a diameter of 8 cm is used in the disk recording and reproducing apparatus shown in FIG. 5.
Figure 25A:
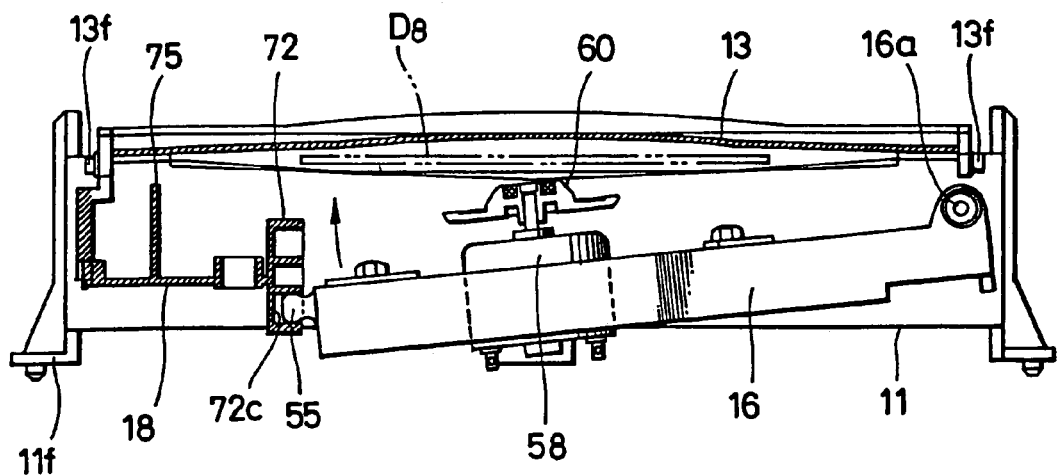
Figure 25B:
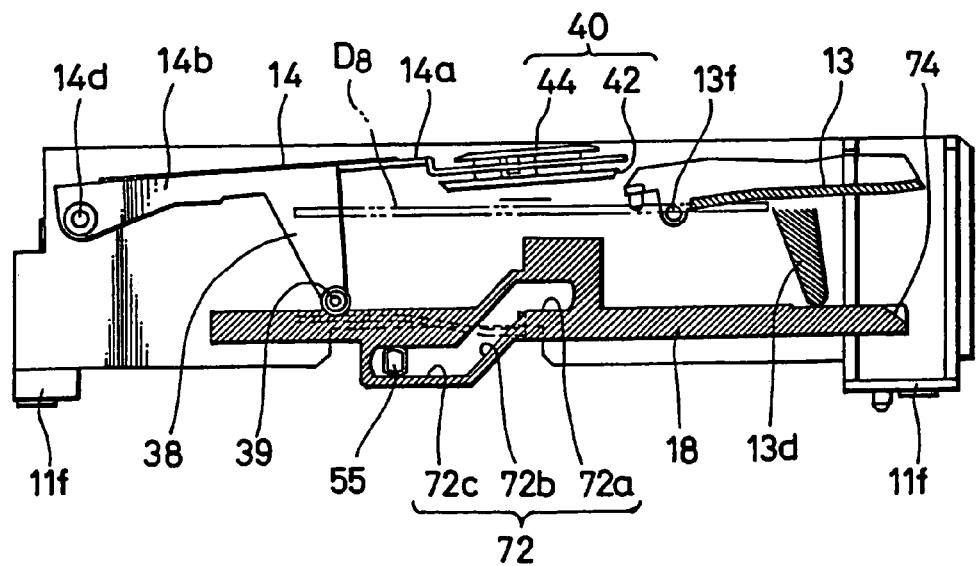
Figure 26:
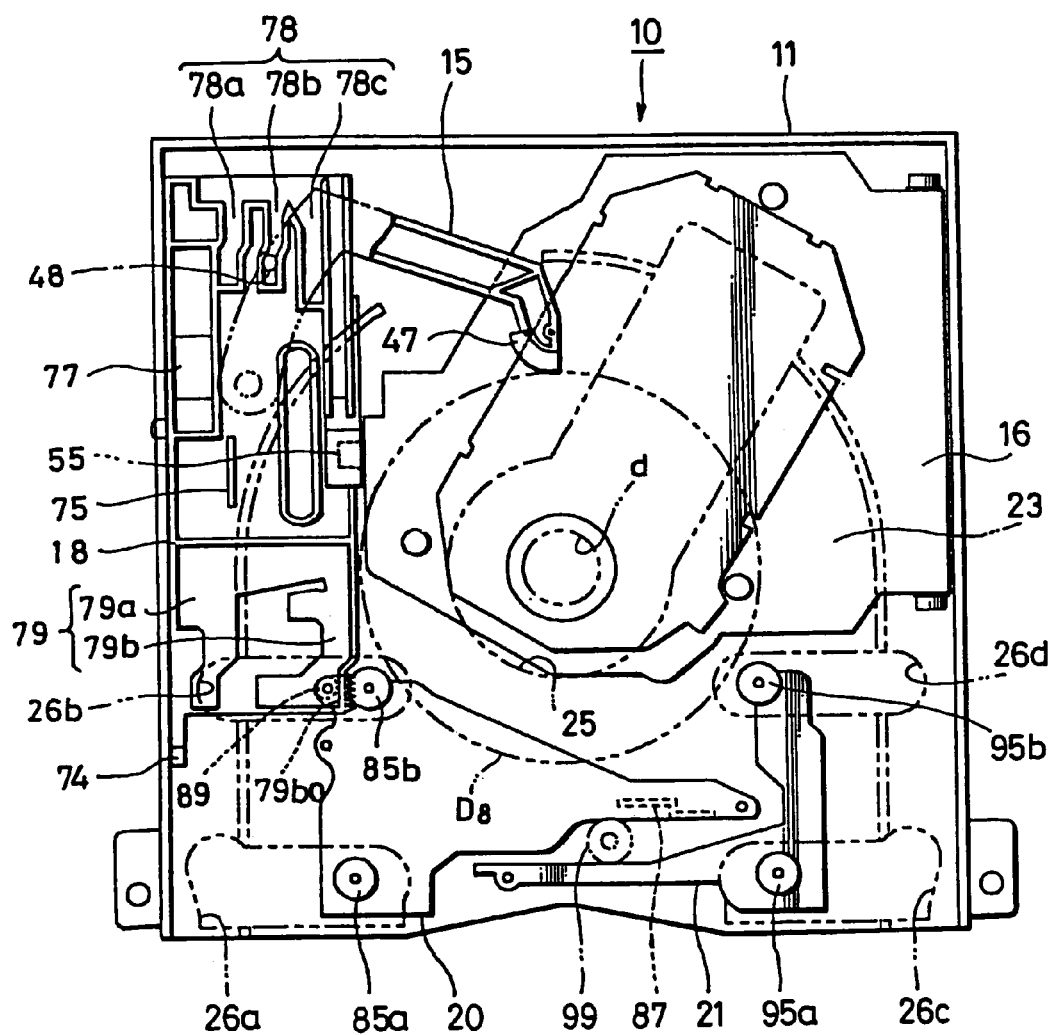
FIG. 26 is an explanatory diagram showing the state in which loading of an optical disk had been completed when an optical disk having a diameter of 8 cm is used in the disk recording and reproducing apparatus shown in FIG. 5.

At that moment, when the tip end of the small-diameter disk $D_8$ passes the central portion of the disk installation portion 23, the tip end portion of the disk is engaged with the disk holding portion 47 of the support lever 15 placed adjacent to the installation portion. Consequently, the small-diameter disk $D_8$ is supported by three points, that is, the rear drive roller 85b, the fixed roller 95b and the disk holding portion 47. FIGS. 24 and 25A, 25B show this state, and at that time, the cam plate 18 is positioned at the initial front end portion. Accordingly, the opening and closing shutter 13 and the chucking arm 14 are both placed in the state of being raised and the assembly body holder 16 is lowered in the forward direction so that their positions are not changed.

Next, the small-diameter disk $D_8$ is further transported in the disk insertion direction by rotation force given by the rear drive roller 85b, thereby moving the support lever 15 in the direction in which the lever 15 is ejected from the disk installation portion 23 (in the counter-clockwise direction in FIG. 24) against spring force of the spring member forcing the lever 15 toward the inside of the disk installation portion 23. As a result, the operation piece 15d of the support lever 15 is brought in contact with the fifth detection switch SW5 and this fifth detection switch SW5 is switched from the off-state to the on-state, and its detection signal is output. This point of time is shown as t4 in FIG. 42.

After that, the small-diameter disk $D_8$ is moved to the center of the disk installation portion 23 and the rear drive roller 85b and fixed roller 95b are detached from the small-diameter disk $D_8$. Accordingly, the drive-side roller assembly body 20 and the fixed-side roller assembly body 21 are returned to the initial position in which they are placed closest to each other under spring force of the tension coil spring 98.

As a result, the first operation portion 87a of the operation member 87 is brought in contact with the second detection switch SW2 and this second detection switch SW2 is switched from the off-state to the on-state, and its detection signal is output. This point of time is shown as t5 in FIG. 42. Based on this detection signal, the supply of the drive current to the first drive motor 84 is stopped, whereby rotations of the pair of drive rollers 85a, 85b are stopped.

At that time, as shown in FIG. 24, the cam pin 48 provided on the support lever 15 is placed at the position opposed to the second cam portion 78b of the lever cam portion 78. The roller 89 rotatably supported by the shaft pin 89a of the drive-side roller assembly body 20 is placed at the position opposed to the small-diameter cam portion 79b of the roller cam portion 79.

After driving of the first drive motor 84 had been stopped, the drive current is output to the second drive motor 101 of the chuck drive assembly body 22 when, as shown in FIG. 42, a first delay time DT1 that had been set previously elapses. Thus, the second drive motor 101 is rotated and moved in a predetermined direction that had been decided previously (direction in which the cam plate 18 is moved rearward). As a result, rotation force of the second drive motor 101 is transmitted from the worm 108 fixed to the rotary shaft of the second drive motor through the first gear mechanism 102 (worm wheel 109, intermediate gear 10 and output gear 111) to the rack portion 73 of the cam plate 18. Then, the cam plate 18 is moved rearward from the position shown in FIG. 24 to the position shown in FIG. 26 (in the front and rear direction X).

After the cam plate 18 had been moved rearward, first, the sixth detection switch SW6 is switched from the on-state to the off-state by the switch operation member 75. This point of time is shown as t6 in FIG. 42. Subsequently, the seventh detection switch SW7 is switched from the off-state to the on-state by the switch operation member 75. This point of time is shown as t7 in FIG. 42. It can be detected by visually confirming the order in which the two detection switches SW6, SW7 are turned on and off that the small-diameter disk $D_8$ is being transported to the side of the disk loading portion.

At the same time, the cam pin 48 of the support lever 15 enters into the second cam portion 78b of the lever cam portion 78 together with the rearward movement of the cam plate 18. On the other hand, the roller 89 of the drive-side roller assembly body 20 enters into the small-diameter cam portion 79b of the roller cam portion 79 at that position.

Next, when the cam plate 18 is moved up to the rearmost portion, the switch operation member 75 comes in contact with the eighth detection switch SW8 so that the eighth detection switch SW8 is switched from the off-state to the on-state. This point of time is shown as t8 in FIG. 42. Then, after the cam plate 18 had reached to the rearmost portion, when a second delay time DT2 set in advance passes, the supply of the drive current to the second drive motor 101 is stopped and the second detection switch SW2 is switched from the on-state to the off-state. This point of time is shown as t9 in FIG. 42. Thus, the second drive motor 101 is stopped and the cam plate 18 is stopped and held at the rearmost portion.

At that time, as shown in FIGS. 27A and 27B, based on the rearward movement of the cam plate 18, the cam protrusion 55 slides from the lower horizontal portion 72c through the inclined portion 72b to the upper horizontal portion 72a of the elevation cam portion 72. As a result, the assembly body holder 16 is elevated in such a manner as to elevate the cam protrusion 55 side of its tip end with the pair of shaft portions 16a, 16a provided at the rear end portion being as a pivot center, and its position is changed to approximately the horizontal state. In consequence, the upper portion of the pickup table assembly body 17 supported by the assembly body holder 16 enters into the opening 25 of the main chassis 11 from the underside.

As a result, the turntable 60 fixed to the tip end of the rotary shaft of the spindle motor 58 of the pickup table assembly body 17 is opposed to the small-diameter disk $D_8$, and by upward pivoting of the turntable, the engagement portion 60b is fitted into the center hole d of the small-diameter disk $D_8$. Then, the chucking arm 14 and the opening and closing shutter 13 are inclined and lowered in cooperation with the motion of the turntable 60.

Specifically, since the chucking arm 14 is constantly forced in the direction in which the arm comes close to the disk installation portion 23 under spring force of the coil spring 45, the roller 39 rotatably supported by the lower end of the drive lever 38 slides from the upper horizontal portion 77a through the inclined portion 77b to the lower horizontal portion 77c, of the chucking cam portion 77 together with the rearward movement of the cam plate 18. At that time, since the height and position of the roller 39 is progressively lowered by the cam portion 77, the arm portion 14a is forced to be lowered so that the chucking arm member 40 held at the tip end of the arm portion is approached to the turntable 60.

Thus, the chucking member 40 and the turntable 60 are opposed to each other across the small-diameter disk $D_8$ from above and below the disk. As a result, the magnet 59 incorporated within the turntable 60 magnetically attracts the chucking member 40 with the result that the small-diameter disk $D_8$ is held between the chucking member 40 and the turntable 60 from above and below the disk. Thus, chucking of the small-diameter disk $D_8$ is completed and the small-diameter disk $D_8$ is rotated together with rotation of the turntable 60.

At that time, the cam pin 48 is laid over the escape portion $78b_0$ set in the deep part of the second cam portion 78b, whereby the support lever 15 is slightly pivoted in the counter-clockwise direction. Consequently, the disk holding portion 47 is further moved to the outside, whereby the disk holding portion 47 is moved away from the small-diameter disk $D_8$ and their engagement is released. In a like manner, since the roller 89 is laid over the escape portion $79b_0$ set in the deep part of the small-diameter cam portion 79b, the inside drive roller 85b and fixed roller 95b are further moved to the outside slightly.

Thus, the two rollers 85b, 95b are detached from the small-diameter disk $D_8$ and their engagement is released. As a result, since the small-diameter disk $D_8$ is supported by only the chucking member 40 and the turntable 60, the outer peripheral edge of the disk can be prevented from being slidably in contact with the drive roller 85b and the fixed roller 95b or the disk holding portion 47.

Furthermore, since the opening and closing shutter 13 is constantly forced forward under spring force of the compression coil spring 37, when the cam plate 18 is moved rearward, the drive lever 13d is moved relatively in the front direction and released to the front side through the cam portion 74 provided at the front end portion of the cam plate 18. Consequently, the state of the opening and closing shutter 13 changes from the slightly upward state shown in FIG. 25 to the slightly downward state shown in FIG. 27B.

As a result, the lower surface of the shutter portion 13a is brought in contact with the disk guide portion 29 of the main chassis 11 as being pressed against it and the inside of the disk entrance and exit slot 30 is tightly closed by the shutter portion 13a. Consequently, even when inadvertently the user intends to insert the second optical disk D into the apparatus from the disk entrance and exit slot 30, such insertion operation can be prevented reliably and erroneous insertion of the second optical disk can be reliably prevented.

After loading of the disk had been completed through such operations, an information signal can be recorded on and reproduced from the small-diameter disk $D_8$ in the later stages and recording and reproducing operations can be executed. Incidentally, since the third detection switch SW3 and the fourth detection switch SW4 are used only for controlling the large-diameter disk $D_{12}$, they are not operated both in this loading mode and in the unloading mode which will be mentioned next.

Next, disk ejecting operation (unloading) in which the small-diameter disk $D_8$ is ejected from the disk entrance and exit slot 30 after an information signal was recorded on and reproduced from the disk will be described. When the user selects the disk ejecting operation by operating the ejection button, a drive current is supplied to the second drive motor 101 and the second drive motor is driven to rotate. This point of time is shown as t10 in FIG. 42, and when the second drive motor 101 is driven, the second detection switch SW2 is switched from the off-state to the on-state at the same time.

In this case, the second drive motor 101 is driven to rotate in the direction opposite to the disk insertion direction, whereby the cam plate 18 is moved in the disk ejecting direction. Unloading of the small-diameter disk $D_8$ can be executed by effecting control operations in which the second drive motor 101 for moving the cam plate 18 forward and the first drive motor 84 for driving and rotating the pair of drive rollers 85a, 85b are rotated in the opposite direction.

Figure 28:
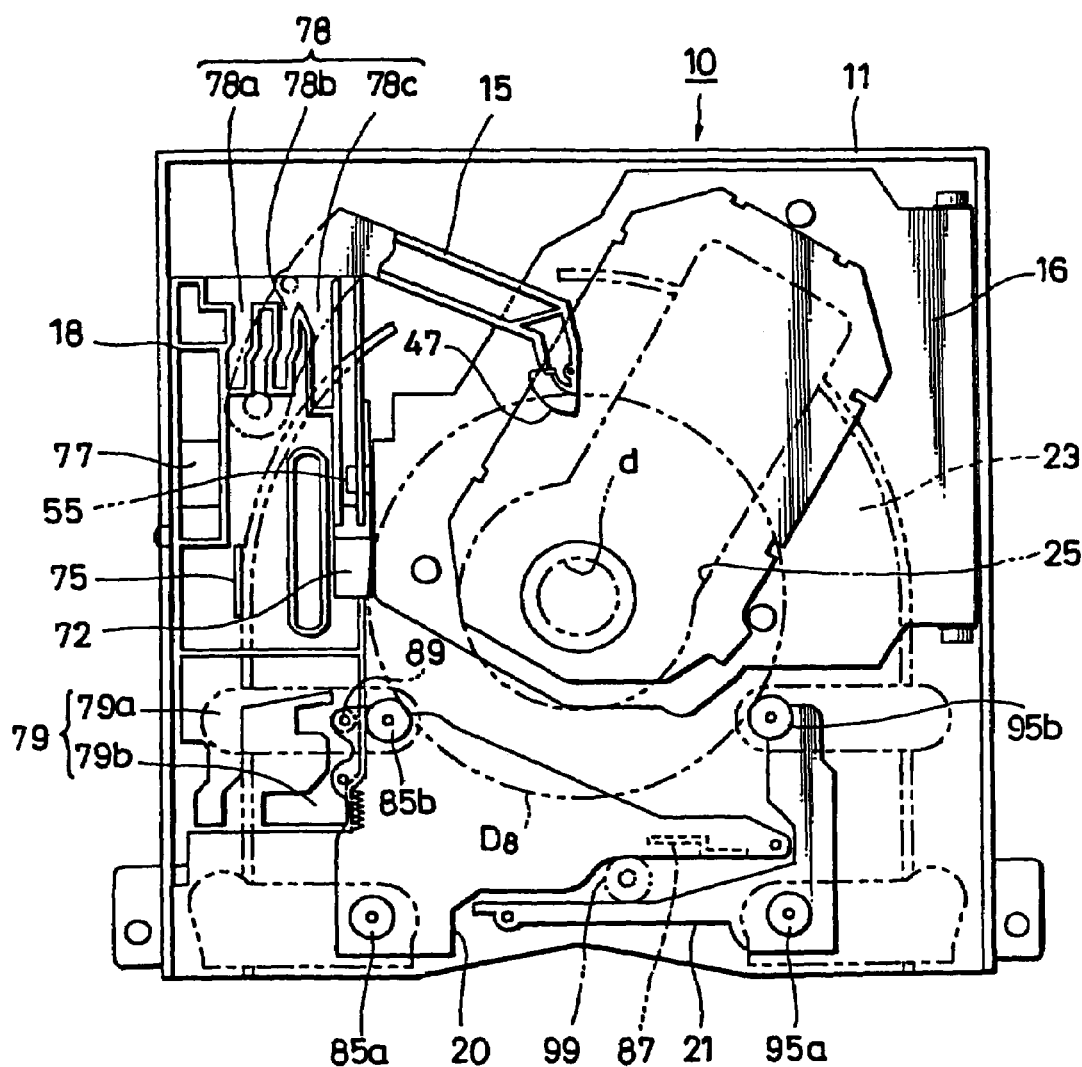
FIG. 28 is an explanatory diagram showing the state in which the optical disk is ejected from the disk loading portion when an optical disk having a diameter of 8 cm is used in the disk recording and reproducing apparatus shown in FIG. 5.
Figure 29A:
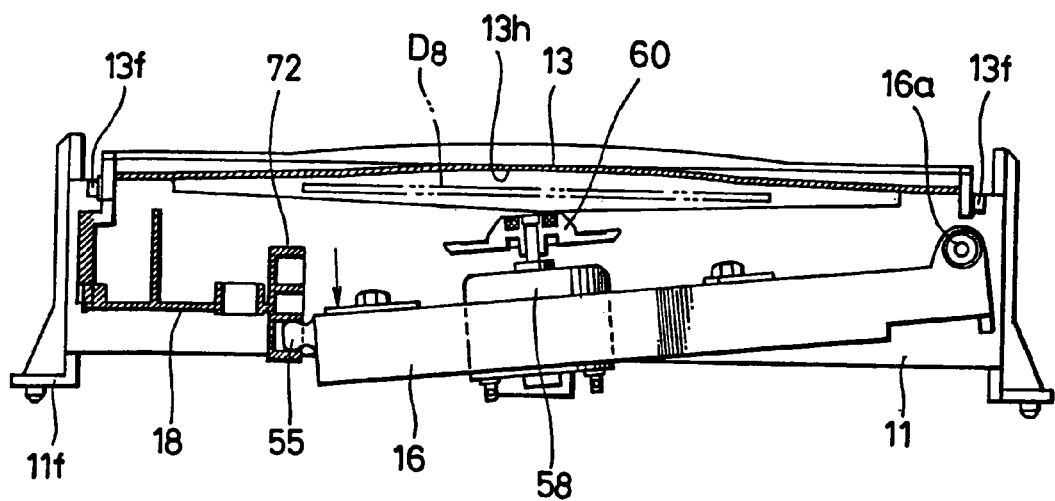
Figure 29B:
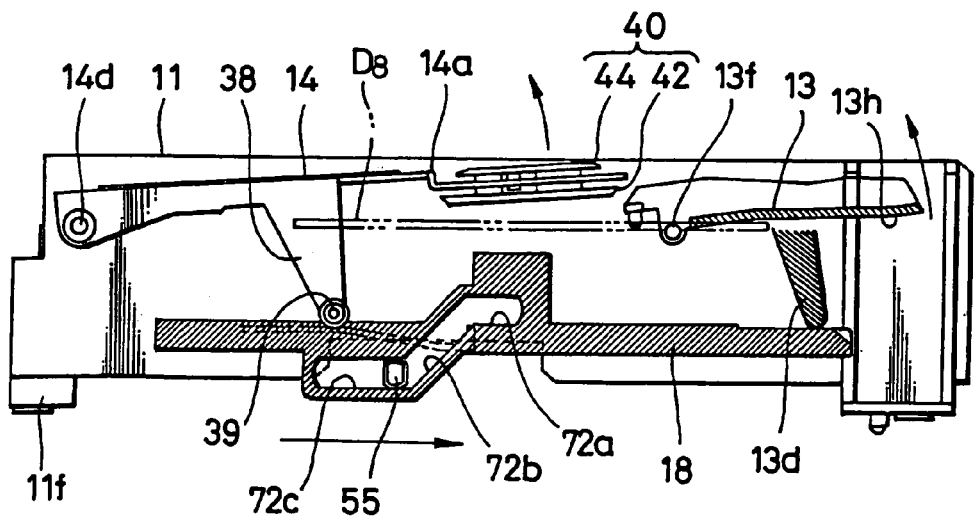

Specifically, when the cam plate 18 is moved forward, the support lever 15 is pivoted in the clockwise direction in FIG. 28 under spring force of the coil spring 52, as the cam pin 48 is disengaged from the second cam portion 78b and hence the disk holding portion 47 is engaged with the outer peripheral edge of the small-diameter disk $D_8$. Then, pressing force of the disk holding portion 47 generated by spring force of the coil spring 52 is given to the insertion side end portion of the small-diameter disk Dg, whereby the small-diameter disk $D_8$ is pressed to the side of the disk entrance and exit slot 30.

In this case, when the cam plate 18 is moved forward, first, since the switch operation member 75 is detached from the eighth detection switch SW8, the eighth detection switch SW8 is switched from the on-state to the off-state. This point of time is shown as t11 in FIG. 42. After the eighth detection switch SW8 was switched, the seventh detection switch SW7 is switched from the on-state to the off-state. This point of time is shown as t12 in FIG. 42.

After the seventh detection switch SW7 was switched to the off-state, when a third delay time DT3 set in advance elapses, the supply of the drive current to the second drive motor 101 is stopped. Thus, the second drive motor 101 is stopped and the forward movement of the cam plate 18 is stopped. After the supply of the drive current to the second drive motor 101 was stopped, when a fourth delay time DT4 set in advance elapses, the drive current is supplied to the first drive motor 84. In this case, the first drive motor 84 is driven to rotate in the direction opposite to the disk insertion direction and the pair of drive rollers 85a, 85b are rotated in the clockwise direction which is the opposite direction to the above-mentioned rotation direction.

In that case, the outer peripheral edge on the ejection side of the small-diameter disk $D_8$ that is pressed forward by the support lever 15 is brought in contact with the rear drive roller 85b and the rear fixed roller 95b. As a consequence, when the drive roller 85b is rotated in the reverse direction, rotation force having the opposite direction to that of the loading mode is given to the small-diameter disk $D_8$, whereby the small-diameter disk $D_8$ is rotated and moved to the side of the disk entrance and exit slot 30. The function of rotating and moving the small-diameter disk $D_8$ is transferred to the pair of front drive roller 85a and front fixed roller 95a through the operation of the pair of rear drive roller 85b and rear fixed roller 95b in cooperation with the operation of the pair of front drive roller 85a and front fixed roller 95a, whereby the small-diameter disk $D_8$ is transported to the disk entrance and exit slot 30.

In this case, when the largest diameter portion of the small-diameter disk $D_8$ passes between the pair of rear drive roller 85b and rear fixed roller 95b, the operation member 87 is detached from the second detection switch SW2 through operations of the drive-side assembly body 20 and hence the second detection switch SW2 is switched from the on-state to the off-state. This point of time is shown as t13 in FIG. 42. Subsequently, when the support lever 15 moves to the innermost portion, the operation piece 15d is detached from the fifth detection switch SW5 so that the fifth detection switch SW5 is switched from the on-state to the off-state. This point of time is shown as t14 in FIG. 42.

Thereafter, when the small-diameter disk $D_8$ reaches to the disk entrance and exit slot 30, the outer peripheral edge of the small-diameter disk $D_8$ presses outward both the drive guide roller 92c and the fixed guide roller 97c which are disposed at the right and left of the disk entrance and exit slot 30. Thus, the operation pin 92b of the detection member 92 is brought in contact with the first detection switch SW1, whereby the first detection switch SW1 is switched from the off-state to the on-state. This point of time is shown as t15 in FIG. 42.

Figure 30:
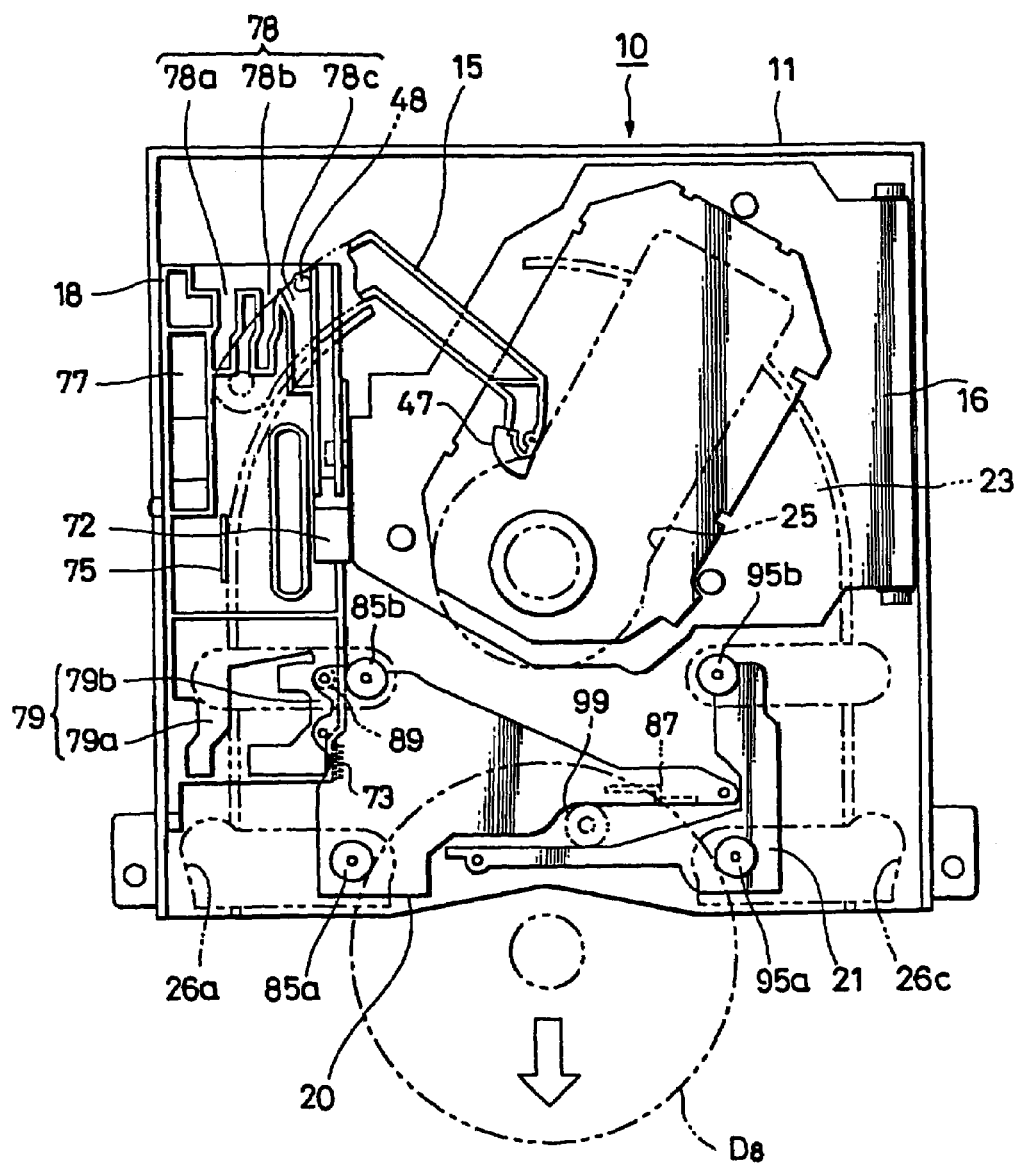
FIG. 30 is an explanatory diagram showing the state in which an optical disk is ejected from a disk entrance and exit slot when an optical disk having a diameter of 8 cm is used in the disk recording and reproducing apparatus shown in FIG. 5.
Figure 31A:
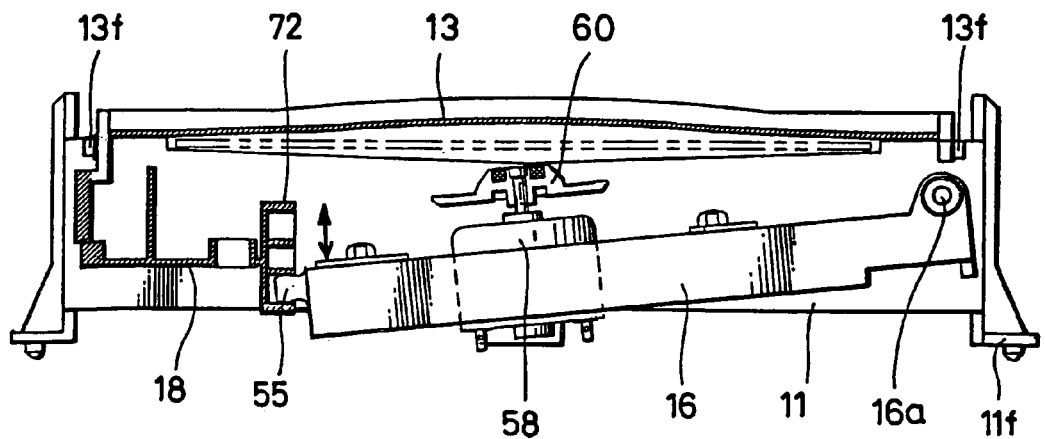
Figure 31B:
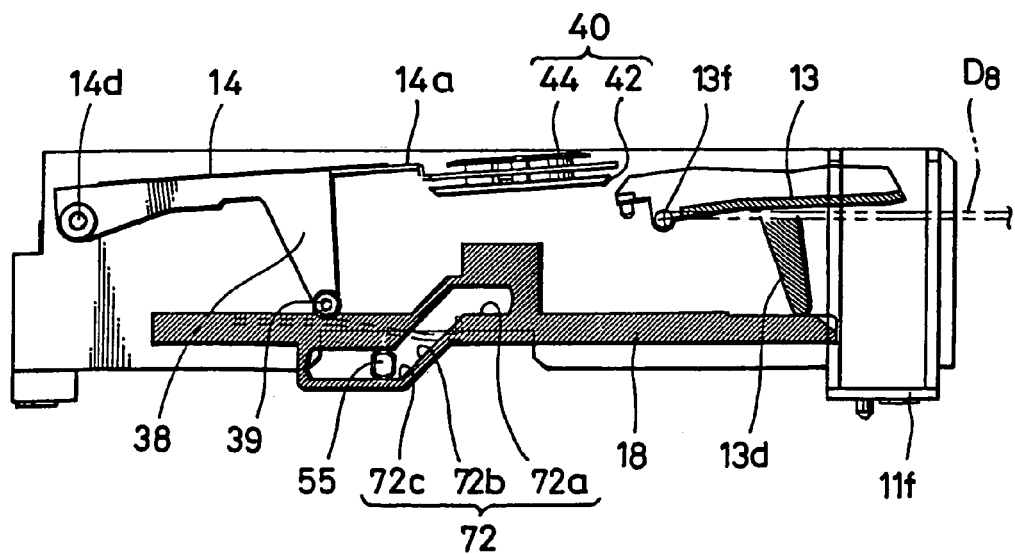

When the first detection switch SW1 is switched to the on-state, rotation of the first drive motor 84 is controlled to start deceleration. Then, after a predetermined time DS set in advance passed, the supply of the drive current to the first drive motor 84 is interrupted and rotation of the first drive motor is brought to an end. At the same time, the second detection switch SW2 is switched from the off-state to the on-state. This point of time is shown as t16 in FIG. 42. Consequently, as shown in FIG. 30, the small-diameter disk $D_8$ is projected sufficiently from the disk entrance and exit slot 30 and hence the user can pull out the small-diameter disk $D_8$ from the disk entrance and exit slot. This point of time is shown as t17 in FIG. 42.

At that time, as shown in FIGS. 29A, 29B and FIGS. 31A, 31B, the opening and closing shutter 13, chucking arm 14, assembly body holder 16 and cam plate 18 are all returned to the original positions and their states are similar to those shown in FIGS. 23A, 23B.

Then, after a predetermined time passed, the disk recording and reproducing apparatus is placed in the next standby state to allow the optical disk D to be again inserted thereto. Specifically, the first detection switch SW1 is switched from the on-state to the off-state, the on-state of the second detection switch SW2 is maintained and the sixth detection switch SW6 is switched from the off-state to the on-state. Thus, it becomes possible to insert the next optical disk D into the disk recording and reproducing apparatus.

Figure 32:
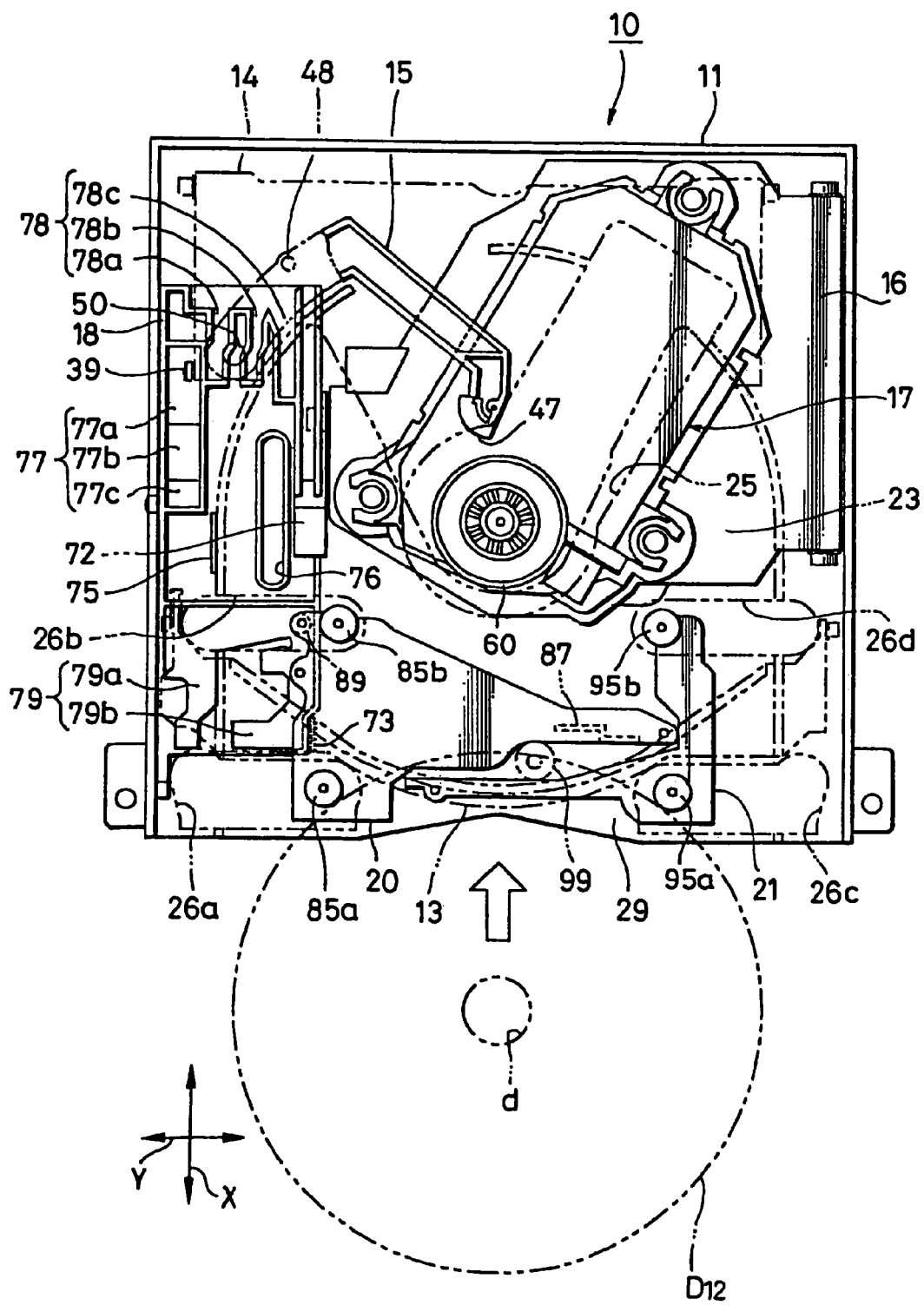
FIG. 32 is an explanatory diagram showing the state in which an optical disk is inserted into a disk entrance and exit slot when an optical disk having a diameter of 12 cm is used in the disk recording and reproducing apparatus shown in FIG. 5.

Hereinafter, the case of the large-diameter disk $D_{12}$ having the diameter of 12 cm will be described. As shown in FIG. 32 and FIGS. 33A, 33B, when the user inserts the tip end of the large-diameter disk $D_{12}$ into the disk entrance and exit slot 30 of the gate member 12 (in the front and rear direction X), the tip end of the large-diameter disk enters into the underside of the shutter portion 13a of the opening and closing shutter 13. At that time, since the cam plate 18 is located at the most front portion which is the initial setting position and the shutter portion 13a of the opening and closing shutter 13 is slightly raised in the upper direction, the lower surface of the shutter portion 13a serves as an arc-like guide surface to enable the user to insert the tip end of the large-diameter disk $D_{12}$ into the underside of the shutter portion 13a without difficulties.

Further, since the roller 39 is laid over the upper horizontal plane 77a of the chucking cam portion 77 of the cam plate 18 and is elevated in the upper direction, the chucking member 40 held at the tip end of the chucking arm 14 is also elevated in the upper direction by a predetermined height. Furthermore, since the cam protrusion 55 of the assembly body holder 16 is located at the lower horizontal portion 72c of the elevation cam portion 72 of the cam plate 18, the assembly body holder 16 leans forward with the result that the turntable 60 of the pickup table assembly body 17 mounted on the assembly body holder 16 is in a position lowered from the opening 25 of the main chassis 11.

In this state, when the large-diameter disk $D_{12}$ is inserted into the disk entrance and exit slot 30, the tip end of the disk guided and entered by the guide curved surface of the shutter portion 13a comes in contact with the drive guide roller 92c disposed in front of the front drive roller 85a and the fixed guide roller 97c disposed in front of the front fixed roller 95a, thereby pressing these guide rollers 92c, 97c outward, respectively. Specifically, in FIG. 19, the drive guide roller 92c is pivoted in the clockwise direction and the fixed guide roller 97c is pivoted in the counter-clockwise direction.

As a result, the detection member 92 that supports the drive guide roller 92c is pivoted in the clockwise direction, whereby the operation pin 92b is pivoted in the same direction to press the first detection switch SW1. Thus, the first detection switch SW1 is switched from the off-state to the on-state and its detection signal is output. This point of time is shown as t1 in FIG. 43. Based on this detection signal, a drive current is output to the first drive motor 84 of the drive-side roller assembly body 20. Thus, the first drive motor 84 is driven to rotate in the direction in which the large-diameter disk $D_{12}$ is transported to the disk loading portion.

Consequently, rotation force of the first drive motor 84 is transmitted from the worm 84a fixed to the rotary shaft of the first drive motor through the first gear mechanism 86 to the respective gear portions 85c of the pair of drive rollers 85a, 85b. Thus, the pair of drive rollers 85a, 85b are rotated in the counter-clockwise direction in FIG. 32 and the drive-side cushion members 90c made of rubber-like resilient materials integrally fitted to the outer shaft portions 85e of the respective drive rollers 85a, 85b are driven to rotate.

Further, when the large-diameter disk $D_{12}$ is pressed, the tip end of the disk is brought in contact with the front drive-side cushion member 90c and the like front fixed-side cushion member 115c. Thus, the large-diameter disk $D_{12}$ is supported by three points of the front drive roller 85a, fixed roller 95a and user. Then, rotation force of the front drive roller 85a is transmitted to part of the outer peripheral edge of the large-diameter disk $D_{12}$ by friction force generated between the drive-side cushion member 90c and the large-diameter disk $D_{12}$. On the other hand, the other end of the outer peripheral edge of the large-diameter disk $D_{12}$ is fixed to that position by friction force generated between the fixed-side cushion member 115c and it.

As a result, rotation force of the large-diameter disk to move toward to the disk installation portion 23 is generated, whereby the large-diameter disk $D_{12}$ is rotated and moved in the disk insertion direction. When the large-diameter disk $D_{12}$ is rotated and moved, the front drive roller 85a and the front fixed roller 95a are moved in right and left direction Yin which they are moved away from each other against spring force of the tension coil spring 98. When the front drive roller 85a moved, the second detection switch SW2 that had been pressed and turned on by the operation member 87 is switched to the off-state and its detection signal is output. This point of time is shown as t2 in FIG. 43.

Then, when a space between the front drive roller 85a and the front fixed roller 95a increases, the third detection switch SW3 is switched from the off-state to the on-state by the operation member 87 and its detection signal is output. This point of time is shown as t3 in FIG. 43. When the space between the front drive roller 85a and the front fixed roller 95a further increases, the outer peripheral edge of the disk is detached from the drive-side guide roller 92c so that force pressing the operation pin 92 is released. As a result, the detection member 92 is returned to the initial position under spring force and hence the first detection switch SW1 is again switched from the on-state to the off-state. This point of time is shown as t4 in FIG. 43.

Further, when the space between the front drive roller 85a and the front fixed roller 95a increases, the fourth detection switch SW4 is switched from the off-state to the on-state by the operation member 87 and its detection signal is output. This point of time is shown as t5 in FIG. 43. Then, when the largest diameter portion (diameter portion) of the large-diameter disk $D_{12}$ passes between the front drive roller 85a and the front fixed roller 95a, since the drive-side roller assembly body 20 and the fixed-side roller assembly body 21 are constantly forced inwardly under spring force of the tension coil spring 98, the space between the two rollers 85a, 95a decreases. As a result, the operation member 87 is temporarily detached from the fourth detection switch SW4 and hence the fourth detection switch SW4 is switched from the on-state to the off-state. This point of time is shown as t6 in FIG. 43.

Subsequently, when the central portion of the large-diameter disk $D_{12}$ moves from the side of the front drive roller 85a to the side of the rear drive roller 85b, since the diameter of the large-diameter disk $D_{12}$ again increases, the fourth detection switch SW4 is again switched from the off-state to the on-state and its detection signal is output. This point of time is shown as t7 in FIG. 43. At that time, the large-diameter disk $D_{12}$ is supported by the drive-side cushion member 90c, the fixed-side cushion member 115c and the wiper member 31 attached to the disk entrance and exit slot 30 and is rotated and moved in the disk insertion direction by rotation force of the drive-side cushion member 90c while being maintained in approximately the horizontal state.

Subsequently, the tip end of the large-diameter disk $D_{12}$ is guided by the rear drive roller 85b and is brought in contact with the drive-side cushion member 90c provided at the bottom of the groove portion; and is also guided by the rear-side fixed roller 95a and is brought in contact with the fixed-side cushion member 115c provided at the bottom of the groove portion. As a result, the large-diameter disk $D_{12}$ is supported in total by four points of two drive-side front and rear cushion members 90c, 90c and two fixed-side front and rear cushion members 115c, 115c. Then, when the rear end portion of the large-diameter disk $D_{12}$ is detached from the front drive roller 85a and fixed roller 95a, while the large-diameter disk is being supported by the rear drive roller 85b and fixed roller 95b, the large-diameter disk is rotated and moved by rotation force of the drive roller 85b, thereby being transported to the disk installation portion 23.

In this case, when the tip end of the large-diameter disk $D_{12}$ passes the central part of the disk installation portion 23, the tip end of the disk is brought in contact with the disk holding portion 47 of the support lever 15 that is on-standby adjacent to the central part. As a result, the large-diameter disk $D_{12}$ is supported by three points of the rear drive roller 85b and fixed roller 95b and disk holding portion 47. In this state, when the large-diameter disk $D_{12}$ is further transported in the disk insertion direction and reaches to the disk installation portion 23, the large-diameter disk is placed in the states shown in FIG. 34 and FIGS. 35A, 35B. At that time, the cam plate 18 is placed at the initial front end portion. Accordingly, the opening and closing shutter 13 and the chucking arm 14 are both raised in the upper direction and the assembly body holder 16 is leaning forward. Their positions are not changed.

In that case, the support lever 15 is moved in the direction in which the large-diameter disk is ejected (in the counter-clockwise direction in FIG. 34) against spring force of the coil spring 52, whereby the operation piece 15d of the support lever 15 is brought in contact with the fifth detection switch SW5. Thus, the fifth detection switch SW5 is switched from the off-state to the on-state and its detection signal is output. This point of time is shown as t8 in FIG. 43.

Then, the large-diameter disk $D_{12}$ is moved up to the center of the disk installation portion 23, and the rear drive roller 85b and fixed roller 95b become closer than a predetermined space, whereby the second operation portion 87c of the operation member 87 is brought in contact with the fourth detection switch SW4. Thus, the fourth detection switch SW4 is switched from the on-state to the off-state and its detection signal is output. This point of time is shown as t9 in FIG. 43. Based on this detection signal, the supply of the drive current to the first drive motor 84 is stopped and rotations of the pair of drive rollers 85a, 85b are stopped.

Figure 34:
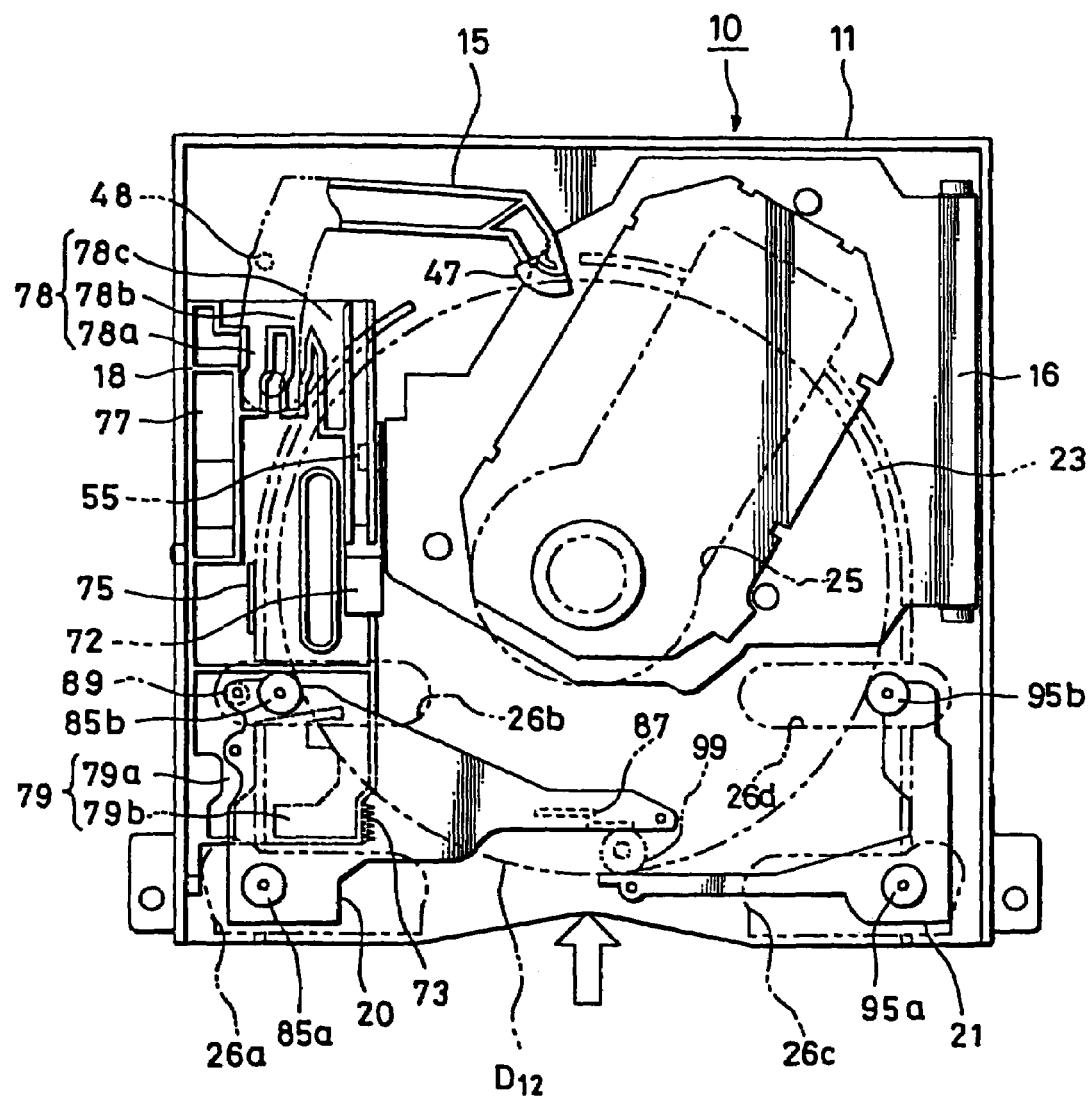
FIG. 34 is an explanatory diagram showing the state in which an optical disk has been housed within a disk loading portion when an optical disk having a diameter of 12 cm is used in the disk recording and reproducing apparatus shown in FIG. 5.
Figure 35A:
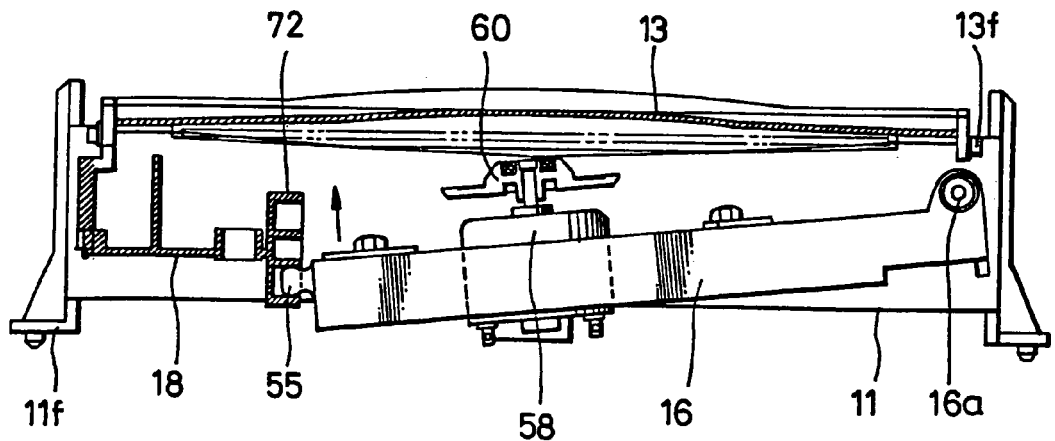
Figure 35B:
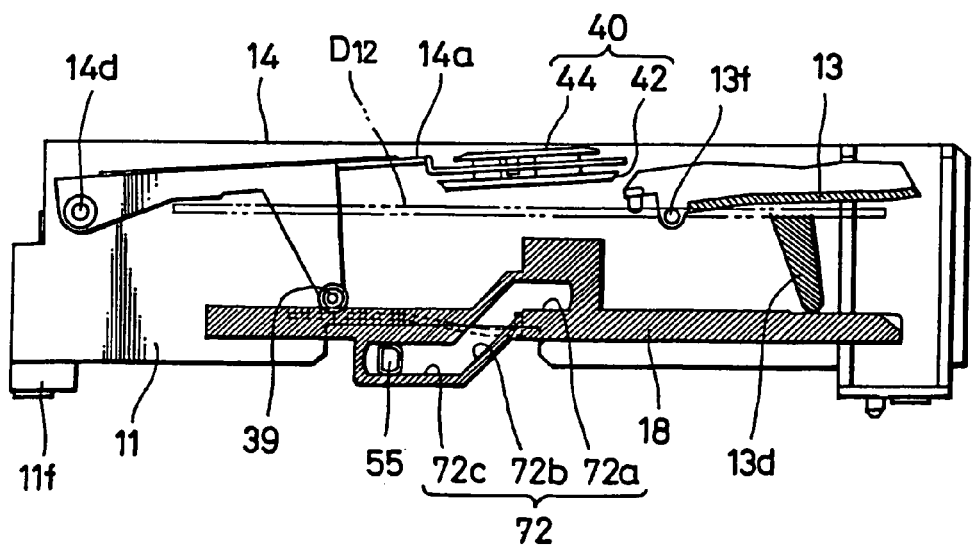
Figure 36:
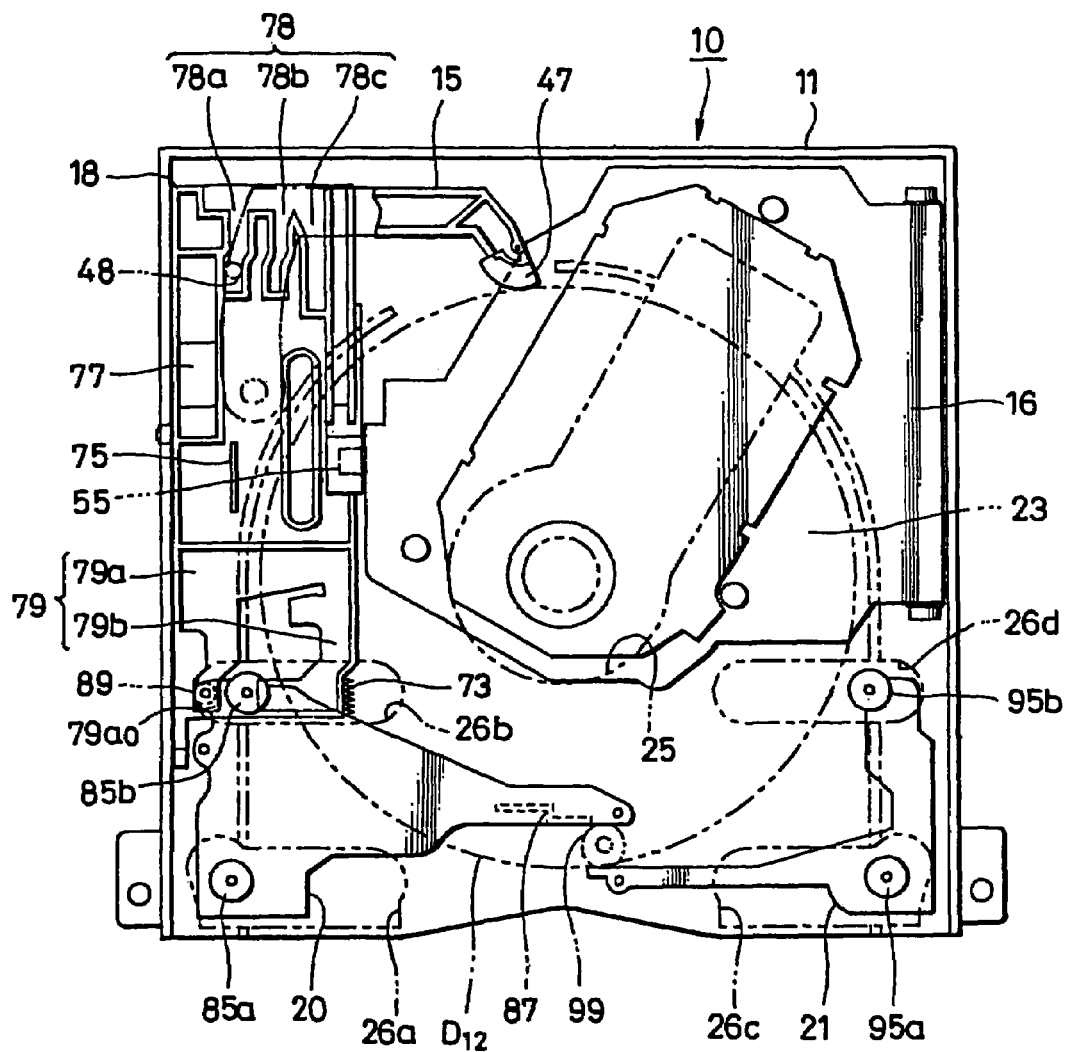
FIG. 36 is an explanatory diagram showing the state in which loading of an optical disk had been completed when an optical disk having a diameter of 12 cm is used in the disk recording and reproducing apparatus shown in FIG. 5.

At that time, as shown in FIG. 34, the cam pin 48 provided at the support lever 15 is positioned opposed to the first cam portion 78a of the lever cam portion 78. The roller 89 rotatably supported by the shaft pin 89a of the drive-side roller assembly body 20 is positioned opposed to the large-diameter cam portion 79a of the roller cam portion 79.

After driving of the first drive motor 84 was brought to an end, as shown in FIG. 43, when the first delay time TD1 set in advance elapsed, the drive current is output to the second drive motor 101 of the chuck drive assembly body 22. Thus, the second drive motor 101 is driven to rotate in a predetermined direction that was decided in advance (in the direction in which the cam plate 18 is moved rearward).

In consequence, rotation force of the second drive motor 101 is transmitted from the worm 108 fixed to the rotary shaft of the second drive motor through the first gear mechanism 102 (the worm wheel 109, intermediate gear 110 and output gear 111) to the rack portion 73 of the cam plate 18. Accordingly, the cam plate 18 is moved rearward (in the front and rear direction X) from the position shown in FIG. 34 to the position shown in FIG. 36.

When the cam plate 18 is moved rearward, first, the sixth detection switch SW6 is switched from the on-state to the off-state by the switch operation member 75. This point of time is shown as t10 in FIG. 43. Subsequently, the seventh detection switch SW7 is switched from the off-state to the on-state by the switch operation member 75. This point of time is shown as t11 in FIG. 43. By visually confirming the order in which two detection switches SW6, SW7 are turned on and off, it is possible for the user to know that the large-diameter disk $D_{12}$ is being transported to the side of the disk loading portion.

At the same time, when the cam plate 18 is moved rearward, the cam pin 48 of the support lever 15 enters into the first cam portion 78a of the lever cam portion 78. On the other hand, the roller 89 of the drive-side roller assembly body 20 enters into the large-diameter cam portion 79a of the roller cam portion 79 at that position. Then, the fourth detection switch SW4 is switched from the off-state to the on-state. This point of time is shown as t12 in FIG. 43.

Next, when the cam plate 18 is moved to the rearmost portion, the switch operation member 75 comes in contact with the eighth detection switch SW8 to switch the eighth detection switch SW8 from the off-state to the on-state. This point of time is shown as t13 in FIG. 43. Then, after the cam plate 18 moved to the rearmost portion, when the second delay time DT2 set in advance elapsed, the supply of the drive current to the second drive motor 101 is stopped. Accordingly, the second drive motor 101 is stopped and the cam plate 18 is held in the state in which the cam plate is stopped at the rearmost portion.

Figure 37A:
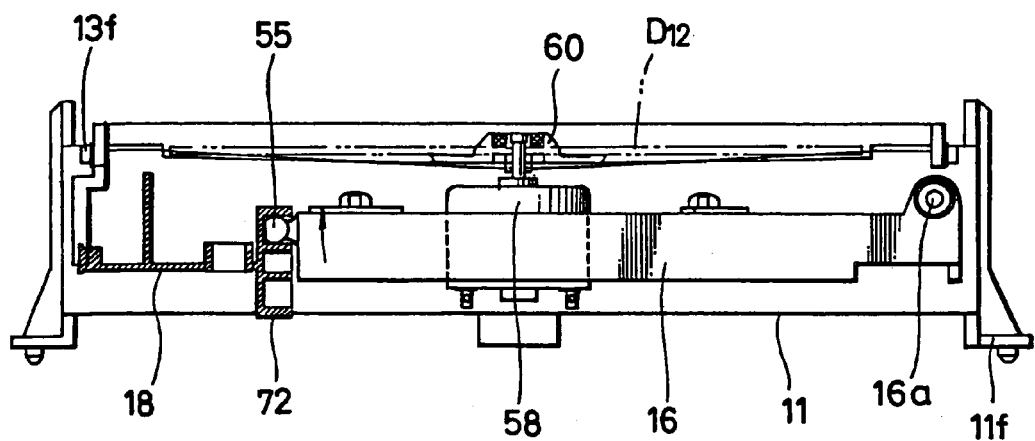
Figure 37B:
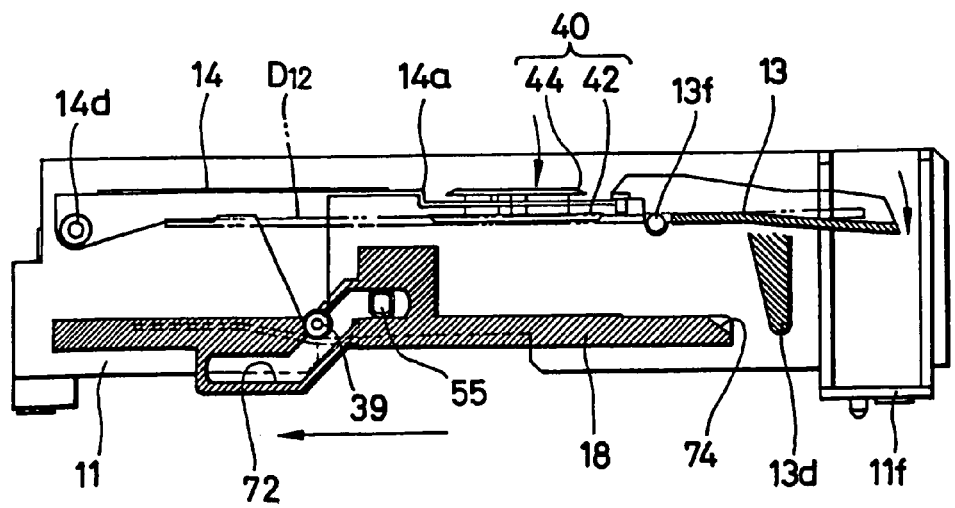

In that case, as shown in FIGS. 37A and 37B, based on the rearward movement of the cam plate 18, the cam protrusion 55 slides from the lower horizontal portion 72c through the inclined portion 72b to the upper horizontal portion 72a of the elevation cam portion 72. As a result, the assembly body holder 16 is elevated with the pair of shaft portions 16a, 16a provided at the rear end portion being as a pivot center in such a manner to push up the side of the cam protrusion 55 at the tip end and hence its position is changed to approximately the horizontal state. Accordingly, the upper portion of the pickup table assembly body 17 supported by the assembly body holder 16 enters into the opening 25 of the main chassis 11 from the underside.

Consequently, the turntable 60 fixed to the tip end of the rotary shaft of the spindle motor 58 of the pickup table assembly body 17 is opposed to the large-diameter disk $D_{12}$, and the engagement portion 60b is fitted into the center hole d of the large-diameter disk $D_{12}$ when the turntable is pivoted in the upper direction. The chucking arm 14 and the opening and closing shutter 13 are lowered as inclining in the lower direction together with the movement of the turntable 60.

Specifically, since the chucking arm 14 is constantly forced in the direction in which the chucking arm 14 approaches the disk installation portion 23 under spring force of the coil spring 45, the roller 39 rotatably supported by the lower end of the drive lever 38 slides from the upper horizontal portion 77a through the inclined portion 77b to the lower horizontal portion 77c, of the chucking cam portion 77 by the rearward movement of the cam plate 18. In that case, since the height and position of the roller 39 is progressively lowered by the cam portion 77, the arm portion 14a is pushed down and the chucking arm 40 held at the tip end of the arm portion is moved close to the turntable 60.

Thus, the chucking member 40 and the turntable 60 are opposed to each other across the large-diameter disk $D_{12}$ from above and below the disk. As a result, the magnet 59 incorporated within the turntable 60 magnetically attracts the chucking member 40 so that the large-diameter disk $D_{12}$ is held by the chucking member 40 and the turntable 60 from above and below the disk. Thus, chucking of the large-diameter disk $D_{12}$ is completed and the large-diameter disk $D_{12}$ is driven to rotate together with the rotation of the turntable 60.

In that case, since the cam pin 48 is laid over the escape portion $78a_0$ set at the deep part of the first cam portion 78a, the support lever 15 is slightly pivoted in the counterclockwise direction. Consequently, the disk holding portion 47 is further moved to the outside slightly, whereby the disk holding portion 47 is detached from the large-diameter disk $D_{12}$ and the engagement is released. Similarly, since the roller 89 is laid over the escape portion $79a_0$ set at the deep part of the large-diameter cam portion 79a, the inner drive roller 85b and fixed roller 95b are further moved to the outside slightly.

As a result, two rollers 85b, 95b are detached from the large-diameter disk $D_{12}$ and the engagement thereof is released. As a result, since the large-diameter disk $D_{12}$ is supported by only the chucking member 40 and the turntable 60, the outer peripheral edge of the disk can be prevented from slidably contacting with the drive roller 85b, fixed roller 95b or disk holding portion 47.

Furthermore, since the opening and closing shutter 13 is constantly forward in the forward direction under spring force of the compression coil spring 37, when the cam plate 18 is moved rearward, the drive lever 13d is moved relatively in the forward direction and is released to the front side through the cam portion 74 provided at the front end portion of the cam plate 18. Consequently, the state of the opening and closing shutter 13 is changed from the slightly upward state shown in FIG. 35 to the slightly downward state shown in FIG. 37. Thus, the lower surface of the shutter portion 13a is pressed to contact with the disk guide portion 29 of the main chassis 11, thereby the inside of the disk entrance and exit slot 30 being tightly closed by the shutter portion 13a.

As a consequence, even when inadvertently the user intends to insert the second optical disk D into the apparatus from the disk entrance and exit slot 30, such insertion operation can be reliably prevented and hence it is possible to reliably prevent the user from inserting the second disk into the apparatus by mistake. After loading of the large-diameter disk had been completed through such operations, it becomes possible to record and reproduce an information signal on the large-diameter disk $D_{12}$ and such recording and reproducing operations can be executed.

Next, a disk ejecting operation (unloading) in which the large-diameter disk $D_{12}$ is ejected from the disk entrance and exit slot 30 after an information signal had been recorded on and reproduced from the large-diameter disk will be described. When the user selects the disk ejecting operation by operating, for example, the ejection button, the drive current is supplied to the second drive motor 101 and the second drive motor is driven to rotate. This point of time is shown as t14 in FIG. 43.

In this case, the second drive motor 101 is rotated in the direction opposite to the disk insertion direction, and the cam plate 18 is moved in the disk ejecting direction. Unloading of the large-diameter disk $D_{12}$ can be executed by effecting control in which the second drive motor 101 for moving the cam plate 18 forward and the first drive motor 84 for driving and rotating the pair of drive rollers 85*a*, 85*b* are rotated in the reverse direction.

Figure 38:
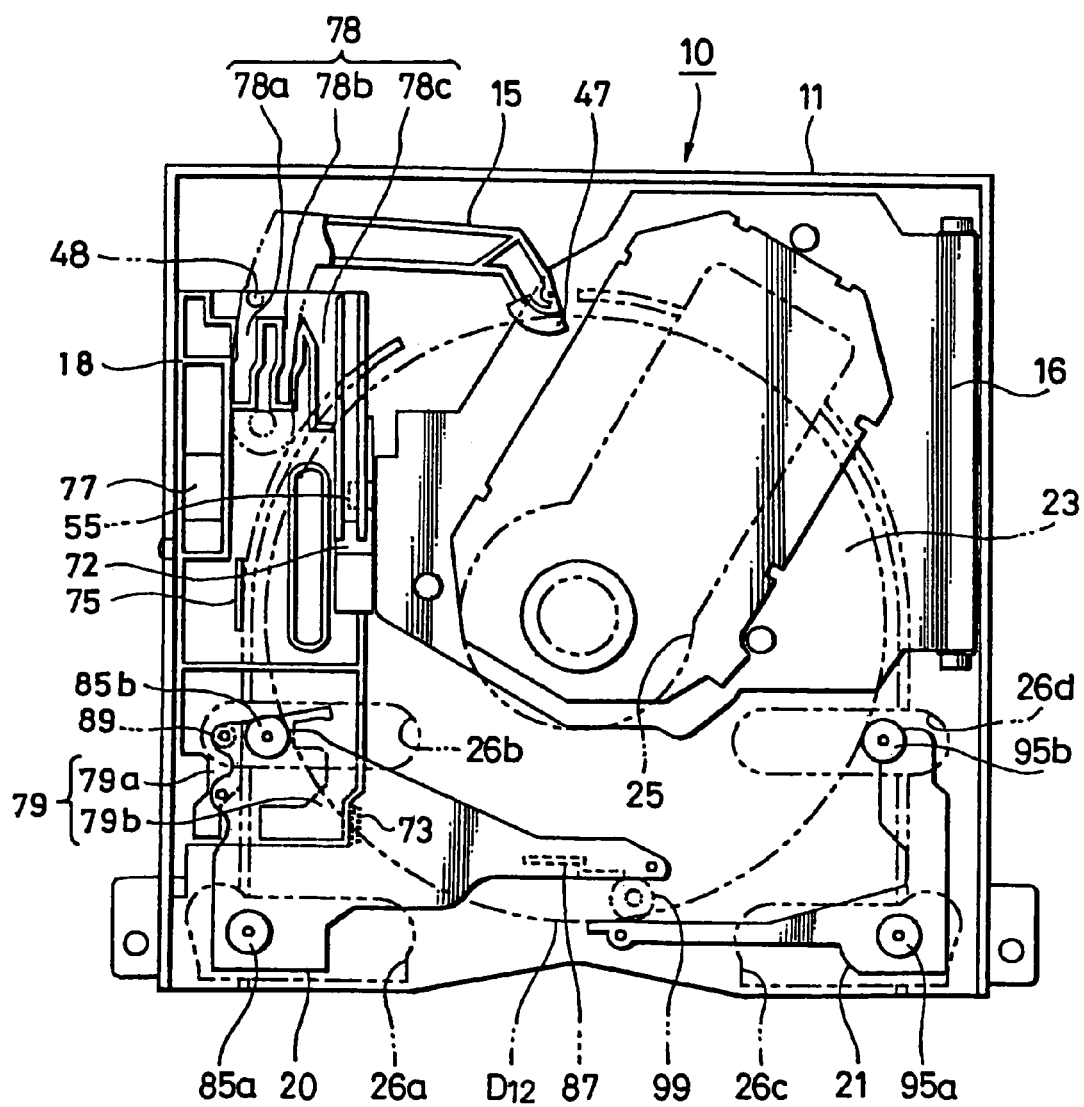
FIG. 38 is an explanatory diagram showing the state in which an optical disk is ejected from a disk loading portion when an optical disk having a diameter of 12 cm is used in the disk recording and reproducing apparatus shown in FIG. 5.
Figure 39A:
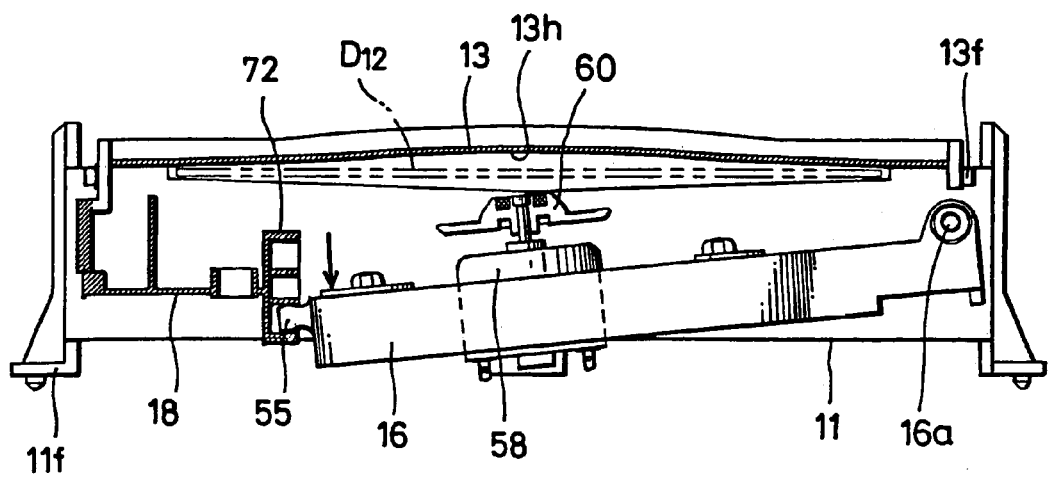
Figure 39B:
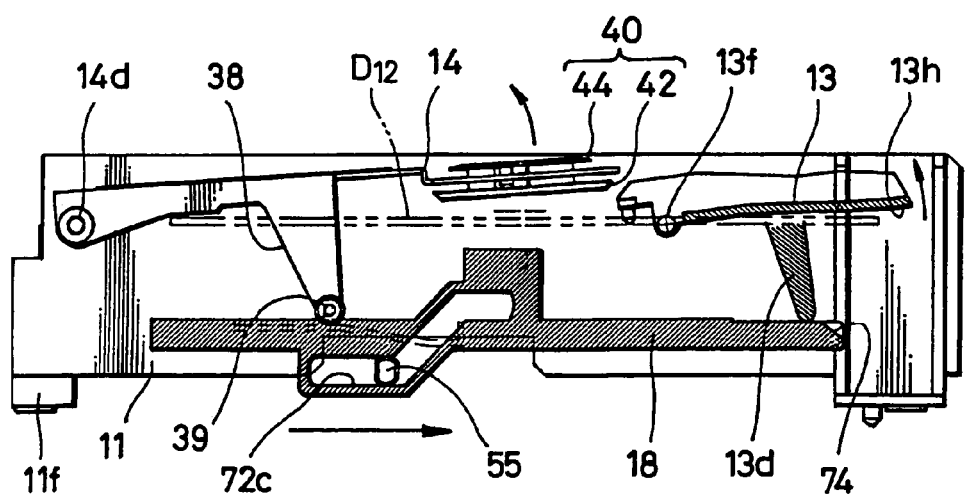

Specifically, when the cam plate 18 is moved in the forward direction, since the cam pin 48 is released from the first cam portion 78*a*, the support lever 15 is pivoted in the clockwise direction in FIG. 38 under spring force of the coil spring 52, whereby the disk holding portion 47 is engaged with the outer peripheral edge of the large-diameter disk $D_{12}$. Then, pressing force of the disk holding portion 47 generated by spring force of the coil spring 52 is given to the insertion side end portion of the large-diameter disk $D_{12}$, and the large-diameter disk $D_{12}$ is pressed to the side of the disk entrance and exit slot 30.

In this case, after the cam plate 18 moved forward and a third delay time DT3 set in advance elapsed, the switch operation member 75 is detached from the eighth detection switch SW8 so that the eighth detection switch SW8 is switched from the on-state to the off-state. This point of time is shown as t5 in FIG. 43. After the eighth detection switch SW8 was switched as described above, the fourth detection switch SW4 is switched from the on-state to the off-state. This point of time is shown as t16 in FIG. 43. Subsequently, the seventh detection switch SW7 is switched from the on-state to the off-state. This point of time is shown as t17 in FIG. 43.

After the seventh detection switch SW7 was switched to the off-state, when a fourth delay time DT4 set in advance elapsed, the supply of the drive current to the second drive motor 101 is brought to an end. As a result, the second drive motor 101 is stopped and forward movement of the cam plate 18 is stopped. Further, after the supply of the drive current to the second drive motor 101 was stopped, when a fifth delay time DT5 set in advance elapsed, the drive current is supplied to the first drive motor 84. In this case, the first drive motor 84 is rotated in the direction opposite to the disk insertion direction and the pair of drive rollers 85*a*, 85*b* are rotated in the clockwise direction that is the opposite direction to the rotation direction.

In that case, the outer peripheral edge on the ejection side of the large-diameter disk $D_{12}$ that is pressed forward by the support lever 15 is brought in contact with the rear drive roller 85*b* and the rear fixed roller 95*b*. As a result, since the drive roller 85*b* is rotated in the reverse direction, rotation force having the opposite direction to that at loading is given to the large-diameter disk $D_{12}$, and therefore the large-diameter disk $D_{12}$ is rotated and moved to the side of the disk entrance and exit slot 30. Function for rotating and moving the large-diameter disk $D_{12}$ is transferred to the pair of front drive roller 85*a* and front fixed roller 95*a* through the operation of the pair of rear drive roller 85*b* and rear fixed roller 95*b* in cooperation with the operation of the pair of front drive roller 85*a* and front fixed roller 95*a*, whereby the large-diameter disk $D_{12}$ is transported up to the disk entrance and exit slot 30.

In this case, when the largest diameter portion of the large-diameter disk $D_{12}$ enters between the pair of rear drive roller 85*b* and rear fixed roller 95*b*, first, the fourth detection switch SW4 is switched from the off-state to the on-state by the operation member 87 of the drive-side roller assembly body 20. This point of time is shown as t18 in FIG. 43. Subsequently, the support lever 15 is moved toward the inside, whereby the operation piece 15*d* is detached from the fifth detection switch SW5 and the fifth detection switch SW5 is switched from the on-state to the off-state. This point of time is shown as t19 in FIG. 43.

Then, the largest-diameter portion of the large-diameter disk $D_{12}$ passes between the pair of rear drive rollers 85*b* and rear fixed rollers 95*b* to detach the operation member 87, thereby switching the fourth detection switch SW4 from the on-state to the off-state. This point of time is shown as t20 in FIG. 43.

Subsequently, when the largest-diameter portion of the large-diameter disk $D_{12}$ enters between the pair of front drive roller 85*a* and front fixed roller 95*a*, again the fourth detection switch SW4 is switched from the off-state to the on-state. This point of time is shown as t21 in FIG. 43. Then, the large-diameter disk $D_{12}$ passes between the pair of front drive roller 85*a* and front fixed roller 95*a* to switch again the fourth detection switch SW4 from the on-state to the off-state. This point of time is shown as t22 in FIG. 43.

Thereafter, when the large-diameter disk $D_{12}$ reaches to the disk entrance and exit slot 30, the outer peripheral edge of the large-diameter disk $D_{12}$ presses outward both of the drive-side guide roller 92*c* and the fixed-side guide roller 97*c* disposed at the right and left of the disk entrance and exit slot 30. Thus, since the operation pin 92*b* of the detection member 92 comes in contact with the first detection switch SW1, the first detection switch SW1 is switched from the off-state to the on-state. This point of time is shown as t23 in FIG. 43.

Figure 40:
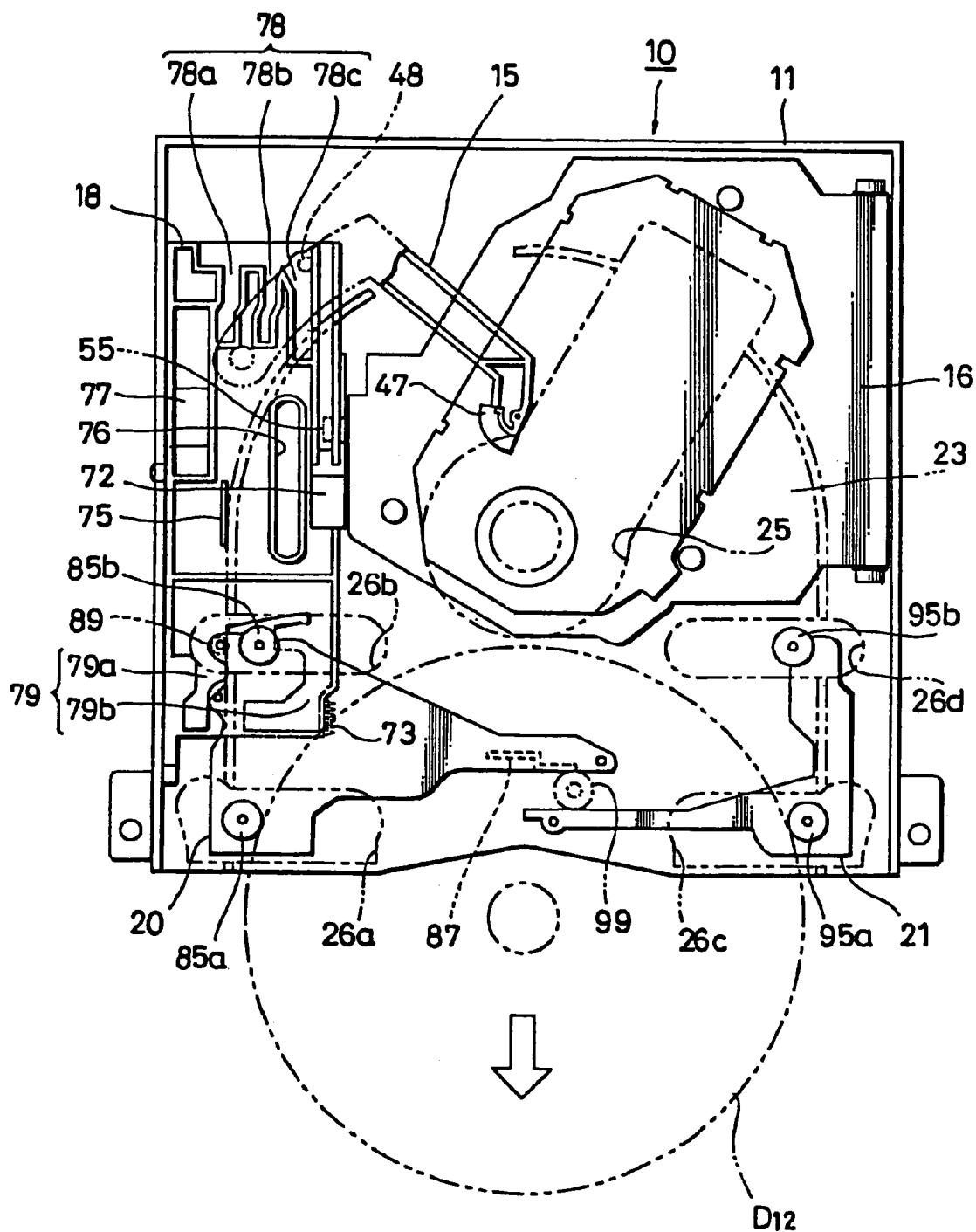
FIG. 40 is an explanatory diagram showing the state in which an optical disk is ejected from a disk entrance and exit slot when an optical disk having a diameter of 12 cm is used in the disk recording and reproducing apparatus shown in FIG. 5.
Figure 41A:
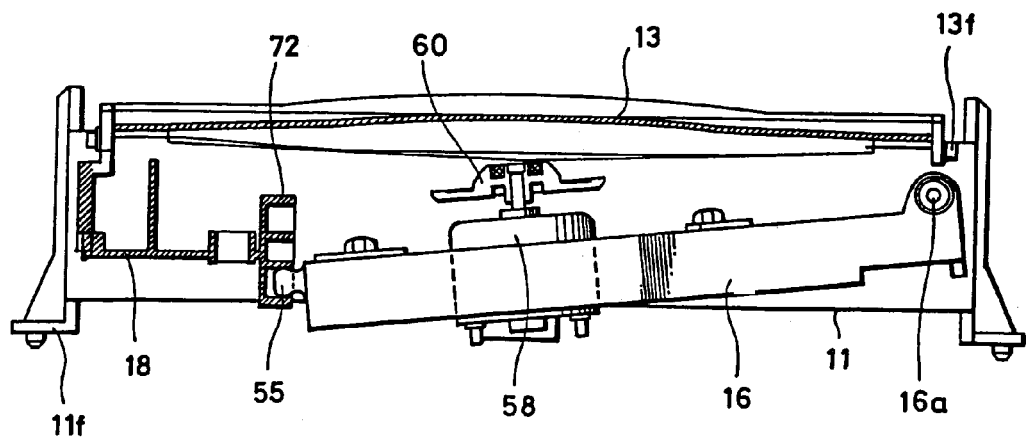
Figure 41B:
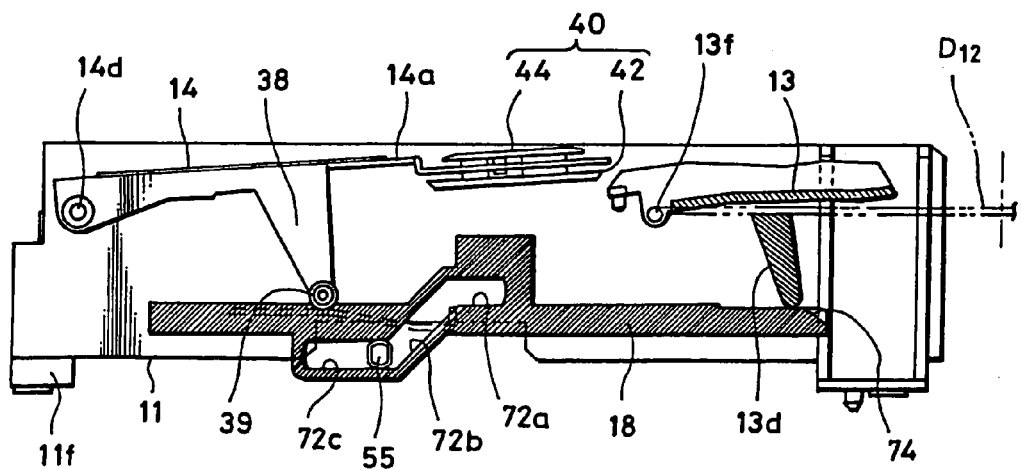

When the first detection switch SW1 is switched to the on-state, rotation of the first drive motor 84 is controlled to start deceleration. After a predetermined time DS set in advance elapsed, the supply of the drive current to the first drive motor 84 is interrupted to stop rotation of the first drive motor. At the same time, the third detection switch SW3 is switched from the on-state to the off-state. This point of time is shown as t24 in FIG. 43. Thus, as shown in FIG. 40, the large-diameter disk $D_{12}$ is sufficiently projected from the disk entrance and exit slot 30 so that the large-diameter disk $D_{12}$ is able to be pulled out from the disk entrance and exit slot by the hand of the user. This point of time is shown as t25 in FIG. 43.

In that case, the user pulls out the large-diameter disk $D_{12}$ from the disk entrance and exit slot, whereby the first detection switch SW1 is switched from the on-state to the off-state. In this case, as shown in FIGS. 39A, 39B and FIGS. 41A, 41B, the opening and closing shutter 13, chucking arm 14, assembly body holder 16 and cam plate 18 are all returned to the original locations so that they are returned to positions similar to those in FIGS. 33A, 33B.

Figure 45:
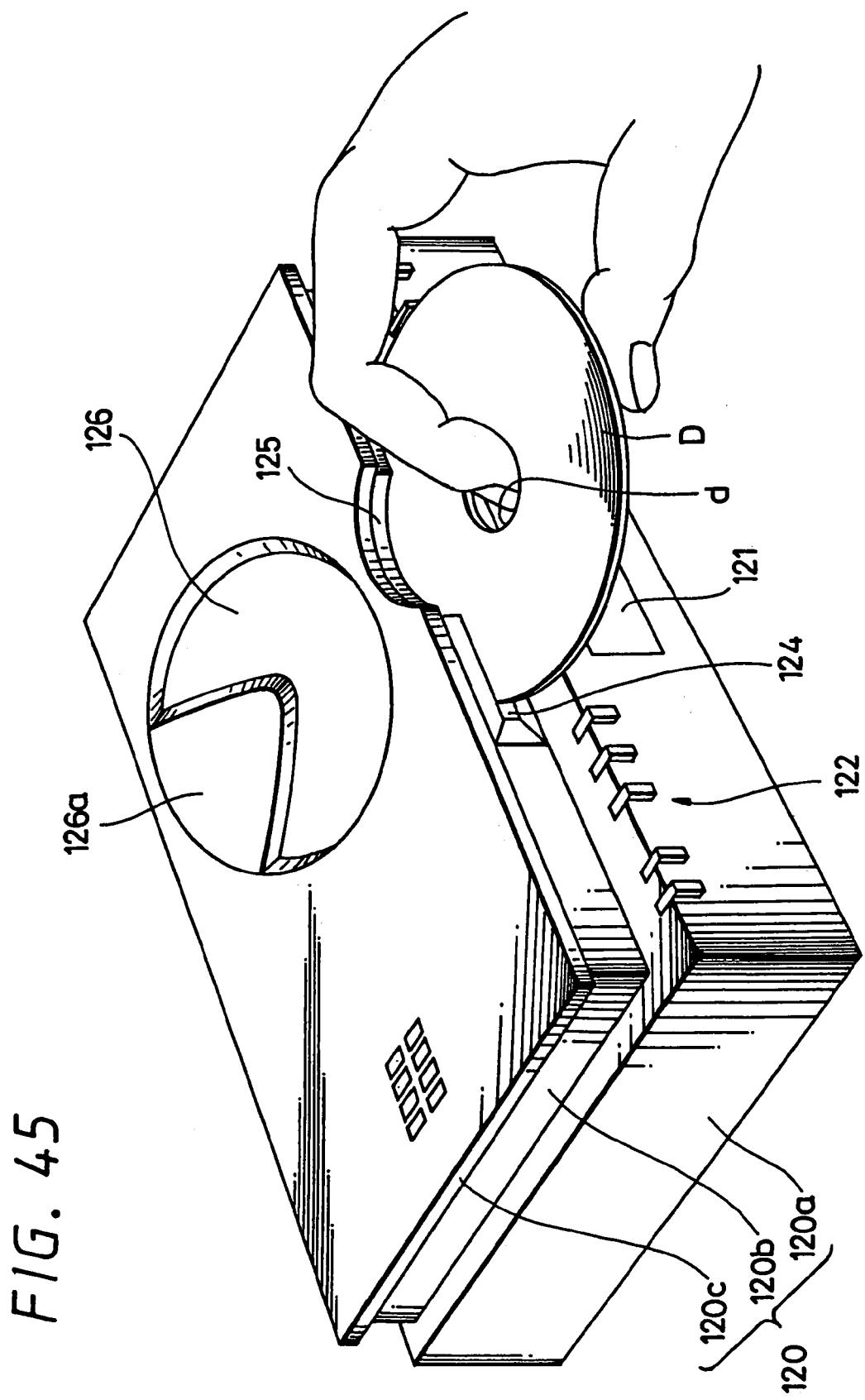
FIG. 45 is an explanatory diagram showing the state in which an optical disk is ejected from the housing in which the disk recording and reproducing apparatus shown in FIG. 5 is accommodated.

In this case, as shown in FIG. 45, since the opening 124 to which the disk entrance and exit slot 30 of the housing 120 accommodating the disk recording and reproducing apparatus 10 is faced has the arc-like disk holding portion 125 concaved inward at the central part thereof, the user can pull out the optical disk D with fingers put on the outer peripheral edge of the optical disk and the center hole d. Thus, when the user pulls out the optical disk D from the disk recording and reproducing apparatus, there can decrease a risk that the signal recording surface of the optical disk is touched by the user. Accordingly, the signal recording surface of the optical disk can be prevented from being smudged by materials such as oil which is attached when the user touches the signal recording surface. Thus, an information signal can be reliably recorded on and reproduced from the optical disk.

Thereafter, after a predetermined time elapsed, the disk recording and reproducing apparatus is moved to the next standby mode such that the user can insert again the optical disk D into the disk recording and reproducing apparatus. Specifically, the second detection switch SW2 is switched from the off-state to the on-state and the sixth detection switch SW6 is switched from the off-state to the on-state. Thus, it becomes possible for the user to insert the next optical disk D into the disk recording and reproducing apparatus.

Figure 46:
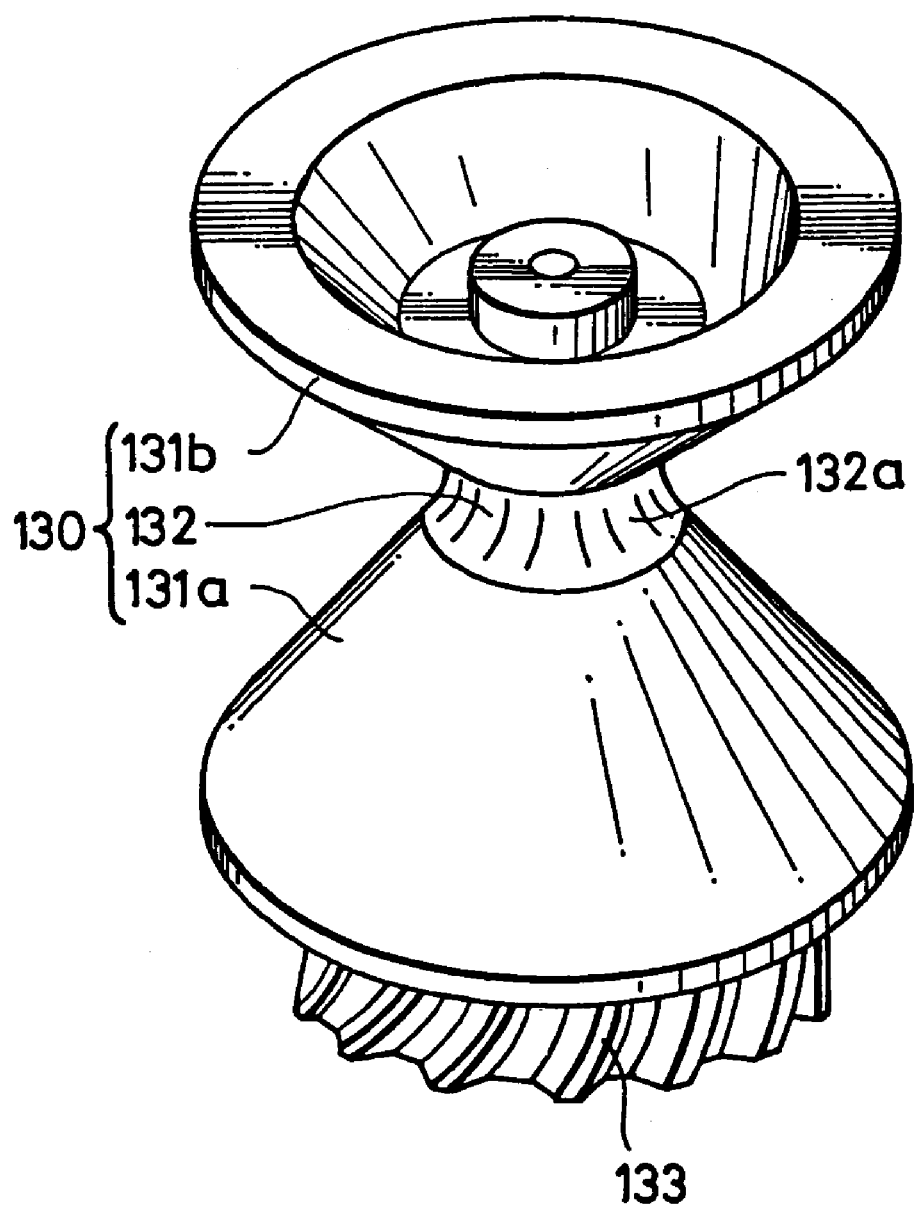
FIG. 46 is a perspective view showing a second embodiment of a second transport member applied to the drive-side roller assembly body shown in FIG. 5.

FIG. 46 shows the second embodiment of the drive roller serving as the above-mentioned first transport member. Further, FIGS. 47A and 47B show the second embodiment of the fixed roller serving as the above-mentioned second transport member.

A drive roller 130 shown in FIG. 46 includes a drive member 131a, a balance member 131b and a cushion member 132, and a gear portion 133 is integrally provided on the lower surface of the drive member 131a. The cushion member 132 of the drive roller 130 has annular groove 132a formed on some part of its outer peripheral surface in the axis direction, in which a concave portion having an arc-like cross-section is continued in the circumferential direction. The outer peripheral edge of the optical disk D is received by this annular groove 132a, thereby the optical disk D being transported in the horizontal direction.

Figure 47A:
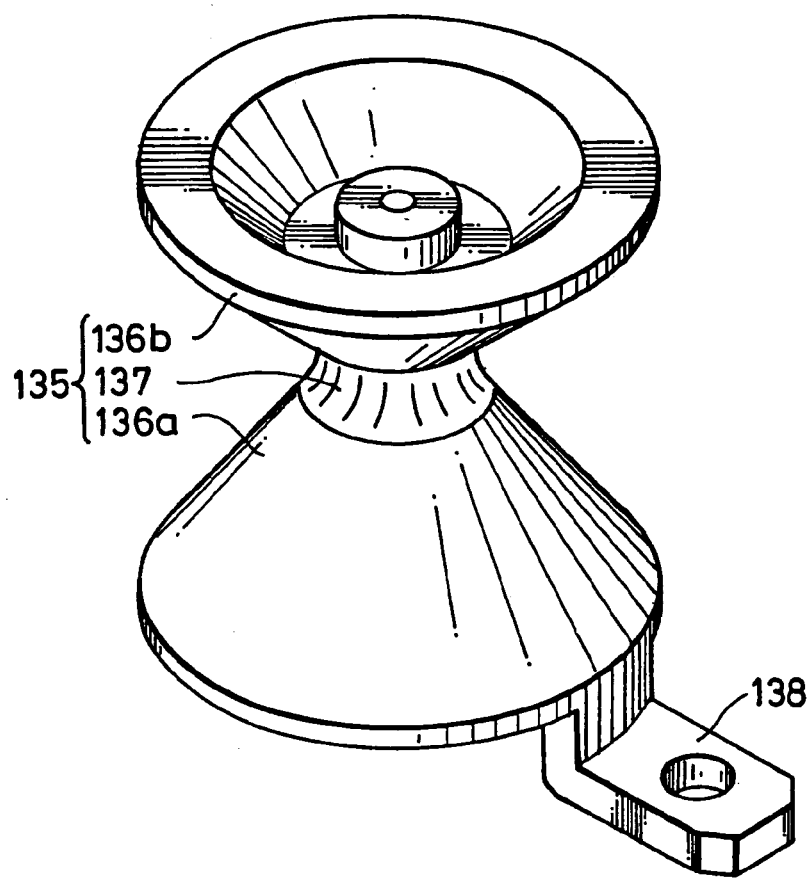
Figure 47B:
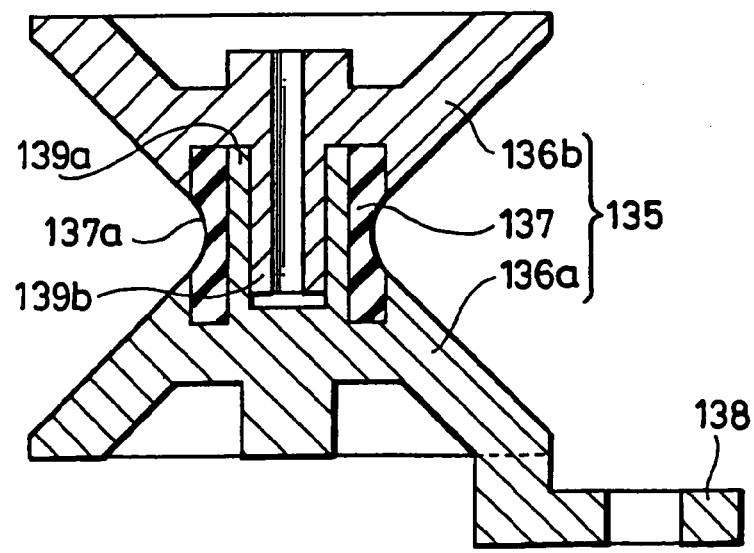

A fixed roller 135 shown in FIGS. 47A, 47B includes a fixed member 136a, a balance member 136b and a cushion member 137, and a base member 138 is integrally provided on the lower surface of the fixed member 136a. The cushion member 137 of the fixed roller 135 has a construction similar to that of the cushion member 132 of the drive roller 130, and therefore the cushion member 137 has an annular groove 137a formed on some part of its outer peripheral surface in the axis direction, in which a concave portion having an arc-like cross-section is continued in the circumferential direction. The outer peripheral edge of the optical disk D is received by this annular groove 137a, thereby the optical disk D being transported in the horizontal direction.

As shown in FIG. 47B, while an outer shaft portion 139a is formed in the fixed member 136a, an inner shaft portion 139b that is engaged with the outer shaft portion 139a is formed in the balance member 136b. The outer shaft portion 139a and the inner shaft portion 139b are engaged with each other by fixing means such as pressure insertion, whereby the fixed member 136a and the balance member 136b are integrally constructed. Then, the cushion member 137 is fitted to the outer shaft portion 139a by pressure insertion means or the like, and integrally formed so that the cushion member cannot rotate.

Figure 48A:
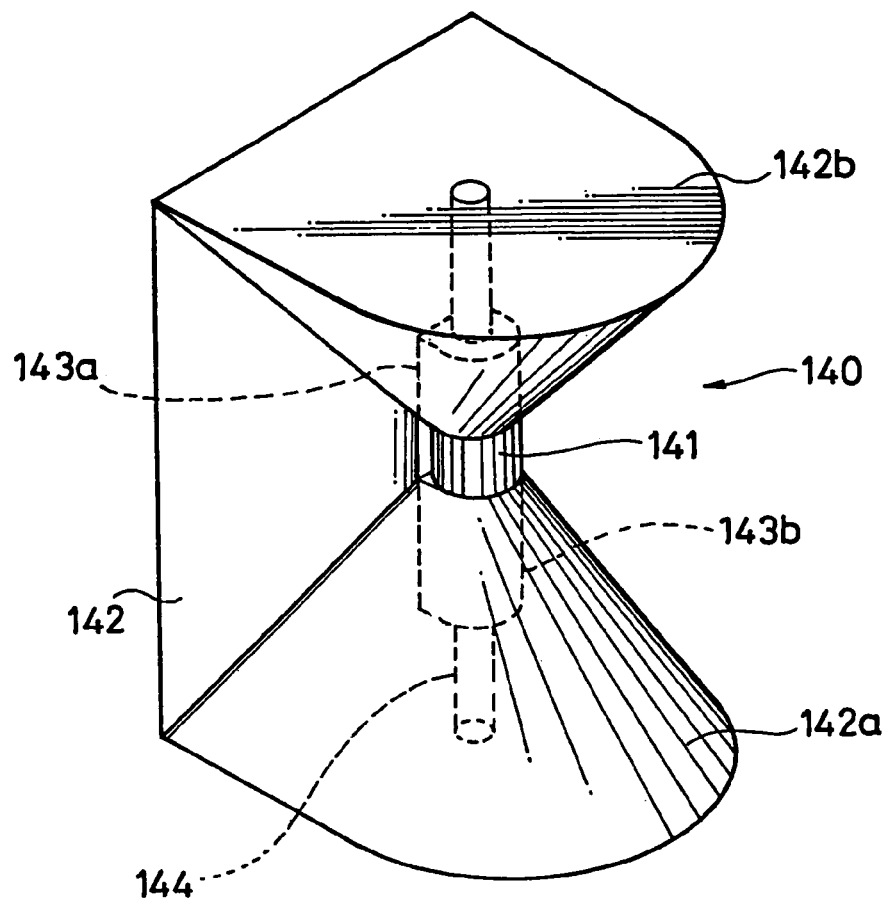
Figure 48B:
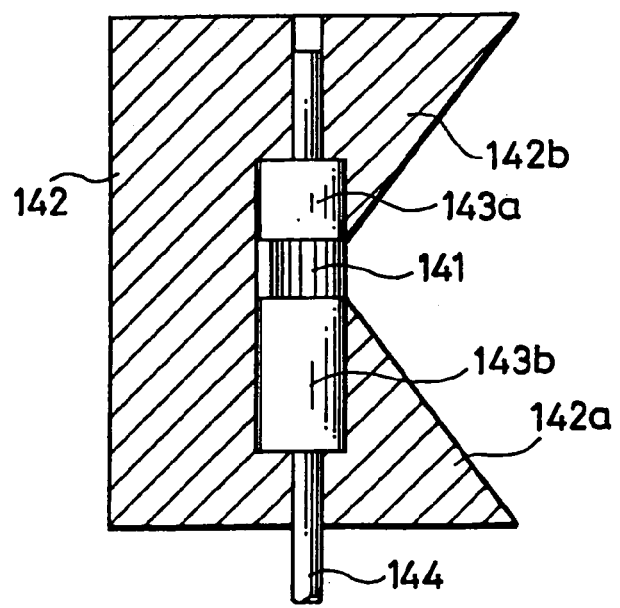

FIGS. 48A and 48B show a third embodiment of the first transport member according to the present invention. A transport roller 140 serving as the first transport member according to this embodiment has a construction in which only a cushion member 141 which comes in contact with the outer peripheral edge of the optical disk D can rotate freely. Specifically, the transport roller 140 comprises a roller-like cushion member 141 and a holder 142 for rotatably holding this cushion member 141. The holder 142 includes a lower support portion 142a having a cone shape whose upper portion decreases in diameter and an upper support portion 142b having a cone shape whose lower portion decreases in diameter. A space S is set between the two support portions 142a and 142b. The cushion member 141 is rotatably provided in this space S between the two support portions.

Bearing members 143a, 143b are disposed at the upper and lower positions with respect to the cushion member 141. The cushion member 141 is fixed by a rotary shaft 144 extending through the lower support portion 142a to the upper support portion 142b and the bearing members 143a, 143b, thereby rotating integrally. This transport roller 140 can serve as a fixed-side transport roller as well. In that case, the cushion member 141 should be fixed so that this transport roller becomes unable to rotate.

Figure 49:
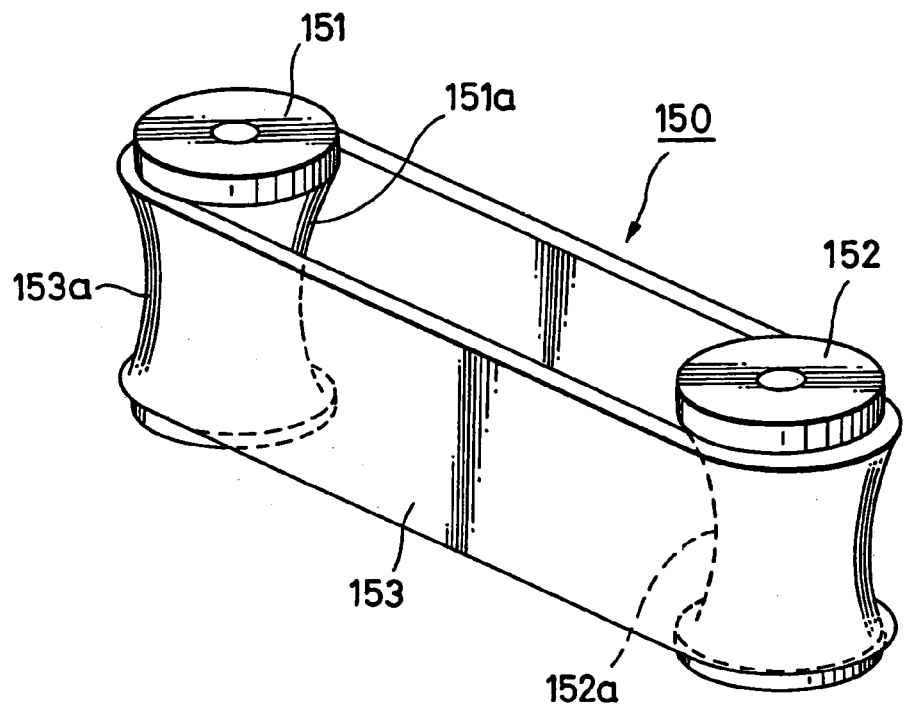
FIG. 49 is a perspective view showing a fourth embodiment of a first transport member applied to the drive-side roller assembly body shown in FIG. 5.

FIG. 49 shows a fourth embodiment of the first transport member according to the present invention. A belt power transmission member 150 serving as the transport member shown in this embodiment is comprised of two running rollers 151, 152 and a running belt 153 stretched between the two running rollers 151, 152. The two running rollers 151, 152 are formed of rotating members of hand drum shape in which annular grooves 151a, 152a having arc-like concave portions continuing in the circumferential direction are formed on the outer peripheral surface. The running belt 153 is formed of a flat belt made of material such as rubber or engineering plastics, and this running belt is loaded on the annular grooves 151a, 152a of the two running rollers 151, 152.

The belt power transmission member 150 having such a construction can be applied to the above-mentioned first embodiment as follows, for example. The first running roller 151 is rotatably supported by the first roller support shaft 88a of the drive-side guide lever 83, and the second running roller 152 is rotatably supported by the second roller shaft 88b of the drive-side guide lever 83. Then, any one of the running rollers (e.g. the first running roller 151) is provided with a gear portion and this gear portion is rotated by the drive motor 84.

Thus, the first running roller 151 can be rotated to drive and rotate the running belt 153, whereby the outer peripheral edge of the optical disk D is brought in contact with a conduit-like concave portion 153a formed on the outer peripheral surface of the running belt 153. As a result, similarly to the case of the above-mentioned drive rollers 85a, 85b, the optical disk D can be rotated and moved by rotation force given thereto.

In particular, according to this embodiment, since the optical disk can be transported from one running roller 151 to the other running roller 152 by the running belt 153 without discontinuity, the optical disk D can be rotated, moved and transported with high stability. Further, since only one running roller needs to be driven, the number of gears can be reduced and the structure of the transport member can be simplified as compared with the case of the above-mentioned drive rollers 85a, 85b. When the pair of rollers are both fixed and a belt is stretched between the fixed rollers, it is possible to construct the second transport member serving as the fixed side.

Figure 50:
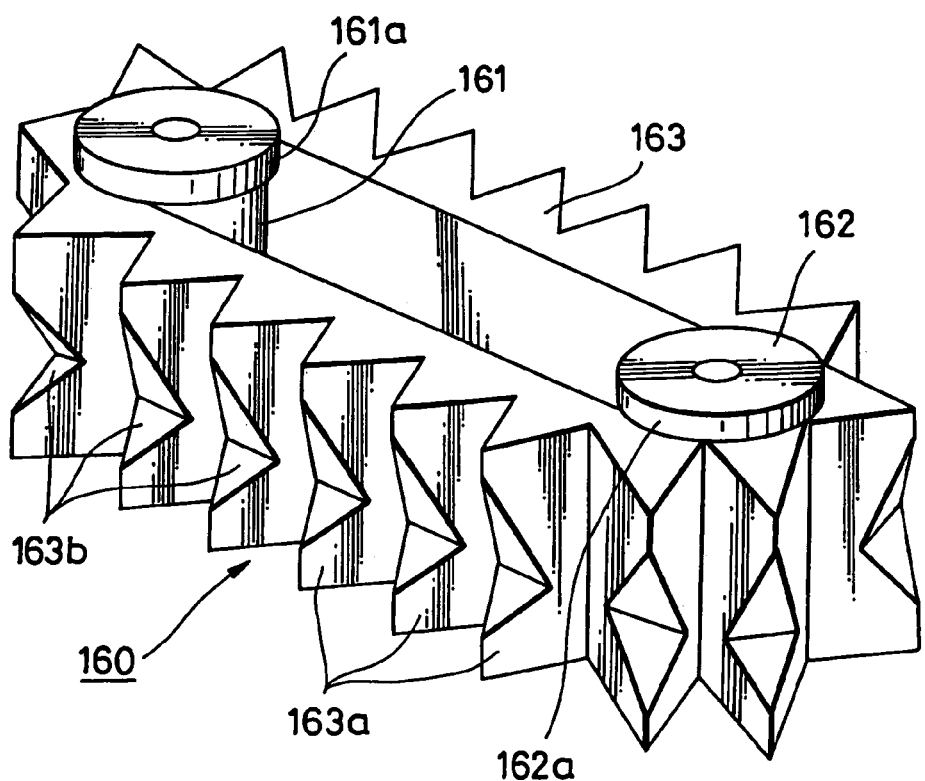
FIG. 50 is a perspective view showing a fifth embodiment of a first transport member applied to the drive-side roller assembly body shown in FIG. 5.
Figure 51:
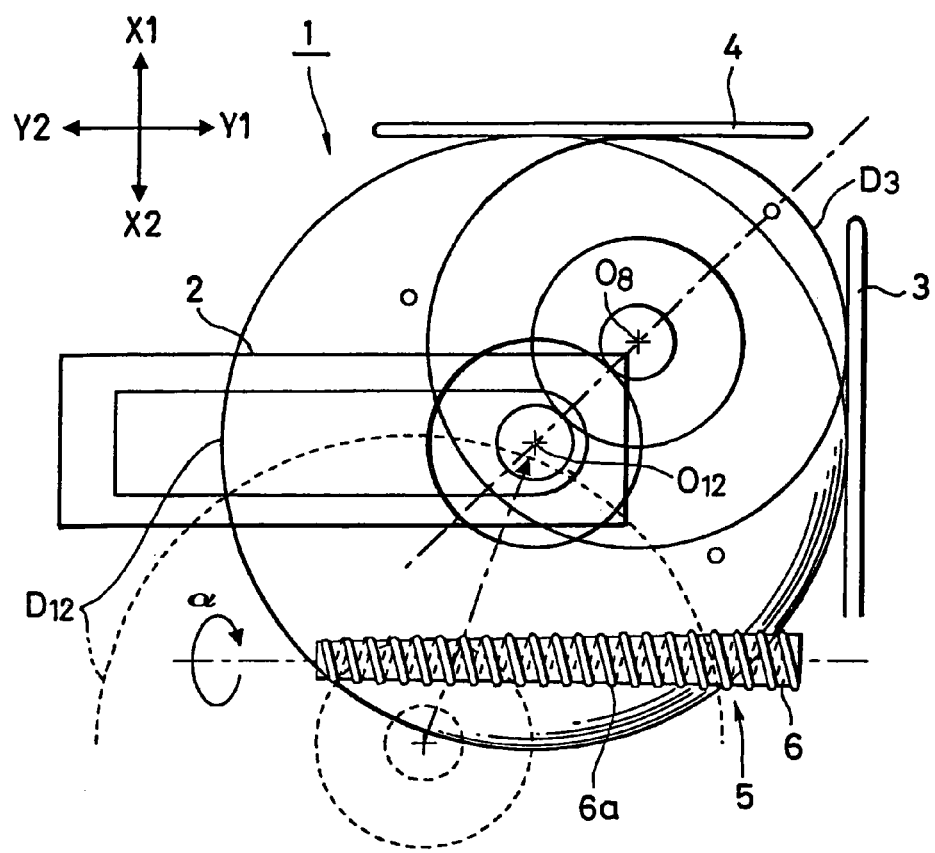
FIG. 51 is an explanatory diagram showing a conventional disk recording and reproducing apparatus from the flat surface side.
Figure 52:
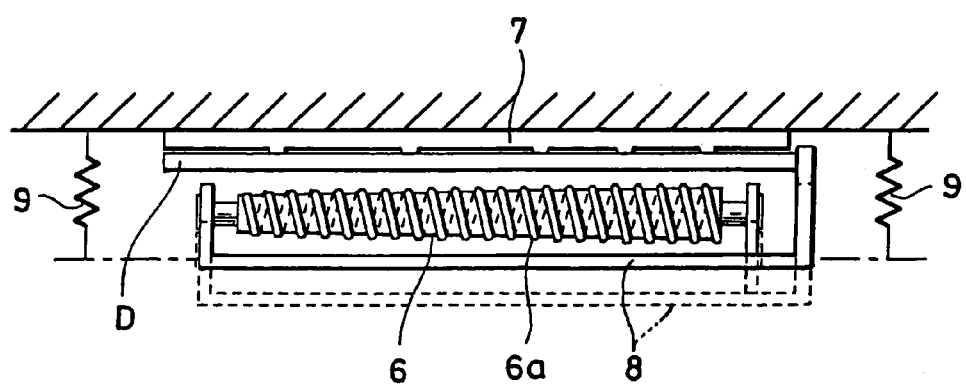
FIG. 52 is an explanatory diagram showing a conventional disk recording and reproducing apparatus from the front surface side.

FIG. 50 shows a fifth embodiment of the first transport member according to the present invention. An endless power transmission member 160 serving as the transport member shown in this embodiment is comprised of two running rollers 161, 162 and an endless belt 163 stretched between the two running rollers 161, 162. The two running rollers 161, 162 are formed of spool-like rotating members with flange portions 161a, 162a provided at respective ends.

The running belt 163 is formed of a belt-like member made of material such as rubber, engineering plastics or the like and the member is formed as an endless belt in which a number of protruded portions 163a are arranged in the circumferential direction. This running belt is stretched between the two running rollers 161, 162 and can be prevented by the flange portions 161a, 162a from being disengaged from the respective rollers. Further, the protruded portions 163a include groove portions 163b set in some part of the belt in the width direction and being extended in the circumferential direction.

The endless power transmission member 160 having such a construction can be used similarly to the above-mentioned belt power transmission member 150, for example. Specifically, the first running roller 161 is rotatably supported by the first roller support shaft 88a, and the second running roller 162 is rotatably supported by the second roller support shaft 88b. Then, any one of the running rollers (e.g. the first running roller 161) includes a gear portion, and this gear portion is driven and rotated by the drive motor 84.

Thus, the first running roller 161 is rotated to rotate the endless belt 163, thereby enabling the outer peripheral edge of the optical disk D to come in contact with the groove portions 163b having a V-like cross-section formed on the outer peripheral surface of this endless belt 163. As a result, similarly to the case of the above-mentioned belt power transmission member 150, the optical disk D can be rotated by rotation force given thereto.

Also in this case, since the optical disk is transported from one running roller 161 to the other running roller 161 by the endless belt 163, the optical disk D can be rotated, moved and transported with high stability. Further, since only one running roller needs to be driven, the number of gears can be reduced and the structure of the endless belt power transmission member can be simplified as compared with the case of the above-mentioned drive rollers 85a, 85b. When the pair of rollers are both fixed and a belt is stretched between the fixed rollers, it is possible to construct the second transport member serving as the fixed side.

While the present invention has been described so far, it is needless to say that the present invention is not limited to the above-mentioned embodiments. For example, while the disk recording and reproducing apparatus capable of recording (writing) information on the optical disk and reproducing (reading) information from the optical disk as described above, it is needless to say that the present invention is not limited thereto and that the present invention can be applied to a disk recording apparatus only capable of recording information or a disk reproducing apparatus only capable of reproducing information.

Further, while the present invention is applied to a disk recording and reproducing apparatus which employs both the optical disk having the diameter of 8 cm and the optical disk having the diameter of 12 cm as described above, it is needless to say that the present invention is not limited thereto and that the present invention is applied to optical disks of other sizes.

As described above, the present invention is not limited to the above-mentioned embodiments and can be variously modified without departing from the gist of the present invention.

INDUSTRIAL APPLICABILITY

As described above, according to the disk recording and/or reproducing apparatus of the present invention, since the space between the pair of transport members is adjusted by the space adjusting mechanism in response to the size of the disk-like recording medium, the disk-like recording medium can be held in the diametrical direction with high reliability and also the disk-like recording medium can be rotated and moved by rotation force applied thereto. As a result, two or more than two disk-like recording mediums having different diameters can be held and transported reliably. Further, since any member of the disk transport mechanism can be prevented from contacting with the signal recording surface of the disk-like recording medium, there can be removed a risk that foreign material is brought in contact with the signal recording surface so that the signal recording surface will be damaged.

What is claimed is:

1. A disk recording and/or reproducing apparatus comprises:

first and second front transport members for holding a disk-like recording medium in its diametrical direction during insertion;

drive means for driving said first front transport member and giving rotation force to said disk-like recording medium held between said first and second front transport members to cause the disk-like recording medium to rotate and move in a direction of insertion;

a space adjusting mechanism capable of making said first and second front transport members become close to or away from each other in response to the size of said disk-like recording medium.

first and second rear transport members for holding the disk-like recording medium in its diametrical direction during insertion, said first and second rear transport members located away from said first and second front transport members along the direction of insertion, said first and second front transport members and said first and second rear transport members supporting four points of the outer peripheral edge of said disk-like recording medium at a first degree of insertion;

a support lever having a pivot point at a first end and a disk holding portion at a second end, such that the disk holding portion rotates about said pivot point, the disk holding portion and the first and second rear transport members supporting three points of the outer peripheral edge of the said disk-like recording medium at a second degree of insertion; and a disk selecting cam mechanism configured to control an adjustment amount of said space adjusting mechanism in response to the size of said disk-like recording medium, wherein said disk selecting cam mechanism includes a large diameter cam portion and a small diameter cam portion, and a cam pin of said space adjusting mechanism is configured to be selectively inserted to and ejected from the large-diameter cam portion or the small diameter cam portion.

* * * * *